United States Patent
Guo et al.

(10) Patent No.: US 9,096,785 B2
(45) Date of Patent: Aug. 4, 2015

(54) POLYCARBONATE BASED THERMALLY CONDUCTIVE FLAME RETARDANT POLYMER COMPOSITIONS

(71) Applicant: SABIC Global Technologies B.V., Bergen op Zoom (NL)

(72) Inventors: Mingcheng Guo, Shanghai (CN); Yaqin Zhang, Shanghai (CN); Yuxian An, Shanghai (CN); Qingya Shen, Shanghai (CN)

(73) Assignee: SABIC Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 14/295,603

(22) Filed: Jun. 4, 2014

(65) Prior Publication Data

US 2014/0353544 A1    Dec. 4, 2014

Related U.S. Application Data

(60) Provisional application No. 61/830,944, filed on Jun. 4, 2013.

(51) Int. Cl.

| | |
|---|---|
| *C08G 64/00* | (2006.01) |
| *C09K 5/14* | (2006.01) |
| *C09K 21/12* | (2006.01) |
| *C08K 3/00* | (2006.01) |
| *C08K 3/34* | (2006.01) |
| *C08K 9/06* | (2006.01) |
| *C08L 69/00* | (2006.01) |
| *C08L 83/10* | (2006.01) |
| *C08G 63/02* | (2006.01) |

(52) U.S. Cl.
CPC ............... *C09K 5/14* (2013.01); *C08K 3/0033* (2013.01); *C08K 3/34* (2013.01); *C08K 9/06* (2013.01); *C08L 69/00* (2013.01); *C08L 83/10* (2013.01); *C09K 21/12* (2013.01)

(58) Field of Classification Search
USPC ........................... 528/196, 198; 524/115, 227
See application file for complete search history.

(56) References Cited

U.S. PATENT DOCUMENTS

| 3,635,895 | A | 1/1972 | Morton |
|---|---|---|---|
| 4,001,184 | A | 1/1977 | Scott |
| 4,154,775 | A | 5/1979 | Axelrod |
| 4,217,438 | A | 8/1980 | Brunelle et al. |
| 6,465,555 | B1 | 10/2002 | Nodera et al. |
| 6,664,313 | B2 | 12/2003 | Hirai et al. |
| 6,664,362 | B2 | 12/2003 | Kobayashi |
| 6,727,303 | B2 | 4/2004 | Ono et al. |
| 6,833,397 | B2 | 12/2004 | Miyamoto et al. |
| 6,921,784 | B2 | 7/2005 | Dohi et al. |
| 6,956,073 | B2 | 10/2005 | Takagi et al. |
| 7,786,246 | B2 | 8/2010 | Jansen et al. |
| 8,048,955 | B2 | 11/2011 | Shibuya et al. |
| 8,110,622 | B2 | 2/2012 | Ohira et al. |
| 2002/0147256 | A1 | 10/2002 | Eckel et al. |
| 2005/0159518 | A1 | 7/2005 | Miyamoto et al. |
| 2007/0047253 | A1 | 3/2007 | Lee et al. |
| 2007/0149661 | A1 | 6/2007 | Charati et al. |
| 2007/0299169 | A1 | 12/2007 | Ohira et al. |
| 2009/0215934 | A1 | 8/2009 | Nakamura et al. |
| 2010/0072416 | A1 | 3/2010 | Fujioka et al. |
| 2010/0160508 | A1 | 6/2010 | Taschner et al. |
| 2012/0129990 | A1 | 5/2012 | Kikuchi et al. |
| 2012/0296020 | A1 | 11/2012 | Parakkal et al. |

FOREIGN PATENT DOCUMENTS

WO    WO 03/066704    8/2003

OTHER PUBLICATIONS

Lovinger et al., Morphology and properties of polycaprolactone-poly(dimethyl siloxane)-polycaprolactone triblock copolymers, J. Polymer Sci., Part B. (Polymer Physics), 1993, 31, 115-123.

*Primary Examiner* — Terressa Boykin
(74) *Attorney, Agent, or Firm* — Baker & Hostetler LLP

(57) ABSTRACT

Disclosed herein are thermally conductive blended polycarbonate compositions with improved flame retardant properties. The resulting compositions, comprising a polycarbonate polymer, a phosphorus-containing flame retardant, a metal hydroxide, optionally an anti-dripping agent, and optionally a silicone-containing char-forming agent, can be used in the manufacture of articles requiring thermally conductive materials with improved flame retardant properties such as electronic devices. This abstract is intended as a scanning tool for purposes of searching in the particular art and is not intended to be limiting of the present disclosure.

37 Claims, No Drawings

POLYCARBONATE BASED THERMALLY CONDUCTIVE FLAME RETARDANT POLYMER COMPOSITIONS

CROSS REFERENCE TO RELATED PATENT APPLICATION

This application claims priority to U.S. Patent Application No. 61/830,944 filed Jun. 4, 2013, herein incorporated by reference in its entirety.

BACKGROUND

Decreasing the dimensions and weight of components as well as increasing performance in portable electronics is a key market demand. However, the reduction in size of electronic devices results in greater heat retention which can degrade product performance. Thermally conductive materials are typically used to dissipate heat in many devices such as, for example, LED lamps, e-motors, circuits, processors and coil bobbins. Despite significant research and development efforts in the field, there remains a need for suitable polymer compositions that have improved thermal conductivity, while retaining required properties of robust flame retardance, superior heat dissipation, and good impact strength performance.

Accordingly, there is a growing need for thermally conductive polymer compositions formed from amorphous polymer resins which provide robust flame retardance, superior heat dissipation, and good impact performance.

SUMMARY

The present disclosure relates to blended thermoplastic polymer compositions comprising one or more polycarbonate polymers, one or more thermally conductive fillers, one or more phosphorus-containing flame retardants, and one or more silicone-containing char-forming agents, wherein the blended polymer composition have both excellent thermal conductivity and flame retardance properties.

In one aspect, the disclosure relates to blended thermoplastic compositions comprising (a) from about 20% wt % to about 80% wt % of a polycarbonate polymer; (b) from about 3% wt % to about 30% wt % of a phosphorus-containing flame retardant; (c) from about 10% wt % to about 70% wt % of a filler comprising at least one thermally conductive filler and at least one thermally insulating filler; (d) from about 0% wt % to about 10% wt % of an anti-drip agent; and (e) from about 0% wt % to about 10% wt % of a silicone-containing char-forming agent; wherein the combined weight percent value of all components does not exceed about 100 wt %; and wherein all weight percent values are based on the total weight of the composition.

In various further aspects, the disclosure relates to blended thermoplastic compositions comprising (a) from about 20% wt % to about 80% wt % of a polycarbonate polymer; (b) from about 3% wt % to about 30% wt % of a phosphorus-containing flame retardant; (c) from about 10% wt % to about 70% wt % of a filler comprising at least one thermally conductive filler and at least one thermally insulating filler; (d) from about 0% wt % to about 10% wt % of an anti-drip agent; and (e) from about 0% wt % to about 10% wt % of a silicone-containing char-forming agent; wherein the combined weight percent value of all components does not exceed about 100 wt %; wherein all weight percent values are based on the total weight of the composition; wherein a molded sample of the blended thermoplastic composition is capable of achieving UL94 V0 rating at a thickness of 1.2 mm ($\pm 10\%$); and wherein a molded sample of the blended thermoplastic composition has a through-plane thermal conductivity when determined in accordance with ASTM E1461 of greater than or equal to about 0.4 W/mK.

In various further aspects, the disclosure relates to articles comprising the disclosed compositions.

While aspects of the present disclosure can be described and claimed in a particular statutory class, such as the system statutory class, this is for convenience only and one of skill in the art will understand that each aspect of the present disclosure can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Additional aspects of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

DETAILED DESCRIPTION

The present disclosure can be understood more readily by reference to the following detailed description of the disclosure and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present disclosure, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

All publications mentioned herein are incorporated herein by reference to disclose and describe the methods and/or materials in connection with which the publications are cited.

DEFINITIONS

It is also to be understood that the terminology used herein is for the purpose of describing particular aspects only and is not intended to be limiting. As used in the specification and in the claims, the term "comprising" can include the embodiments "consisting of" and "consisting essentially of" Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polycarbonate poly" includes mixtures of two or more polycarbonate polymers.

As used herein, the term "combination" is inclusive of blends, mixtures, alloys, reaction products, and the like.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally substituted alkyl" means that the alkyl group can or cannot be substituted and that the description includes both substituted and unsubstituted alkyl groups.

As used herein, the term "effective amount" refers to an amount that is sufficient to achieve the desired modification of a physical property of the composition or material. For example, an "effective amount" of a thermally conductive filler refers to an amount that is sufficient to achieve the desired improvement in the property modulated by the formulation component, e.g. achieving the desired level of thermal conductivity. The specific level in terms of wt % in a composition required as an effective amount will depend upon a variety of factors including the amount and type of polycarbonate, amount and type of polycarbonate, amount and type of thermally conductive filler, and end use of the article made using the composition.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Compounds are described using standard nomenclature. For example, any position not substituted by any indicated group is understood to have its valence filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this disclosure belongs.

The term "alkyl group" as used herein is a branched or unbranched saturated hydrocarbon group of 1 to 24 carbon atoms, such as methyl, ethyl, n propyl, isopropyl, n butyl, isobutyl, t butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "aralkyl" as used herein is an aryl group having an alkyl, alkynyl, or alkenyl group as defined above attached to the aromatic group. An example of an aralkyl group is a benzyl group.

The term "carbonate group" as used herein is represented by the formula OC(O)OR, where R can be hydrogen, an alkyl, alkenyl, alkynyl, aryl, aralkyl, cycloalkyl, halogenated alkyl, or heterocycloalkyl group described above.

The term "organic residue" defines a carbon containing residue, i.e., a residue comprising at least one carbon atom, and includes but is not limited to the carbon-containing groups, residues, or radicals defined hereinabove. Organic residues can contain various heteroatoms, or be bonded to another molecule through a heteroatom, including oxygen, nitrogen, sulfur, phosphorus, or the like. Examples of organic residues include but are not limited alkyl or substituted alkyls, alkoxy or substituted alkoxy, mono or di-substituted amino, amide groups, etc. Organic residues can preferably comprise 1 to 18 carbon atoms, 1 to 15, carbon atoms, 1 to 12 carbon atoms, 1 to 8 carbon atoms, 1 to 6 carbon atoms, or 1 to 4 carbon atoms. In a further aspect, an organic residue can comprise 2 to 18 carbon atoms, 2 to 15, carbon atoms, 2 to 12 carbon atoms, 2 to 8 carbon atoms, 2 to 4 carbon atoms, or 2 to 4 carbon atoms.

A very close synonym of the term "residue" is the term "radical," which as used in the specification and concluding claims, refers to a fragment, group, or substructure of a molecule described herein, regardless of how the molecule is prepared. For example, a 2,4-dihydroxyphenyl radical in a particular compound has the structure:

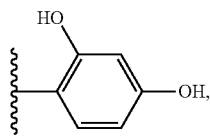 [SMILES: *c1ccc(O)cc1O]

regardless of whether 2,4-dihydroxyphenyl is used to prepare the compound. In some embodiments the radical (for example an alkyl) can be further modified (i.e., substituted alkyl) by having bonded thereto one or more "substituent radicals." The number of atoms in a given radical is not critical to the present disclosure unless it is indicated to the contrary elsewhere herein.

"Organic radicals," as the term is defined and used herein, contain one or more carbon atoms. An organic radical can have, for example, 1-26 carbon atoms, 1-18 carbon atoms, 1-12 carbon atoms, 1-8 carbon atoms, 1-6 carbon atoms, or 1-4 carbon atoms. In a further aspect, an organic radical can have 2-26 carbon atoms, 2-18 carbon atoms, 2-12 carbon atoms, 2-8 carbon atoms, 2-6 carbon atoms, or 2-4 carbon atoms. Organic radicals often have hydrogen bound to at least some of the carbon atoms of the organic radical. One example, of an organic radical that comprises no inorganic atoms is a 5,6,7,8-tetrahydro-2-naphthyl radical. In some embodiments, an organic radical can contain 1-10 inorganic heteroatoms bound thereto or therein, including halogens, oxygen, sulfur, nitrogen, phosphorus, and the like. Examples of organic radicals include but are not limited to an alkyl, substituted alkyl, cycloalkyl, substituted cycloalkyl, mono-substituted amino, di-substituted amino, acyloxy, cyano, carboxy, carboalkoxy, alkylcarboxamide, substituted alkylcarboxamide, dialkylcarboxamide, substituted dialkylcarboxamide, alkylsulfonyl, alkylsulfinyl, thioalkyl, thiohaloalkyl, alkoxy, substituted alkoxy, haloalkyl, haloalkoxy, aryl, substituted aryl, heteroaryl, heterocyclic, or substituted heterocyclic radicals, wherein the terms are defined elsewhere herein. A few non-limiting examples of organic radicals that include heteroatoms include alkoxy radicals, trifluoromethoxy radicals, acetoxy radicals, dimethylamino radicals and the like.

As used herein, the terms "number average molecular weight" or "$M_n$" can be used interchangeably, and refer to the statistical average molecular weight of all the polymer chains in the sample and is defined by the formula:

$$M_n = \frac{\sum N_i M_i}{\sum N_i},$$

$$M_n = \frac{\sum N_i M_i}{\sum N_i},$$

where $M_i$ is the molecular weight of a chain and $N_i$ is the number of chains of that molecular weight. $M_n$ can be determined for polymers, e.g., polycarbonate polymers, by methods well known to a person having ordinary skill in the art using molecular weight standards, e.g. polycarbonate standards or polystyrene standards, preferably certified or traceable molecular weight standards.

$$M_n = \frac{\sum N_i M_i}{\sum N_i},$$

As used herein, the terms "weight average molecular weight" or "Mw" can be used interchangeably, and are defined by the formula:

$$M_w = \frac{\sum N_i M_i^2}{\sum N_i M_i},$$

where $M_i$ is the molecular weight of a chain and $N_i$ is the number of chains of that molecular weight. Compared to $M_n$, $M_w$ takes into account the molecular weight of a given chain in determining contributions to the molecular weight average. Thus, the greater the molecular weight of a given chain, the more the chain contributes to the $M_w$. $M_w$ can be determined for polymers, e.g. polycarbonate polymers, by methods well known to a person having ordinary skill in the art using molecular weight standards, e.g. polycarbonate standards or polystyrene standards, preferably certified or traceable molecular weight standards.

As used herein, the terms "polydispersity index" or "PDI" can be used interchangeably, and are defined by the formula:

$$PDI = \frac{M_w}{M_n}.$$

The PDI has a value equal to or greater than 1, but as the polymer chains approach uniform chain length, the PDI approaches unity.

The terms "BisA," "BPA," or "bisphenol A," which can be used interchangeably, as used herein refers to a compound having a structure represented by the formula:

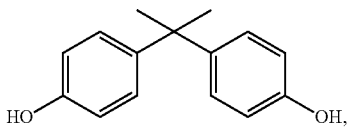

BisA can also be referred to by the name 4,4'-(propane-2,2-diyl)diphenol; p,p'-isopropylidenebisphenol; or 2,2-bis(4-hydroxyphenyl)propane. BisA has the CAS #80-05-7.

As used herein, "polycarbonate" refers to an oligomer or polymer comprising residues of one or more dihydroxy compounds, e.g., dihydroxy aromatic compounds, joined by carbonate linkages; it also encompasses homopolycarbonates, copolycarbonates, and (co)polyester carbonates.

The terms "residues" and "structural units", used in reference to the constituents of the polymers, are synonymous throughout the specification.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

Blended Thermoplastic Polymer Compositions

As briefly described above, The present disclosure relates to blended thermoplastic polymer compositions comprising one or more polycarbonate polymers, one or more thermally conductive fillers, one or more phosphorus-containing flame retardants, and one or more silicone-containing char-forming agents, wherein the blended polymer composition have both excellent thermal conductivity and flame retardance properties.

In various aspects, the disclosure relates to blended thermoplastic compositions comprising (a) from about 20% wt % to about 80% wt % of a polycarbonate polymer; (b) from about 3% wt % to about 30% wt % of a phosphorus-containing flame retardant; (c) from about 10% wt % to about 70% wt % of a filler comprising at least one thermally conductive filler and at least one thermally insulating filler; (d) from about 0% wt % to about 10% wt % of an anti-drip agent; and (e) from about 0% wt % to about 10% wt % of a silicone-containing char-forming agent; wherein the combined weight percent value of all components does not exceed about 100 wt %; and wherein all weight percent values are based on the total weight of the composition.

In a further aspect, the disclosure relates to blended thermoplastic compositions comprising (a) from about 30% wt % to about 70% wt % of a polycarbonate polymer; (b) from about 3% wt % to about 15% wt % of a phosphorus-containing flame retardant; (c) from about 20% wt % to about 50% wt % of a filler comprising at least one thermally conductive filler and at least one thermally insulating filler; (d) from about 0% wt % to about 2% wt % of an anti-drip agent; and (e) from about 0% wt % to about 5% wt % of a silicone-containing char-forming agent; wherein the combined weight percent value of all components does not exceed about 100 wt %; and wherein all weight percent values are based on the total weight of the composition.

In a further aspect, the disclosure relates to blended thermoplastic compositions comprising (a) from about 35% wt % to about 60% wt % of a polycarbonate polymer; (b) from about 3% wt % to about 12% wt % of a phosphorus-containing flame retardant; (c) from about 20% wt % to about 40% wt % of a filler comprising at least one thermally conductive filler and at least one thermally insulating filler; (d) from about 0% wt % to about 1% wt % of an anti-drip agent; and (e) from about 0% wt % to about 1% wt % of a silicone-containing char-forming agent; wherein the combined weight percent value of all components does not exceed about 100 wt %; and wherein all weight percent values are based on the total weight of the composition.

In one aspect, a blended thermoplastic composition comprising: (a) from about 20% wt % to about 80% wt % of a polycarbonate polymer; (b) from about 3% wt % to about 30% wt % of a phosphorus-containing flame retardant; and (c) from about 10% wt % to about 70% wt % of a filler comprising at least one thermally conductive filler and at least one thermally insulating filler; wherein the combined weight percent value of all components does not exceed about 100 wt %; wherein all weight percent values are based on the total weight of the composition; wherein a molded sample of the blended thermoplastic composition is capable of achieving UL94 V0 rating at a thickness of 1.2 mm (±10%); and wherein a molded sample of the blended thermoplastic composition has a through-plane thermal conductivity when determined in accordance with ASTM E1461 of greater than or equal to about 0.4 W/mK.

In a further aspect, the disclosure relates to blended thermoplastic compositions comprising (a) from about 30% wt % to about 70% wt % of a polycarbonate polymer; (b) from about 3% wt % to about 15% wt % of a phosphorus-containing flame retardant; and (c) from about 20% wt % to about 50% wt % of a filler comprising at least one thermally conductive filler and at least one thermally insulating filler; wherein the combined weight percent value of all components does not exceed about 100 wt %; wherein all weight percent values are based on the total weight of the composition; wherein a molded sample of the blended thermoplastic composition is capable of achieving UL94 V0 rating at a thickness of 1.2 mm (±10%); and wherein a molded sample of the blended thermoplastic composition has a through-plane thermal conductivity when determined in accordance with ASTM E1461 of greater than or equal to about 0.4 W/mK.

In a further aspect, the disclosure relates to blended thermoplastic compositions comprising (a) from about 35% wt % to about 60% wt % of a polycarbonate polymer; (b) from about 3% wt % to about 12% wt % of a phosphorus-containing flame retardant; and (c) from about 20% wt % to about 40% wt % of a filler comprising at least one thermally conductive filler and at least one thermally insulating filler; wherein the combined weight percent value of all components does not exceed about 100 wt %; wherein all weight percent values are based on the total weight of the composition; wherein a molded sample of the blended thermoplastic composition is capable of achieving UL94 V0 rating at a thickness of 1.2 mm (±10%); wherein a molded sample of the blended thermoplastic composition has a through-plane thermal conductivity when determined in accordance with ASTM E1461 of greater than or equal to about 0.4 W/mK.

In one aspect, the disclosure relates to blended thermoplastic compositions comprising (a) from about 20% wt % to about 80% wt % of a polycarbonate polymer; (b) from about 3% wt % to about 30% wt % of a phosphorus-containing flame retardant; (c) from about 10% wt % to about 70% wt % of a filler comprising at least one thermally conductive filler and at least one thermally insulating filler; (d) from about 0% wt % to about 10% wt % of an anti-drip agent; and (e) from about 0% wt % to about 10% wt % of a silicone-containing char-forming agent; wherein the combined weight percent value of all components does not exceed about 100 wt %; wherein all weight percent values are based on the total weight of the composition; wherein a molded sample of the blended thermoplastic composition is capable of achieving UL94 V0 rating at a thickness of 1.2 mm (±10%); and wherein a molded sample of the blended thermoplastic composition has a through-plane thermal conductivity when determined in accordance with ASTM E1461 of greater than or equal to about 0.4 W/mK.

In a further aspect, the disclosure relates to blended thermoplastic compositions comprising (a) from about 30% wt % to about 70% wt % of a polycarbonate polymer; (b) from about 3% wt % to about 15% wt % of a phosphorus-containing flame retardant; (c) from about 20% wt % to about 50% wt % of a filler comprising at least one thermally conductive filler and at least one thermally insulating filler; (d) from about 0% wt % to about 2% wt % of an anti-drip agent; and (e) from about 0% wt % to about 5% wt % of a silicone-containing char-forming agent; wherein the combined weight percent value of all components does not exceed about 100 wt %; wherein all weight percent values are based on the total weight of the composition; wherein a molded sample of the blended thermoplastic composition is capable of achieving UL94 V0 rating at a thickness of 1.2 mm (±10%); and wherein a molded sample of the blended thermoplastic composition has a through-plane thermal conductivity when determined in accordance with ASTM E1461 of greater than or equal to about 0.4 W/mK.

In a further aspect, the disclosure relates to blended thermoplastic compositions comprising (a) from about 35% wt % to about 60% wt % of a polycarbonate polymer; (b) from about 3% wt % to about 12% wt % of a phosphorus-containing flame retardant; (c) from about 20% wt % to about 40% wt % of a filler comprising at least one thermally conductive filler and at least one thermally insulating filler; (d) from about 0% wt % to about 1% wt % of an anti-drip agent; and (e) from about 0% wt % to about 1% wt % of a silicone-containing char-forming agent; wherein the combined weight percent value of all components does not exceed about 100 wt %; wherein all weight percent values are based on the total weight of the composition; wherein a molded sample of the blended thermoplastic composition is capable of achieving UL94 V0 rating at a thickness of 1.2 mm (±10%); wherein a molded sample of the blended thermoplastic composition has a through-plane thermal conductivity when determined in accordance with ASTM E1461 of greater than or equal to about 0.4 W/mK.

In a further aspect, the disclosure relates to blended thermoplastic compositions comprising (a) from about 20% wt % to about 80% wt % of a polycarbonate polymer; (b) from about 3% wt % to about 30% wt % of a phosphorus-containing flame retardant; (c) from about 10% wt % to about 70% wt % of a filler comprising at least one thermally conductive filler and at least one thermally insulating filler; (d) from about 0% wt % to about 10% wt % of an anti-drip agent; and (e) from about 0% wt % to about 10% wt % of a silicone-containing char-forming agent; wherein the combined weight percent value of all components does not exceed about 100 wt %; wherein all weight percent values are based on the total weight of the composition; wherein a molded sample of the blended thermoplastic composition is capable of achieving UL94 V0 rating at a thickness of 1.2 mm (±10%); wherein a molded sample of the blended thermoplastic composition has a through-plane thermal conductivity when determined in accordance with ASTM E1461 of greater than or equal to about 0.4 W/mK; and wherein a molded sample of the blended thermoplastic composition has an in-plane thermal conductivity when determined in accordance with ASTM E1461 of greater than or equal to about 1.0 W/mK.

In a further aspect, the disclosure relates to blended thermoplastic compositions comprising (a) from about 30% wt % to about 70% wt % of a polycarbonate polymer; (b) from about 3% wt % to about 15% wt % of a phosphorus-containing flame retardant; (c) from about 20% wt % to about 50% wt % of a filler comprising at least one thermally conductive filler and at least one thermally insulating filler; (d) from about 0% wt % to about 2% wt % of an anti-drip agent; and (e) from about 0% wt % to about 5% wt % of a silicone-containing char-forming agent; wherein the combined weight percent value of all components does not exceed about 100 wt %; wherein all weight percent values are based on the total weight of the composition; wherein a molded sample of the blended thermoplastic composition is capable of achieving UL94 V0 rating at a thickness of 1.2 mm (±10%); wherein a molded sample of the blended thermoplastic composition has a through-plane thermal conductivity when determined in accordance with ASTM E1461 of greater than or equal to about 0.4 W/mK; and wherein a molded sample of the blended thermoplastic composition has an in-plane thermal conductivity when determined in accordance with ASTM E1461 of greater than or equal to about 1.0 W/mK.

In a further aspect, the disclosure relates to blended thermoplastic compositions comprising (a) from about 35% wt % to about 60% wt % of a polycarbonate polymer; (b) from about 3% wt % to about 12% wt % of a phosphorus-containing flame retardant; (c) from about 20% wt % to about 40% wt % of a filler comprising at least one thermally conductive filler and at least one thermally insulating filler; (d) from about 0% wt % to about 1% wt % of an anti-drip agent; and (e) from about 0% wt % to about 1% wt % of a silicone-containing char-forming agent; wherein the combined weight percent value of all components does not exceed about 100 wt %; wherein all weight percent values are based on the total weight of the composition; wherein a molded sample of the blended thermoplastic composition is capable of achieving UL94 V0 rating at a thickness of 1.2 mm (±10%); wherein a molded sample of the blended thermoplastic composition has a through-plane thermal conductivity when determined in accordance with ASTM E1461 of greater than or equal to about 0.4 W/mK; and wherein a molded sample of the blended thermoplastic composition has an in-plane thermal conductivity when determined in accordance with ASTM E1461 of greater than or equal to about 1.0 W/mK.

In a further aspect, the disclosure relates to blended thermoplastic compositions comprising (a) from about 20% wt % to about 80% wt % of a polycarbonate polymer; (b) from about 3% wt % to about 30% wt % of a phosphorus-containing flame retardant; (c) from about 10% wt % to about 70% wt % of a filler comprising at least one thermally conductive filler and at least one thermally insulating filler; (d) from about 0% wt % to about 10% wt % of an anti-drip agent; and (e) from about 0% wt % to about 10% wt % of a silicone-containing char-forming agent; wherein the combined weight percent value of all components does not exceed about 100 wt %; wherein all weight percent values are based on the total weight of the composition; wherein a molded sample of the blended thermoplastic composition is capable of achieving UL94 V0 rating at a thickness of 1.2 mm (±10%); wherein a molded sample of the blended thermoplastic composition has a flame out time (5 bars) when measured in accordance with UL94 testing standards of greater than or equal to about 15 seconds; wherein a molded sample of the blended thermoplastic composition has a through-plane thermal conductivity when determined in accordance with ASTM E1461 of greater than or equal to about 0.4 W/mK; and wherein a molded sample of the blended thermoplastic composition has an in-plane thermal conductivity when determined in accordance with ASTM E1461 of greater than or equal to about 1.0 W/mK.

In a further aspect, the disclosure relates to blended thermoplastic compositions comprising (a) from about 30% wt % to about 70% wt % of a polycarbonate polymer; (b) from about 3% wt % to about 15% wt % of a phosphorus-containing flame retardant; (c) from about 20% wt % to about 50% wt % of a filler comprising at least one thermally conductive filler and at least one thermally insulating filler; (d) from about 0% wt % to about 2% wt % of an anti-drip agent; and (e) from about 0% wt % to about 5% wt % of a silicone-containing char-forming agent; wherein the combined weight percent value of all components does not exceed about 100 wt %; wherein all weight percent values are based on the total weight of the composition; wherein a molded sample of the blended thermoplastic composition is capable of achieving UL94 V0 rating at a thickness of 1.2 mm (±10%); wherein a molded sample of the blended thermoplastic composition has a flame out time (5 bars) when measured in accordance with UL 94 testing standards of greater than or equal to about 15 seconds; wherein a molded sample of the blended thermoplastic composition has a through-plane thermal conductivity when determined in accordance with ASTM E1461 of greater than or equal to about 0.4 W/mK; and wherein a molded sample of the blended thermoplastic composition has an in-plane thermal conductivity when determined in accordance with ASTM E1461 of greater than or equal to about 1.0 W/mK.

In a further aspect, the disclosure relates to blended thermoplastic compositions comprising (a) from about 35% wt % to about 60% wt % of a polycarbonate polymer; (b) from about 3% wt % to about 12% wt % of a phosphorus-containing flame retardant; (c) from about 20% wt % to about 40% wt % of a filler comprising at least one thermally conductive filler and at least one thermally insulating filler; (d) from about 0% wt % to about 1% wt % of an anti-drip agent; and (e) from about 0% wt % to about 1% wt % of a silicone-containing char-forming agent; wherein the combined weight percent value of all components does not exceed about 100 wt %; wherein all weight percent values are based on the total weight of the composition; wherein a molded sample of the blended thermoplastic composition is capable of achieving UL94 V0 rating at a thickness of 1.2 mm (±10%); wherein a molded sample of the blended thermoplastic composition has a flame out time (5 bars) when measured in accordance with UL 94 testing standards of greater than or equal to about 15 seconds; wherein a molded sample of the blended thermoplastic composition has a through-plane thermal conductivity when determined in accordance with ASTM E1461 of greater than or equal to about 0.4 W/mK; and wherein a molded sample of the blended thermoplastic composition has an in-plane thermal conductivity when determined in accordance with ASTM E1461 of greater than or equal to about 1.0 W/mK.

In a further aspect, a molded sample of the blended thermoplastic composition has a through-plane thermal conductivity when determined in accordance with ASTM E1461 of about 0.4 W/mK to about 1.5 W/mK. In a still further aspect, a molded sample of the blended thermoplastic composition has a through-plane thermal conductivity when determined in accordance with ASTM E1461 of about 0.4 W/mK to about 1.0 W/mK. In yet a further aspect, a molded sample of the blended thermoplastic composition has a through-plane thermal conductivity when determined in accordance with ASTM E1461 of about 0.4 W/mK to about 0.8 W/mK. In an even further aspect, a molded sample of the blended thermoplastic composition has an in-plane thermal conductivity when determined in accordance with ASTM E1461 of greater than or equal to about 1.0 W/mK. In a still further aspect, a molded sample of the blended thermoplastic composition has an in-plane thermal conductivity when determined in accordance with ASTM E1461 of about 1.0 W/mK to about 6.0 W/mK. In yet a further aspect, a molded sample of the blended thermoplastic composition has an in-plane thermal conductivity when determined in accordance with ASTM E1461 of about 1.0 W/mK to about 5.0 W/mK. In an even further aspect, a molded sample of the blended thermoplastic composition has an in-plane thermal conductivity when determined in accordance with ASTM E1461 of about 1.0 W/mK to about 3.0 W/mK.

In a further aspect, a molded sample of the blended thermoplastic composition has a flame out time (5 bars) when measured in accordance with UL 94 testing standards of greater than or equal to about 15 seconds. In a still further aspect, a molded sample of the blended thermoplastic composition has a flame out time (5 bars) when measured in accordance with UL 94 testing standards of greater than or equal to about 20 seconds. In yet a further aspect, a molded sample of the blended thermoplastic composition has a flame out time (5 bars) when measured in accordance with UL 94 testing standards of about 15 seconds to about 50 seconds. In an even further aspect, a molded sample of the blended thermoplastic composition has a flame out time (5 bars) when measured in accordance with UL 94 testing standards of about 20 seconds to about 45 seconds. In a still further aspect, a molded sample of the blended thermoplastic composition has a flame out time (5 bars) when measured in accordance with UL 94 testing standards of about 20 seconds to about 40 seconds.

In various aspects, the compositions of the present disclosure further comprise an additive selected from coupling agents, antioxidants, mold release agents, UV absorbers, light stabilizers, heat stabilizers, lubricants, plasticizers, pigments, dyes, colorants, anti-static agents, nucleating agents, anti-drip agents, acid scavengers, and combinations of two or more of the foregoing. In a further aspect, compositions of the present disclosure further comprise at least one additive selected from a flame retardant, a colorant, a primary anti-oxidant, and a secondary anti-oxidant.

Polycarbonate Polymer Component

In one aspect, the disclosed polymer compositions comprise a polycarbonate polymer composition wherein the polycarbonate polymer comprising bisphenol A, a polycarbonate copolymer, polyester carbonate polymer, or polycarbonate-polysiloxane copolymer, or combinations thereof.

In one aspect, a polycarbonate can comprise any polycarbonate material or mixture of materials, for example, as recited in U.S. Pat. No. 7,786,246, which is hereby incorporated in its entirety for the specific purpose of disclosing various polycarbonate compositions and methods. The term polycarbonate can be further defined as compositions have repeating structural units of the formula (1):

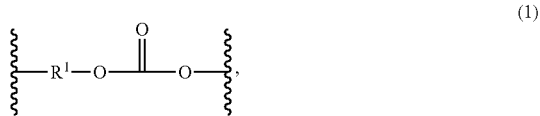

(1)

in which at least 60 percent of the total number of $R^1$ groups are aromatic organic radicals and the balance thereof are aliphatic, alicyclic, or aromatic radicals. In a further aspect, each $R^1$ is an aromatic organic radical and, more preferably, a radical of the formula (2):

$$-A^1-Y^1-A^2- \quad (2),$$

wherein each of $A^1$ and $A^2$ is a monocyclic divalent aryl radical and $Y^1$ is a bridging radical having one or two atoms that separate $A^1$ from $A^2$. In various aspects, one atom separates $A^1$ from $A^2$. For example, radicals of this type include, but are not limited to, radicals such as —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ is preferably a hydrocarbon group or a saturated hydrocarbon group such as methylene, cyclohexylidene, or isopropylidene.

In a further aspect, polycarbonates can be produced by the interfacial reaction of dihydroxy compounds having the formula HO—$R^1$—OH, which includes dihydroxy compounds of formula (3):

$$\text{HO-}A^1\text{-}Y^1\text{-}A^2\text{-OH} \quad (3),$$

wherein $Y^1$, $A^1$ and $A^2$ are as described above. Also included are bisphenol compounds of general formula (4):

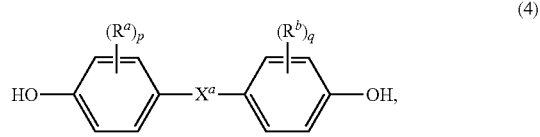

(4)

wherein $R^a$ and $R^b$ each represent a halogen atom or a monovalent hydrocarbon group and can be the same or different; p and q are each independently integers from 0 to 4; and $X^a$ represents one of the groups of formula (5):

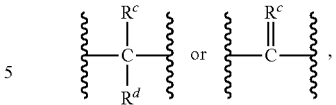

(5)

wherein $R^c$ and $R^d$ each independently represent a hydrogen atom or a monovalent linear or cyclic hydrocarbon group and $R^e$ is a divalent hydrocarbon group.

In various aspects, a heteroatom-containing cyclic alkylidene group comprises at least one heteroatom with a valency of 2 or greater, and at least two carbon atoms. Heteroatoms for use in the heteroatom-containing cyclic alkylidene group include —O—, —S—, and —N(Z)—, where Z is a substituent group selected from hydrogen, hydroxy, $C_{1-12}$ alkyl, $C_{1-12}$ alkoxy, or $C_{1-12}$ acyl. Where present, the cyclic alkylidene group or heteroatom-containing cyclic alkylidene group can have 3 to 20 atoms, and can be a single saturated or unsaturated ring, or fused polycyclic ring system wherein the fused rings are saturated, unsaturated, or aromatic.

In various aspects, examples of suitable dihydroxy compounds include the dihydroxy-substituted hydrocarbons disclosed by name or formula (generic or specific) in U.S. Pat. No. 4,217,438. A nonexclusive list of specific examples of suitable dihydroxy compounds includes the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, 2,7-dihydroxycarbazole, 3,3-bis(4-hydroxyphenyl)phthalimidine, 2-phenyl-3,3-bis-(4- hydroxyphenyl)phthalimidine (PPPBP), and the like, as well as mixtures including at least one of the foregoing dihydroxy compounds.

In a further aspect, examples of the types of bisphenol compounds that can be represented by formula (3) includes 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl) propane, 1,1-bis(4-hydroxyphenyl) n-butane, 2,2-bis(4-hydroxy-1-methylphenyl)propane, and 1,1-bis(4-hydroxy-t-butylphenyl)propane. Combinations including at least one of the foregoing dihydroxy compounds can also be used.

In various further aspects, bisphenols containing substituted or unsubstituted cyclohexane units can be used, for example bisphenols of formula (6):

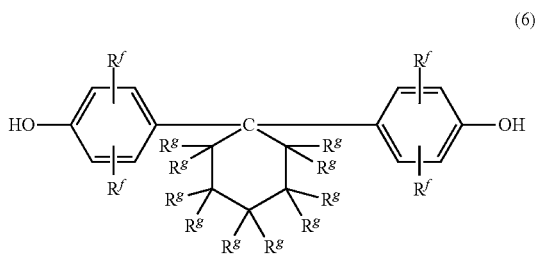

(6)

wherein each $R^f$ is independently hydrogen, $C_{1-12}$ alkyl, or halogen; and each $R^g$ is independently hydrogen or $C_{1-12}$ alkyl. The substituents can be aliphatic or aromatic, straight chain, cyclic, bicyclic, branched, saturated, or unsaturated. Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol containing polycarbonates, or a combination comprising at least one of the foregoing with other bisphenol polycarbonates, are supplied by Bayer Co. under the APEC® trade name.

In further aspects, additional useful dihydroxy compounds are those compounds having the formula HO—$R^1$—OH include aromatic dihydroxy compounds of formula (7):

(7)

wherein each $R^b$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine.

In addition to the polycarbonates described above, combinations of the polycarbonate, with other thermoplastic; polymers, for example combinations of homopolycarbonates and/or polycarbonate copolymers, can be used.

In various aspects, a polycarbonate can employ two or more different dihydroxy compounds or a copolymer of a dihydroxy compounds with a glycol or with a hydroxy- or acid-terminated polyester or with a dibasic acid or hydroxy acid in the event a carbonate copolymer rather than a homopolymer is desired for use. Polyarylates and polyester-carbonate resins or their blends can also be employed. Branched polycarbonates are also useful, as well as blends of linear polycarbonate and a branched polycarbonate. The branched polycarbonates can be prepared by adding a branching agent during polymerization.

In a further aspect, the branching agents include polyfunctional organic compounds containing at least three functional groups selected from hydroxyl, carboxyl, carboxylic anhydride, haloformyl, and mixtures thereof. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of from 0.05-2.0 weight percent. Branching agents and procedures for making branched polycarbonates are described in U.S. Pat. Nos. 3,635,895 and 4,001,184. All types of polycarbonate end groups are contemplated as being useful in the thermoplastic composition.

In a further aspect, the polycarbonate can be a linear homopolymer derived from bisphenol A, in which each of $A^1$ and $A^2$ is p-phenylene and $Y^1$ is isopropylidene. The polycarbonates generally can have an intrinsic viscosity, as determined in chloroform at 25° C., of 0.3 to 1.5 deciliters per gram (dl/g), specifically 0.45 to 1.0 dl/g. The polycarbonates can have a weight average molecular weight (W) of 10,000 to 100,000 g/mol, as measured by gel permeation chromatography (GPC) using a crosslinked styrene-divinyl benzene column, at a sample concentration of 1 milligram per milliliter, and as calibrated with polycarbonate standards. In a yet further aspect, the polycarbonate has a Mw of about 15,000 to about 55,000. In an even further aspect, the polycarbonate has a Mw of about 18,000 to about 40,000.

In a further aspect, a polycarbonate component used in the formulations of the present disclosure can have a melt volume flow rate (often abbreviated MVR) measures the rate of extrusion of a thermoplastics through an orifice at a prescribed temperature and load. Polycarbonates useful for the formation of articles can have an MVR, measured at 300° C. under a load of 1.2 kg according to ASTM D1238-04 or ISO 1133, of 0.5 to 80 cubic centimeters per 10 minutes (cc/10 min). In a still further aspect, the polycarbonate component comprises a two polycarbonate polymers wherein one of the polycarbonate polymers is a poly(aliphatic ester)-polycarbonate. In cases where the polycarbonate components comprises non-poly(aliphatic ester)-polycarbonate and a poly(aliphatic ester)-polycarbonate, the non-poly(aliphatic ester)-polycarbonate (or a combination of such polycarbonates) can have a MVR measured at 300° C. under a load of 1.2 kg according to ASTM D1238-04 or ISO 1133, of 45 to 75 cc/10 min, specifically 50 to 70 cc/10 min, and more specifically 55 to 65 cc/10 min.

Polycarbonates, including isosorbide-based polyester-polycarbonate, can comprise copolymers comprising carbonate units and other types of polymer units, including ester units, and combinations comprising at least one of homopolycarbonates and copolycarbonates. An exemplary polycarbonate copolymer of this type is a polyester carbonate, also known as a polyester-polycarbonate or polyester carbonate. Such copolymers further contain carbonate units derived from oligomeric ester-containing dihydroxy compounds (also referred to herein as hydroxy end-capped oligomeric acrylate esters).

In various further aspects, "polycarbonates" and "polycarbonate resins" as used herein further include homopolycarbonates, copolymers comprising different $R^1$ moieties in the carbonate (referred to herein as "copolycarbonates"), copolymers comprising carbonate units and other types of polymer units, such as ester units, polysiloxane units, and combinations comprising at least one of homopolycarbonates and copolycarbonates. As used herein, "combination" is inclusive of blends, mixtures, alloys, reaction products, and the like. A specific type of copolymer is a polyester carbonate, also known as a polyester-polycarbonate. Such copolymers further contain, in addition to recurring carbonate chain units of the formula (1), units of formula (8):

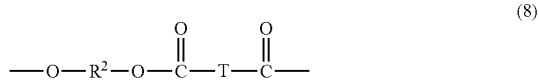

(8)

wherein $R^2$ is a divalent group derived from a dihydroxy compound, and can be, for example, a $C_{2-10}$ alkylene group, a $C_{6-20}$ alicyclic group, a $C_{6-20}$ aromatic group or a polyoxyalkylene group in which the alkylene groups contain 2 to about 6 carbon atoms, specifically 2, 3, or 4 carbon atoms; and T is a divalent group derived from a dicarboxylic acid (aliphatic, aromatic, or alkyl aromatic), and can be, for example, a $C_{4-18}$ aliphatic group, a $C_{6-20}$ alkylene group, a $C_{6-20}$ alkylene group, a $C_{6-20}$ alicyclic group, a $C_{6-20}$ alkyl aromatic group, or a $C_{6-20}$ aromatic group. $R^2$ can be is a $C_{2-30}$ alkylene group having a straight chain, branched chain, or cyclic (including polycyclic) structure. Alternatively, $R^2$ can be derived from an aromatic dihydroxy compound of formula (4) above, or from an aromatic dihydroxy compound of formula (7) above.

Examples of aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Examples of specific dicarboxylic acids are terephthalic acid, isophthalic acid, naphthalene dicarboxylic acid, cyclohexane dicarboxylic acid, or combinations thereof. In various aspects, an example of a specific dicarboxylic acid comprises a combination of isophthalic acid and terephthalic acid wherein the weight ratio of isophthalic acid to terephthalic acid is about 91:9 to about 2:98. In another aspect, $R^2$ is a $C_{2-6}$ alkylene group and T is p-phenylene, m-phenylene, naphthalene, a divalent cycloaliphatic group, or a combination thereof. This class of polyester includes the poly(alkylene terephthalates).

The molar ratio of ester units to carbonate units in the copolymers can vary broadly, for example 1:99 to 99:1, specifically 10:90 to 90:10, more specifically 25:75 to 75:25, depending on the desired properties of the final composition.

In a further aspect, the thermoplastic composition comprises a polyester-polycarbonate copolymer, and specifically a polyester-polycarbonate copolymer in which the ester units of formula (8) comprise soft block ester units, also referred to herein as aliphatic dicarboxylic acid ester units. Such a polyester-polycarbonate copolymer comprising soft block ester units is also referred to herein as a poly(aliphatic ester)-polycarbonate. The soft block ester unit can be a $C_{6-20}$ aliphatic dicarboxylic acid ester unit (where $C_{6-20}$ includes the terminal carboxyl groups), and can be straight chain (i.e., unbranched) or branched chain dicarboxylic acids, cycloalkyl or cycloalkylidene-containing dicarboxylic acids units, or combinations of these structural units. In a still further aspect,
the $C_{6-20}$ aliphatic dicarboxylic acid ester unit includes a straight chain alkylene group comprising methylene ($-CH_2-$) repeating units. In a yet further aspect, a useful soft block ester unit comprises units of formula (8a):

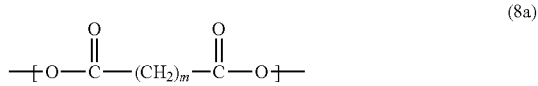

(8a)

where m is 4 to 18. In a further aspect of formula (8a), m is 8 to 10. The poly(aliphatic ester)-polycarbonate can include less than or equal to 25 wt % of the soft block unit. In a still further aspect, a poly(aliphatic ester)-polycarbonate comprises units of formula (8a) in an amount of 0.5 to 10 wt %, specifically 1 to 9 wt %, and more specifically 3 to 8 wt %, based on the total weight of the poly(aliphatic ester)-polycarbonate.

The poly(aliphatic ester)-polycarbonate is a copolymer of soft block ester units and carbonate units. The poly(aliphatic ester)-polycarbonate is shown in formula (8b):

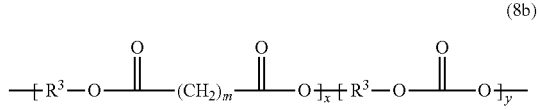

(8b)

where each $R^3$ is independently derived from a dihydroxyaromatic compound of formula (4) or (7), m is 4 to 18, and x and y each represent average weight percentages of the poly(aliphatic ester)-polycarbonate where the average weight percentage ratio x:y is 10:90 to 0.5:99.5, specifically 9:91 to 1:99, and more specifically 8:92 to 3:97, where x+y is 100.

Soft block ester units, as defined herein, can be derived from an alpha, omega $C_{6-20}$ aliphatic dicarboxylic acid or a reactive derivative thereof. In a further aspect, the soft block ester units can be derived from an alpha, omega $C_{10-12}$ aliphatic dicarboxylic acid or a reactive derivative thereof. In a still further aspect, the carboxylate portion of the aliphatic ester unit of formula (8a), in which the terminal carboxylate groups are connected by a chain of repeating methylene ($-CH_2-$) units (where m is as defined for formula (8a)), is derived from the corresponding dicarboxylic acid or reactive derivative thereof, such as the acid halide (specifically, the acid chloride), an ester, or the like. Exemplary alpha, omega dicarboxylic acids (from which the corresponding acid chlorides can be derived) include alpha, omega $C_6$ dicarboxylic acids such as hexanedioic acid (also referred to as adipic acid); alpha, omega $C_{10}$ dicarboxylic acids such as decanedioic acid (also referred to as sebacic acid); and alpha, omega $C_{12}$ dicarboxylic acids such as dodecanedioic acid (sometimes abbreviated as DDDA). It will be appreciated that the aliphatic dicarboxylic acid is not limited to these exemplary carbon chain lengths, and that other chain lengths within the $C_{6-20}$ limitation can be used. In various further aspects, the poly(aliphatic ester)-polycarbonate having soft block ester units comprising a straight chain methylene group and a bisphenol A polycarbonate group is shown in formula (8c):

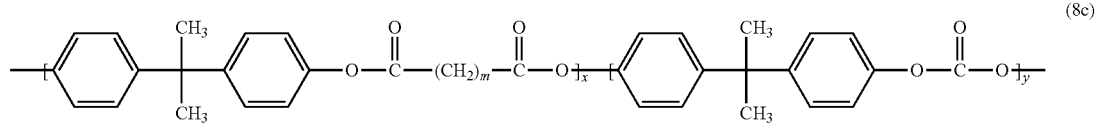

(8c)

where m is 4 to 18 and x and y are as defined for formula (8b). In a specific exemplary aspect, a useful poly(aliphatic ester)-polycarbonate copolymer comprises sebacic acid ester units and bisphenol A carbonate units (formula (8c), where m is 8, and the average weight ratio of x:y is 6:94).

Desirably, the poly(aliphatic ester)-polycarbonate has a glass transition temperature (Tg) of 110 to 145° C., specifically 115 to 145° C., more specifically 120 to 145° C., more specifically 128 to 139° C., and still more specifically 130 to 139° C.

In one aspect, polycarbonates, including polyester-polycarbonates, can be manufactured by processes such as interfacial polymerization and melt polymerization.

The polycarbonate compounds and polymers disclosed herein can, in various aspects, be prepared by a melt polymerization process. Generally, in the melt polymerization process, polycarbonates are prepared by co-reacting, in a molten state, the dihydroxy reactant(s) (i.e., isosorbide, aliphatic diol and/or aliphatic diacid, and any additional dihydroxy compound) and a diaryl carbonate ester, such as diphenyl carbonate, or more specifically in an aspect, an activated carbonate such as bis(methyl salicyl)carbonate, in the presence of a transesterification catalyst. The reaction can be carried out in typical polymerization equipment, such as one or more continuously stirred reactors (CSTRs), plug flow reactors, wire wetting fall polymerizers, free fall polymerizers, wiped film polymerizers, BANBURY® mixers, single or twin screw extruders, or combinations of the foregoing. In one aspect, volatile monohydric phenol can be removed from the molten reactants by distillation and the polymer is isolated as a molten residue.

The melt polymerization can include a transesterification catalyst comprising a first catalyst, also referred to herein as an alpha catalyst, comprising a metal cation and an anion. In an aspect, the cation is an alkali or alkaline earth metal comprising Li, Na, K, Cs, Rb, Mg, Ca, Ba, Sr, or a combination comprising at least one of the foregoing. The anion is hydroxide (OFF), superoxide ($O^{2-}$), thiolate ($HS^-$), sulfide ($S^{2-}$), a $C_{1-20}$ alkoxide, a $C_{6-20}$ aryloxide, a $C_{1-20}$ carboxylate, a phosphate including biphosphate, a $C_{1-20}$ phosphonate, a sulfate including bisulfate, sulfites including bisulfites and metabisulfites, a $C_{1-20}$ sulfonate, a carbonate including bicarbonate, or a combination comprising at least one of the foregoing. In another aspect, salts of an organic acid comprising both alkaline earth metal ions and alkali metal ions can also be used. Salts of organic acids useful as catalysts are illustrated by alkali metal and alkaline earth metal salts of formic acid, acetic acid, stearic acid and ethylenediaminetetraacetic acid. The catalyst can also comprise the salt of a non-volatile inorganic acid. By "nonvolatile", it is meant that the referenced compounds have no appreciable vapor pressure at ambient temperature and pressure. In particular, these compounds are not volatile at temperatures at which melt polymerizations of polycarbonate are typically conducted. The salts of nonvolatile acids are alkali metal salts of phosphites; alkaline earth metal salts of phosphites; alkali metal salts of phosphates; and alkaline earth metal salts of phosphates. Exemplary transesterification catalysts include, lithium hydroxide, sodium hydroxide, potassium hydroxide, cesium hydroxide, magnesium hydroxide, calcium hydroxide, barium hydroxide, lithium formate, sodium formate, potassium formate, cesium formate, lithium acetate, sodium acetate, potassium acetate, lithium carbonate, sodium carbonate, potassium carbonate, lithium methoxide, sodium methoxide, potassium methoxide, lithium ethoxide, sodium ethoxide, potassium ethoxide, lithium phenoxide, sodium phenoxide, potassium phenoxide, sodium sulfate, potassium sulfate, $NaH_2PO_3$, $NaH_2PO_4$, $Na_2H_2PO_3$, $KH_2PO_4$, $CsH_2PO_4$, $Cs_2H_2PO_4$, $Na_2SO_3$, $Na_2S_2O_5$, sodium mesylate, potassium mesylate, sodium tosylate, potassium tosylate, magnesium disodium ethylenediamine tetraacetate (EDTA magnesium disodium salt), or a combination comprising at least one of the foregoing. It will be understood that the foregoing list is exemplary and should not be considered as limited thereto. In one aspect, the transesterification catalyst is an alpha catalyst comprising an alkali or alkaline earth salt. In an exemplary aspect, the transesterification catalyst comprising sodium hydroxide, potassium hydroxide, sodium carbonate, potassium carbonate, sodium methoxide, potassium methoxide, $NaH_2PO_4$, or a combination comprising at least one of the foregoing.

The amount of alpha catalyst can vary widely according to the conditions of the melt polymerization, and can be about 0.001 to about 500 μmol. In an aspect, the amount of alpha catalyst can be about 0.01 to about 20 μmol, specifically about 0.1 to about 10 μmol, more specifically about 0.5 to about 9 μmol, and still more specifically about 1 to about 7 μmol, per mole of aliphatic diol and any other dihydroxy compound present in the melt polymerization.

In another aspect, a second transesterification catalyst, also referred to herein as a beta catalyst, can optionally be included in the melt polymerization process, provided that the inclusion of such a second transesterification catalyst does not significantly adversely affect the desirable properties of the polycarbonate. Exemplary transesterification catalysts can further include a combination of a phase transfer catalyst of formula $(R^3)_4Q^+X$ above, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalyst salts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. Examples of such transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing. Other melt transesterification catalysts include alkaline earth metal salts or alkali metal salts. In various aspects, where a beta catalyst is desired, the beta catalyst can be present in a molar ratio, relative to the alpha catalyst, of less than or equal to 10, specifically less than or equal to 5, more specifically less than or equal to 1, and still more specifically less than or equal to 0.5. In other aspects, the melt polymerization reaction disclosed herein uses only an alpha catalyst as described hereinabove, and is substantially free of any beta catalyst. As defined herein, "substantially free of" can mean where the beta catalyst has been excluded from the melt polymerization reaction. In one aspect, the beta catalyst is present in an amount of less than about 10 ppm, specifically less than 1 ppm, more specifically less than about 0.1 ppm, more specifically less than or equal to about 0.01 ppm, and more specifically less than or equal to about 0.001 ppm, based on the total weight of all components used in the melt polymerization reaction.

In one aspect, an end-capping agent (also referred to as a chain-stopper) can optionally be used to limit molecular weight growth rate, and so control molecular weight in the polycarbonate. Exemplary chain-stoppers include certain monophenolic compounds (i.e., phenyl compounds having a single free hydroxy group), monocarboxylic acid chlorides, and/or monochloroformates. Phenolic chain-stoppers are exemplified by phenol and $C_1$-$C_{22}$ alkyl-substituted phenols such as p-cumyl-phenol, resorcinol monobenzoate, and p- and tertiary-butyl phenol, cresol, and monoethers of diphenols, such as p-methoxyphenol. Alkyl-substituted phenols with branched chain alkyl substituents having 8 to 9 carbon atoms can be specifically mentioned.

In another aspect, endgroups can be derived from the carbonyl source (i.e., the diaryl carbonate), from selection of monomer ratios, incomplete polymerization, chain scission, and the like, as well as any added end-capping groups, and can include derivatizable functional groups such as hydroxy groups, carboxylic acid groups, or the like. In one aspect, the endgroup of a polycarbonate, including a polycarbonate polymer as defined herein, can comprise a structural unit derived from a diaryl carbonate, where the structural unit can be an endgroup. In a further aspect, the endgroup is derived from an activated carbonate. Such endgroups can be derived from the transesterification reaction of the alkyl ester of an appropriately substituted activated carbonate, with a hydroxy group at the end of a polycarbonate polymer chain, under conditions in which the hydroxy group reacts with the ester carbonyl from the activated carbonate, instead of with the carbonate carbonyl of the activated carbonate. In this way, structural units derived from ester containing compounds or substructures derived from the activated carbonate and present in the melt polymerization reaction can form ester endgroups.

In one aspect, the melt polymerization reaction can be conducted by subjecting the reaction mixture to a series of temperature-pressure-time protocols. In some aspects, this involves gradually raising the reaction temperature in stages while gradually lowering the pressure in stages. In one aspect, the pressure is reduced from about atmospheric pressure at the start of the reaction to about 1 millibar (100 Pa) or lower, or in another aspect to 0.1 millibar (10 Pa) or lower in several steps as the reaction approaches completion. The temperature can be varied in a stepwise fashion beginning at a temperature of about the melting temperature of the reaction mixture and subsequently increased to final temperature. In one aspect, the reaction mixture is heated from room temperature to about 150° C. In such an aspect, the polymerization reaction starts at a temperature of about 150° C. to about 220° C. In another aspect, the polymerization temperature can be up to about 220° C. In other aspects, the polymerization reaction can then be increased to about 250° C. and then optionally further increased to a temperature of about 320° C., and all subranges there between. In one aspect, the total reaction time can be from about 30 minutes to about 200 minutes and all subranges there between. This procedure will generally ensure that the reactants react to give polycarbonates with the desired molecular weight, glass transition temperature and physical properties. The reaction proceeds to build the polycarbonate chain with production of ester-substituted alcohol by-product such as methyl salicylate. In one aspect, efficient removal of the by-product can be achieved by different techniques such as reducing the pressure. Generally the pressure starts relatively high in the beginning of the reaction and is lowered progressively throughout the reaction and temperature is raised throughout the reaction.

In one aspect, the progress of the reaction can be monitored by measuring the melt viscosity or the weight average molecular weight of the reaction mixture using techniques known in the art such as gel permeation chromatography. These properties can be measured by taking discrete samples or can be measured on-line. After the desired melt viscosity and/or molecular weight is reached, the final polycarbonate product can be isolated from the reactor in a solid or molten form. It will be appreciated by a person skilled in the art, that the method of making aliphatic homopolycarbonate and aliphatic-aromatic copolycarbonates as described in the preceding sections can be made in a batch or a continuous process and the process disclosed herein is preferably carried out in a solvent free mode. Reactors chosen should ideally be self-cleaning and should minimize any "hot spots." However, vented extruders similar to those that are commercially available can be used.

Polycarbonates, including polyester-polycarbonates, can be also be manufactured by interfacial polymerization. Although the reaction conditions for interfacial polymerization can vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like.

Carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an exemplary aspect, an interfacial polymerization reaction to form carbonate linkages uses phosgene as a carbonate precursor, and is referred to as a phosgenation reaction.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Useful phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. An effective amount of a phase transfer catalyst can be about 0.1 to about 10 wt % based on the weight of bisphenol in the phosgenation mixture. In another aspect, an effective amount of phase transfer catalyst can be about 0.5 to about 2 wt % based on the weight of bisphenol in the phosgenation mixture.

All types of polycarbonate end groups are contemplated as being useful in the polycarbonate composition, provided that such end groups do not significantly adversely affect desired properties of the compositions.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl)phenol), 4-chloroformyl phthalic anhydride, trimesic acid, and benzophenone tetracarboxylic acid. The branching agents can be added at a level of about 0.05 to about 2.0 wt %. Mixtures comprising linear polycarbonates and branched polycarbonates can be used.

A chain stopper (also referred to as a capping agent) can be included during polymerization. The chain stopper limits molecular weight growth rate, and so controls molecular weight in the polycarbonate. Exemplary chain stoppers include certain mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom can be specifically mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides can also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to about 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Specifically, polyester-polycarbonates, including the poly(aliphatic ester)-polycarbonates, can be prepared by interfacial polymerization. Rather than utilizing the dicarboxylic acid (such as the alpha, omega $C_{6-20}$ aliphatic dicarboxylic acid) per se, it is possible, and sometimes even preferred, to employ the reactive derivatives of the dicarboxylic acid, such as the corresponding dicarboxylic acid halides, and in particular the acid dichlorides and the acid dibromides. Thus, for example instead of using isophthalic acid, terephthalic acid, or a combination comprising at least one of the foregoing (for poly(arylate ester)-polycarbonates), it is possible to employ isophthaloyl dichloride, terephthaloyl dichloride, and a combination comprising at least one of the foregoing. Similarly, for the poly(aliphatic ester)-polycarbonates, it is possible, and even desirable, to use for example acid chloride derivatives such as a $C_6$ dicarboxylic acid chloride (adipoyl chloride), a $C_{10}$ dicarboxylic acid chloride (sebacoyl chloride), or a $C_{12}$ dicarboxylic acid chloride (dodecanedioyl chloride). The dicarboxylic acid or reactive derivative can be condensed with the dihydroxyaromatic compound in a first condensation, followed by in situ phosgenation to generate the carbonate linkages with the dihydroxyaromatic compound. Alternatively, the dicarboxylic acid or derivative can be condensed with the dihydroxyaromatic compound simultaneously with phosgenation.

In an aspect, where the melt volume rate of an otherwise compositionally suitable poly(aliphatic ester)-polycarbonate is not suitably high, i.e., where the MVR is less than 13 cc/10 min when measured at 250° C., under a load of 1.2 kg, the poly(aliphatic ester)-polycarbonate can be modified to provide a reaction product with a higher flow (i.e., greater than or equal to 13 cc/10 min when measured at 250° C., under a load of 1.2 kg), by treatment using a redistribution catalyst under conditions of reactive extrusion. During reactive extrusion, the redistribution catalyst is typically included in small amounts of less than or equal to 400 ppm by weight, by injecting a dilute aqueous solution of the redistribution catalyst into the extruder being fed with the poly(aliphatic ester)-polycarbonate.

In a further aspect, the redistribution-catalyst is a tetraalkylphosphonium hydroxide, tetraalkylphosphonium alkoxide, tetraalkylphosphonium aryloxide, a tetraalkylphosphonium carbonate, a tetraalkylammonium hydroxide, a tetraalkylammonium carbonate, a tetraalkylammonium phosphite, a tetraalkylammonium acetate, or a combination comprising at least one of the foregoing catalysts, wherein each alkyl is independently a $C_{1-6}$ alkyl. In a specific aspect, a useful redistribution catalyst is a tetra $C_{1-6}$ alkylphosphonium hydroxide, $C_{1-6}$ alkyl phosphonium phenoxide, or a combination comprising one or more of the foregoing catalysts. An exemplary redistribution catalyst is tetra-n-butylphosphonium hydroxide.

In a further aspect, the redistribution catalyst is present in an amount of 40 to 120 ppm, specifically 40 to 110 ppm, and more specifically 40 to 100 ppm, by weight based on the weight of the poly(aliphatic ester)-polycarbonate.

Polycarbonates as broadly defined above can further include blends of the above polycarbonates with polyesters. Useful polyesters can include, for example, polyesters having repeating units of formula (8), which include poly(alkylene dicarboxylates), liquid crystalline polyesters, and polyester copolymers. The polyesters described herein are generally completely miscible with the polycarbonates when blended.

Such polyesters generally include aromatic polyesters, poly(alkylene esters) including poly(alkylene arylates), and poly(cycloalkylene diesters). Aromatic polyesters can have a polyester structure according to formula (8), wherein D and T are each aromatic groups as described hereinabove. In an aspect, useful aromatic polyesters can include, for example, poly(isophthalate-terephthalate-resorcinol)esters, poly(isophthalate-terephthalate-bisphenol A)esters, poly[(isophthalate-terephthalate-resorcinol)ester-co-(isophthalate-terephthalate-bisphenol A)]ester, or a combination comprising at least one of these. Also contemplated are aromatic polyesters with a minor amount, e.g., about 0.5 to about 10 wt %, based on the total weight of the polyester, of units derived from an aliphatic diacid and/or an aliphatic polyol to make copolyesters. Poly(alkylene arylates) can have a polyester structure according to formula (8), wherein T comprises groups derived from aromatic dicarboxylates, cycloaliphatic dicarboxylic acids, or derivatives thereof. Examples of specifically useful T groups include 1,2-, 1,3-, and 1,4-phenylene; 1,4- and 1,5-naphthylenes; cis- or trans-1,4-cyclohexylene; and the like. Specifically, where T is 1,4-phenylene, the poly(alkylene arylate) is a poly(alkylene terephthalate). In addition, for poly(alkylene arylate), specifically useful alkylene groups D include, for example, ethylene, 1,4-butylene, and bis-(alkylene-disubstituted cyclohexane) including cis- and/or trans-1,4-(cyclohexylene) dimethylene. Examples of poly(alkylene terephthalates) include poly(ethylene terephthalate) (PET), poly(1,4-butylene terephthalate) (PBT), and poly(propylene terephthalate) (PPT). Also useful are poly(alkylene naphthoates), such as poly(ethylene naphthanoate) (PEN), and poly(butylene naphthanoate) (PBN). A useful poly(cycloalkylene diester) is poly (cyclohexanedimethylene terephthalate) (PCT). Combinations comprising at least one of the foregoing polyesters can also be used.

Copolymers comprising alkylene terephthalate repeating ester units with other ester groups can also be useful. Useful ester units can include different alkylene terephthalate units, which can be present in the polymer chain as individual units, or as blocks of poly(alkylene terephthalates). Specific examples of such copolymers include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s can also include poly(alkylene cyclohexanedicarboxylate)s. Of these, a specific example is poly(1,4-cyclohexanedimethanol-1,4-cyclohexanedicarboxylate) (PCCD), having recurring units of formula (9):

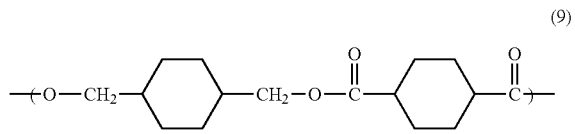

wherein, as described using formula (8), $R^2$ is a 1,4-cyclohexanedimethylene group derived from 1,4-cyclohexanedimethanol, and T is a cyclohexane ring derived from cyclohexanedicarboxylate or a chemical equivalent thereof, and can comprise the cis-isomer, the trans-isomer, or a combination comprising at least one of the foregoing isomers.

The polyesters can be obtained by interfacial polymerization or melt-process condensation as described above, by solution phase condensation, or by transesterification polymerization wherein, for example, a dialkyl ester such as dimethyl terephthalate can be transesterified with ethylene glycol using acid catalysis, to generate poly(ethylene terephthalate). It is possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition.

Polyester-polycarbonate copolymers generally can have a weight average molecular weight (Mw) of 1,500 to 100,000 g/mol, specifically 1,700 to 50,000 g/mol. In an aspect, poly(aliphatic ester)-polycarbonates have a molecular weight of 15,000 to 45,000 g/mol, specifically 17,000 to 40,000 g/mol, more specifically 20,000 to 30,000 g/mol, and still more specifically 20,000 to 25,000 g/mol. Molecular weight determinations are performed using gel permeation chromatography (GPC), using a crosslinked styrene-divinylbenzene column and calibrated to polycarbonate references. Samples are prepared at a concentration of about 1 mg/ml, and are eluted at a flow rate of about 1.0 ml/min.

A polyester-polycarbonate can in general have an MVR of about 5 to about 150 cc/10 min., specifically about 7 to about 125 cc/10 min, more specifically about 9 to about 110 cc/10 min, and still more specifically about 10 to about 100 cc/10 min., measured at 300° C. and a load of 1.2 kilograms according to ASTM D1238-04 or ISO 1133. Commercial polyester blends with polycarbonate are marketed under the trade name XYLEX®, including for example XYLEX® X7300, and commercial polyester-polycarbonates are marketed under the trade name LEXAN® SLX polymers, including for example LEXAN® SLX-9000, and are available from SABIC Innovative Plastics (formerly GE Plastics).

In an aspect, poly(aliphatic ester)-polycarbonates have an MVR of about 13 to about 25 cc/10 min, and more specifically about 15 to about 22 cc/10 min, measured at 250° C. and under a load of 1.2 kilograms and a dwell time of 6 minutes, according to ASTM D1238-04. Also in an aspect, poly(aliphatic ester)-polycarbonates have an MVR of about 13 to about 25 cc/10 min, and more specifically about 15 to about 22 cc/10 min, measured at 250° C. and under a load of 1.2 kilograms and a dwell time of 4 minutes, according to ISO 1133.

In an aspect, the thermoplastic composition comprises poly(aliphatic ester)-polycarbonate in an amount of 50 to 100 wt %, based on the total weight of poly(aliphatic ester)-polycarbonate and any added polycarbonate. In a specific aspect, the thermoplastic composition comprises only poly(aliphatic ester)-polycarbonate. In another specific aspect, the thermoplastic comprises poly(aliphatic ester)-polycarbonate that has been reactively extruded to form a reaction product. In another specific aspect, the thermoplastic comprises a blend of poly(aliphatic ester)-polycarbonate that has been reactively extruded.

Polycarbonates, as defined above, also include a polysiloxane-polycarbonate copolymer. The polysiloxane (also referred to herein as "polydiorganosiloxane") blocks of the copolymer comprise repeating siloxane units (also referred to herein as "diorganosiloxane units") of formula (10):

wherein each occurrence of R is same or different, and is a $C_{1-13}$ monovalent organic radical. For example, R can independently be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ arylalkyl group, $C_7$-$C_{13}$ arylalkoxy group, $C_7$-$C_{13}$ alkylaryl group, or $C_7$-$C_{13}$ alkylaryloxy group. The foregoing groups can be fully or partially halogenated with fluorine, chlorine, bromine, or iodine, or a combination thereof. Combinations of the foregoing R groups can be used in the same copolymer.

The value of D in formula (10) can vary widely depending on the type and relative amount of each component in the thermoplastic composition, the desired properties of the composition, and like considerations. Generally, D can have an average value of 2 to 1,000, specifically 2 to 500, more specifically 5 to 100. In some applications, D can have an average value of 30 to 60. An exemplary siloxane block can have an average D value of 45.

Where D is of a lower value, e.g., less than 40, it can be desirable to use a relatively larger amount of the polycarbonate-polysiloxane copolymer. Conversely, where D is of a higher value, e.g., greater than 40, it can be necessary to use a relatively lower amount of the polycarbonate-polysiloxane copolymer.

A combination of a first and a second (or more) polysiloxane-polycarbonate copolymer can be used, wherein the average value of D of the first copolymer is less than the average value of D of the second copolymer.

In one aspect, the polydiorganosiloxane blocks are provided by repeating structural units of formula (11):

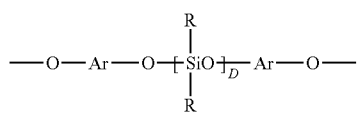
(11)

wherein D is as defined above; each R can independently be the same or different, and is as defined above; and each Ar can independently be the same or different, and is a substituted or unsubstituted $C_6$-$C_{30}$ arylene radical, wherein the bonds are directly connected to an aromatic moiety. Useful Ar groups in formula (11) can be derived from a $C_6$-$C_{30}$ dihydroxyarylene compound, for example a dihydroxyarylene compound of formula (3), (4), or (7) above. Combinations comprising at least one of the foregoing dihydroxyarylene compounds can also be used. Specific examples of dihydroxyarylene compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulphide), and 1,1-bis(4-hydroxy-t-butylphenyl)propane. Combinations comprising at least one of the foregoing dihydroxy compounds can also be used.

Units of formula (11) can be derived from the corresponding dihydroxy compound of formula (12):

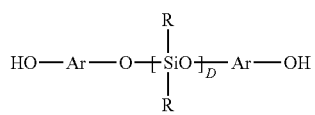
(12)

wherein R, Ar, and D are as described above. Compounds of formula (12) can be obtained by the reaction of a dihydroxyarylene compound with, for example, an alpha, omega-bisacetoxypolydiorangonosiloxane under phase transfer conditions.

In another aspect, polydiorganosiloxane blocks comprise units of formula (13):

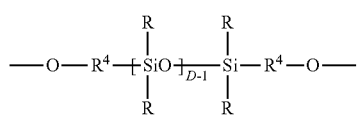
(13)

wherein R and D are as described above, and each occurrence of $R^4$ is independently a divalent $C_1$-$C_{30}$ alkylene, and wherein the polymerized polysiloxane unit is the reaction residue of its corresponding dihydroxy compound. In a specific aspect, the polydiorganosiloxane blocks are provided by repeating structural units of formula (14):

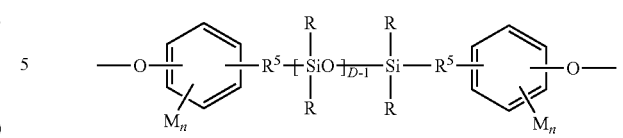
(14)

wherein R and D are as defined above. Each $R^5$ in formula (14) is independently a divalent $C_2$-$C_8$ aliphatic group. Each M in formula (14) can be the same or different, and can be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ arylalkyl, $C_7$-$C_{12}$ arylalkoxy, $C_7$-$C_{12}$ alkylaryl, or $C_7$-$C_{12}$ alkylaryloxy, wherein each n is independently 0, 1, 2, 3, or 4.

In one aspect, M is bromo or chloro, an alkyl group such as methyl, ethyl, or propyl, an alkoxy group such as methoxy, ethoxy, or propoxy, or an aryl group such as phenyl, chlorophenyl, or tolyl; $R^5$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another aspect, R is methyl, or a mixture of methyl and trifluoropropyl, or a mixture of methyl and phenyl. In still another aspect, M is methoxy, n is one, $R^5$ is a divalent $C_1$-$C_3$ aliphatic group, and R is methyl.

Units of formula (14) can be derived from the corresponding dihydroxy polydiorganosiloxane (15):

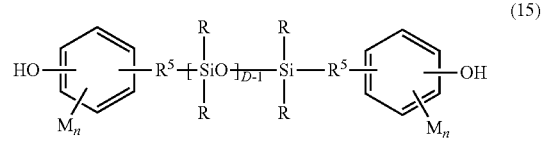
(15)

wherein R, D, M, $R^5$, and n are as described above. Such dihydroxy polysiloxanes can be made by effecting a platinum catalyzed addition between a siloxane hydride of formula (16):

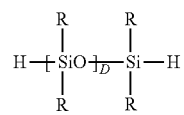
(16)

wherein R and D are as previously defined, and an aliphatically unsaturated monohydric phenol. Useful aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing can also be used.

Polysiloxane-polycarbonates comprise 50 to 99.9 wt % of carbonate units and 0.1 to 50 wt % siloxane units, based on the total weight of the polysiloxane-polycarbonate. Specific polysiloxane-polycarbonate copolymers comprise 90 to 99 wt %, specifically 75 to 99 wt %, of carbonate units and 1 to 25 wt %, specifically 1 to 10 wt %, siloxane units. An exemplary polysiloxane-polycarbonate copolymer can comprise about 6 wt % siloxane units. Another exemplary polysiloxane-polycarbonate comprises about 20 wt % siloxane units. All references to weight percent compositions in the polysiloxane-polycarbonate are based on the total weight of the polysiloxane-polycarbonate.

Exemplary polysiloxane-polycarbonates comprise polysiloxane units derived from dimethylsiloxane units (e.g., formula (11) where R is methyl), and carbonate units derived from bisphenol A, e.g., the dihydroxy compound of formula (3) in which each of $A^1$ and $A^2$ is p-phenylene and $Y^1$ is isopropylidene. Polysiloxane-polycarbonates can have a weight average molecular weight of 2,000 to 100,000 g/mol, specifically 5,000 to 50,000 g/mol. Some specific polysiloxane-polycarbonates have, for example, a weigh average molecular weight of 15,000 to 45,000 g/mol. Molecular weights referred to herein are as measured by gel permeation chromatography using a crosslinked styrene-divinyl benzene column, at a sample concentration of about 1 milligram per milliliter, and as calibrated with polycarbonate standards.

The polysiloxane-polycarbonate can have a melt volume flow rate, measured at 300° C. under a load of 1.2 kg, of 1 to 50 cc/10 min, specifically 2 to 30 cc/10 min. Specific polysiloxane-polycarbonates can have a melt volume rate measured at 300° C. under a load of 1.2 kg, of 5 to 15 cc/10 min. Mixtures of polysiloxane-polycarbonates of different flow properties can be used to achieve the overall desired flow property. Commercial polysiloxane-polycarbonates are marketed under the trade name LEXAN® EXL polycarbonates, available from SABIC Innovative Plastics (formerly GE Plastics).

Where included, the thermoplastic composition can comprise polycarbonate, including blends of polycarbonate homo and/or copolymers, polyesters, polyester-polycarbonates other than the poly(aliphatic ester)-polycarbonates disclosed above, or polysiloxane-polycarbonate in an amount of less than or equal to 50 wt %, specifically 1 to 50 wt %, and more specifically 10 to 50 wt %, based on the total weight of poly(aliphatic ester)-polycarbonate and any added polycarbonate, provided the addition of the polycarbonate does not significantly adversely affect the desired properties of the thermoplastic composition.

In an aspect, the thermoplastic composition has a soft block content (i.e., an alpha, omega $C_{6-20}$ dicarboxylic acid ester unit content) of 0.5 to 10 wt %, specifically 1 to 9 wt %, and more specifically 3 to 8 wt %, based on the total weight of the poly(aliphatic ester)-polycarbonate copolymer and any added polycarbonate.

The thermoplastic composition disclosed herein comprises a poly(aliphatic ester)-polycarbonate. The thermoplastic composition can further include a polycarbonate different from the poly(aliphatic ester)-polycarbonate.

Surprisingly, a high flow, ductile, transparent thermoplastic composition comprising a poly(aliphatic ester)-polycarbonate copolymer, as described above, meets or exceeds the desired performance requirements (i.e., transparency, and an MVR of up to 25 cc/10 min at 300° C. under a load of 1.2 Kg). The poly(aliphatic ester)-polycarbonate copolymer, i.e., a polycarbonate having aliphatic dicarboxylic acid ester soft block units randomly incorporated along the copolymer chain, has soft block segment (e.g., a flexible chain of repeating —$CH_2$— units) in the polymer chain, where inclusion of these soft block segments in a polycarbonate reduces the glass-transition temperatures (Tg) of the resulting soft block-containing polycarbonate copolymer. These thermoplastic compositions, comprising soft block in amounts of 0.5 to 10 wt % of the weight of the poly(aliphatic ester)-polycarbonate, are transparent and have higher MVR than polycarbonate homopolymers or copolymers without the soft block.

While the soft block units of the poly(aliphatic ester)-polycarbonate copolymers cannot be specifically limited to the alpha, omega $C_{6-20}$ dicarboxylic acids disclosed herein, it is believed that shorter soft block chain lengths (less than $C_6$, including the carboxylic acid groups) cannot provide sufficient chain flexibility in the poly(aliphatic ester)-polycarbonate to increase the MVR to the desired levels (i.e., greater than or equal to about 13 cc/10 min at 250° C. and 1.2 Kg load); likewise, increasing the soft block chain lengths (greater than $C_{20}$, including the carboxylic acid groups) can result in creation of crystalline domains within the poly(aliphatic ester)-polycarbonate composition, which in turn can lead to phase separation of the domains that can manifest as reduced transparency and increased haze, and can affect the thermal properties such as Tg (where multiple Tg values can result for different phase separated domains) and MVR (decreasing MVR to values of less than about 13 cc/10 min at 250° C. and 1.2 Kg load).

In some embodiments of the thermoplastic composition, the poly(aliphatic ester)-polycarbonate is used directly as prepared by interfacial or melt-processing methods. However, in some alternate embodiments, where the poly(aliphatic ester)-polycarbonate can have inadequately low melt flow (i.e., less than about 13 cc/10 min at 250° C. and 1.2 Kg load) and therefore cannot fully fill the mold, the poly(aliphatic ester)-polycarbonate can further be processed by reactive extrusion with a redistribution catalyst, such as for example, a tetra-n-butyl phosphonium hydroxide solution in water (up to 40% by weight). Surprisingly, poly(aliphatic ester)-polycarbonates which otherwise have desirable impact strength and transparency but with insufficiently high melt flow may, by the action of the redistribution catalyst, form a reaction product with higher melt flow (i.e., greater than 13 cc/10 min at 250° C. and 1.2 Kg), without significant loss of other desired features of the thermoplastic and the lens articles prepared therefrom such as impact strength, low birefringence, mold-filling and mold-release capability, high visible light transparency (percent transmittance) of greater than 85%, and less than 1% haze, measured at 3.2 mm thickness.

Exemplary thermoplastic compositions include poly(sebacic acid ester)-co-(bisphenol A carbonate). It will be understood that a wide variety of thermoplastic compositions and articles derived from them can be obtained by not only changing the thermoplastic compositions (e.g., by replacing sebacic acid with adipic acid in the poly(sebacic acid ester)-co-(bisphenol A carbonate) but by changing the amounts of sebacic acid content in the blends while maintaining a constant molecular weight. Similarly, new thermoplastic compositions can be identified by changing the molecular weights of the components in the exemplary copolymer blends while keeping, for example, sebacic acid content constant.

In particular, the ductility, transparency and melt flow of the thermoplastic compositions can be varied by the composition of the poly(aliphatic ester)-polycarbonate. For example, wt % of aliphatic dicarboxylic acid ester units (e.g., sebacic acid) can be varied from 1 to 10 wt % of the total weight of the thermoplastic composition of the total weight of the thermoplastic composition. The distribution (in the polymer chain) of the sebacic acid (or other dicarboxylic acid ester) in the copolymers can also be varied by choice of synthetic method of the poly(aliphatic ester)-polycarbonate copolymers (e.g., interfacial, melt processed, or further reactive extrusion of a low MVR poly(aliphatic ester)-polycarbonate with a redistribution catalyst) to obtain the desired properties. In this way, thermoplastic compositions having high flow (e.g. MVR of up to 25 cc/10 min. at 1.2 Kg and 250° C.) can further be achieved where the poly(aliphatic ester)-polycarbonate is too low in MVR, or is opaque (where the soft blocks are too great in length, the concentration of the soft block in the copolymer is too high, or where the overall molecular weight of the copolymer is too high, or where the copolymer has a block architecture in which the soft block units in the copolymer aggregate to form larger blocks), while transparent products with greater than or equal to 85% transmission, haze of less than 1% (measured on a 3.2 mm thick molded plaque), and high flow (e.g., up to an MVR of 25 cc/10 min. at 1.2 Kg and 250° C.), and ductility can be obtained. Thermoplastic compositions having this combination of properties is not obtainable from polycarbonate compositions of, for example, bisphenol A polycarbonate homopolymer absent a poly(aliphatic ester)-polycarbonate copolymer.

The thermoplastic composition thus comprises poly(aliphatic ester)-polycarbonate copolymer, and optionally a polycarbonate polymer not identical to the poly(aliphatic ester)-polycarbonate. Such added polycarbonate polymer can be included but is not essential to the thermoplastic composition. In an aspect, where desired, the thermoplastic composition can include the polycarbonate in amounts of less than or equal to 50 wt %, based on the total weight of poly(aliphatic ester)-polycarbonate and any added polycarbonate. Specifically useful in the thermoplastic polymer include homopolycarbonates, copolycarbonates, polyester-polycarbonates, polysiloxane-polycarbonates, blends thereof with polyesters, and combinations comprising at least one of the foregoing polycarbonate-type resins or blends. It should further be noted that the inclusion of other polymers such as polycarbonate is permitted provided the desired properties of the thermoplastic composition are not significantly adversely affected. In a specific aspect, a thermoplastic composition consists essentially of a poly(aliphatic ester)-polycarbonate copolymer. In another specific aspect, the thermoplastic composition consists of poly(aliphatic ester)-polycarbonate copolymer.

In a further aspect, the polycarbonate polymer is a homopolymer. In a still further aspect, the homopolymer comprises repeating units derived from bisphenol A.

In a further aspect, the polycarbonate polymer is a copolymer. In a still further aspect, the copolymer comprises repeating units derived from BPA. In yet a further aspect, the copolymer comprises repeating units derived from sebacic acid. In an even further aspect, the copolymer comprises repeating units derived from sebacic acid and BPA.

In a further aspect, the polycarbonate component has a weight average molecular weight of from about 15,000 grams/mol to about 100,000 grams/mol, as measured by gel permeation chromatography using BPA polycarbonate standards. In a further aspect, the polycarbonate has a weight average molecular weight from about 15,000 to about 75,000 grams/mole, as measured by gel permeation chromatography using BPA polycarbonate standards. In a still further aspect, the polycarbonate has a weight average molecular weight from about 20,000 to about 75,000 grams/mole, as measured by gel permeation chromatography using BPA polycarbonate standards. In yet a further aspect, the polycarbonate has a weight average molecular weight from about 25,000 to about 75,000 grams/mole, as measured by gel permeation chromatography using BPA polycarbonate standards. In an even further aspect, the polycarbonate has a weight average molecular weight from about 30,000 to about 75,000 grams/mole, as measured by gel permeation chromatography using BPA polycarbonate standards. In a still further aspect, the polycarbonate has a weight average molecular weight from about 35,000 to about 75,000 grams/mole, as measured by gel permeation chromatography using BPA polycarbonate standards. In yet a further aspect, the polycarbonate has a weight average molecular weight from about 40,000 to about 75,000 grams/mole, as measured by gel permeation chromatography using BPA polycarbonate standards. In an even further aspect, the polycarbonate has a weight average molecular weight from about 50,000 to about 75,000 grams/mole, as measured by gel permeation chromatography using BPA polycarbonate standards. In a still further aspect, the polycarbonate has a weight average molecular weight from about 18,000 to about 40,000 grams/mole, as measured by gel permeation chromatography using BPA polycarbonate standards. In yet a further aspect, the polycarbonate has a weight average molecular weight from about 18,000 to about 30,000 grams/mole, as measured by gel permeation chromatography using BPA polycarbonate standards. In a still further aspect, the polycarbonate component\has a weight average molecular weight of from about 20,000 grams/mol to about 50,000 grams/mol, as measured by gel permeation chromatography using BPA polycarbonate standards.

In a further aspect, the polycarbonate polymer is a copolymer. In a still further aspect, the polycarbonate copolymer comprises dimethylsiloxane repeating units.

In a further aspect, the polycarbonate copolymer is a polycarbonate-polysiloxane copolymer. In a still further aspect, the polycarbonate copolymer is a polycarbonate-polysiloxane block copolymer. In yet a further aspect, the polycarbonate-polysiloxane copolymer comprises repeating units derived from bisphenol A.

In a further aspect, the polycarbonate block of the polycarbonate-polysiloxane copolymer comprises residues derived from BPA. In a still further aspect, the polycarbonate block of the polycarbonate-polysiloxane copolymer comprises residues derived from BPA is a homopolymer.

In a further aspect, the polycarbonate-polysiloxane copolymer comprises a polysiloxane block from about 5 wt % to about 30 wt % of the polycarbonate-polysiloxane copolymer. In a still further aspect, the polycarbonate-polysiloxane copolymer comprises a polysiloxane block from about 10 wt % to about 25 wt % of the polycarbonate-polysiloxane copolymer. In yet a further aspect, the polycarbonate-polysiloxane copolymer comprises a polysiloxane block from about 15 wt % to about 25 wt % of the polycarbonate-polysiloxane copolymer. In an even further aspect, the polycarbonate-polysiloxane copolymer comprises a polysiloxane block from about 17.5 wt % to about 22.5 wt % of the polycarbonate-polysiloxane copolymer. In a still further aspect, the polycarbonate-polysiloxane copolymer comprises a polysiloxane block less than about 10 wt % of the polycarbonate-polysiloxane copolymer. In yet a further aspect, the polycarbonate-polysiloxane copolymer comprises a polysiloxane block less than about 8 wt % of the polycarbonate-polysiloxane copolymer. In an even further aspect, the polycarbonate-polysiloxane copolymer comprises a polysiloxane block from about 3 wt % to about 10 wt % of the polycarbonate-polysiloxane copolymer.

In a further aspect, the polycarbonate polymer comprises a blend of at least two polycarbonate polymers. In a still further aspect, the polycarbonate blend comprises a first polycarbonate polymer component and a second polycarbonate polymer component.

In a further aspect, the first polycarbonate polymer component is a high flow polycarbonate. In a still further aspect, the first polycarbonate polymer component has a melt volume flow rate (MVR) from about 17 grams/10 minutes to about 32 grams/10 minutes when measured at 300° C. and under a load of 1.2 kg according to ASTM D1238. In yet a further aspect, the first polycarbonate polymer component has a melt volume flow rate (MVR) from about 20 grams/10 minutes to about 30 grams/10 minutes when measured at 300° C. and under a load of 1.2 kg according to ASTM D1238. In an even further aspect, the first polycarbonate polymer component has a melt volume flow rate (MVR) from about 22 grams/10 minutes to about 29 grams/10 minutes when measured at 300° C. and under a load of 1.2 kg according to ASTM D1238.

In a further aspect, the first polycarbonate polymer component has a weight average molecular weight from about 18,000 to about 40,000 grams/mole, as measured by gel permeation chromatography using BPA polycarbonate standards. In a still further aspect, the first polycarbonate polymer component has a weight average molecular weight from about 18,000 to about 30,000 grams/mole, as measured by gel permeation chromatography using BPA polycarbonate standards. In yet a further aspect, the first polycarbonate polymer component has a weight average molecular weight from about 18,000 to about 25,000 grams/mole, as measured by gel permeation chromatography using BPA polycarbonate standards. In an even further aspect, the first polycarbonate polymer component has a weight average molecular weight from about 18,000 to about 23,000 grams/mole, as measured by gel permeation chromatography using BPA polycarbonate standards.

In a further aspect, the second polycarbonate polymer component is a low flow polycarbonate. In a still further aspect, the second polycarbonate polymer component has a melt volume flow rate (MVR) from about 4.0 grams/10 minutes to about 8.0 grams/10 minutes when measured at 300° C. and under a load of 1.2 kg according to ASTM D1238. In yet a further aspect, the second polycarbonate polymer component has a melt volume flow rate (MVR) from about 4.5 grams/10 minutes to about 7.2 grams/10 minutes when measured at 300° C. and under a load of 1.2 kg according to ASTM D1238. In an even further aspect, the second polycarbonate polymer component has a melt volume flow rate (MVR) from about 4.8 grams/10 minutes to about 7.1 grams/10 minutes when measured at 300° C. and under a load of 1.2 kg according to ASTM D1238.

In a further aspect, the second polycarbonate polymer component has a weight average molecular weight from about 18,000 to about 40,000 grams/mole, as measured by gel permeation chromatography using BPA polycarbonate standards. In a still further aspect, the second polycarbonate polymer component has a weight average molecular weight from about 20,000 to about 35,000 grams/mole, as measured by gel permeation chromatography using BPA polycarbonate standards. In yet a further aspect, the second polycarbonate polymer component has a weight average molecular weight from about 20,000 to about 30,000 grams/mole, as measured by gel permeation chromatography using BPA polycarbonate standards. In an even further aspect, the second polycarbonate polymer component has a weight average molecular weight from about 23,000 to about 30,000 grams/mole, as measured by gel permeation chromatography using BPA polycarbonate standards. In a still further aspect, the second polycarbonate polymer component has a weight average molecular weight from about 25,000 to about 30,000 grams/mole, as measured by gel permeation chromatography using BPA polycarbonate standards. In yet a further aspect, the second polycarbonate polymer component has a weight average molecular weight from about 27,000 to about 30,000 grams/mole, as measured by gel permeation chromatography using BPA polycarbonate standards.

In a further aspect, the polycarbonate blend comprises a first polycarbonate-polysiloxane copolymer and a second polycarbonate-polysiloxane copolymer.

In a further aspect, the first polycarbonate-polysiloxane copolymer comprises a polysiloxane block from about 5 wt % to about 30 wt % of the first polycarbonate-polysiloxane copolymer; and wherein the second polycarbonate-polysiloxane copolymer comprises a polysiloxane block less than or equal to about 10 wt % of the second polycarbonate-polysiloxane copolymer. In a still further aspect, the first polycarbonate-polysiloxane copolymer comprises a polysiloxane block from about 10 wt % to about 25 wt % of the first polycarbonate-polysiloxane copolymer; and wherein the second polycarbonate-polysiloxane copolymer comprises a polysiloxane block less than or equal to about 10 wt % of the second polycarbonate-polysiloxane copolymer. In yet a further aspect, the first polycarbonate-polysiloxane copolymer comprises a polysiloxane block from about 15 wt % to about 25 wt % of the first polycarbonate-polysiloxane copolymer; and wherein the second polycarbonate-polysiloxane copolymer comprises a polysiloxane block less than or equal to about 10 wt % of the second polycarbonate-polysiloxane copolymer. In an even further aspect, the first polycarbonate-polysiloxane copolymer comprises a polysiloxane block from about 17.5 wt % to about 22.5 wt % of the first polycarbonate-polysiloxane copolymer; and wherein the second polycarbonate-polysiloxane copolymer comprises a polysiloxane block less than or equal to about 10 wt % of the second polycarbonate-polysiloxane copolymer.

In a further aspect, the polycarbonate polymer is present in an amount from about 25 wt % to about 75 wt %. In a still further aspect, the polycarbonate polymer is present in an amount from about 30 wt % to about 75 wt %. In yet a further aspect, the polycarbonate polymer is present in an amount from about 35 wt % to about 75 wt %. In an even further aspect, the polycarbonate polymer is present in an amount from about 20 wt % to about 70 wt %. In a still further aspect, the polycarbonate polymer is present in an amount from about 25 wt % to about 70 wt %. In yet a further aspect, the polycarbonate polymer is present in an amount from about 30 wt % to about 70 wt %. In an even further aspect, the polycarbonate polymer is present in an amount from about 35 wt % to about 70 wt %. In a still further aspect, the polycarbonate polymer is present in an amount from about 20 wt % to about 65 wt %. In yet a further aspect, the polycarbonate polymer is present in an amount from about 25 wt % to about 65 wt %. In an even further aspect, the polycarbonate polymer is present in an amount from about 30 wt % to about 65 wt %. In a still further aspect, the polycarbonate polymer is present in an amount from about 35 wt % to about 65 wt %. In yet a further aspect, the polycarbonate polymer is present in an amount from about 20 wt % to about 60 wt %. In an even further aspect, the polycarbonate polymer is present in an amount from about 25 wt % to about 60 wt %. In a still further aspect, the polycarbonate polymer is present in an amount from about 30 wt % to about 60 wt %. In yet a further aspect, the polycarbonate polymer is present in an amount from about 35 wt % to about 60 wt %.

Phosphorus-Containing Flame Retardant

In one aspect, the blended thermoplastic compositions of the present disclosure comprise a flame retardant, wherein the flame retardant can comprise any flame retardant material or mixture of flame retardant materials suitable for use in the inventive polymer compositions. In various aspects, the flame retardant additive phosphorus-containing flame retardant. In a further aspect, the flame retardant is selected from oligomeric phosphate flame retardant, polymeric phosphate flame retardant, an aromatic polyphosphate flame retardant, oligomeric phosphonate flame retardant, phenoxyphosphazene oligomeric flame retardant, or mixed phosphate/phosphonate ester flame retardant compositions. In a still further aspect, the flame retardant additive comprises a halogen containing material. In a yet further aspect, the flame retardant additive is free of or substantially free of one or more of phosphate and/or a halogen.

In a further aspect, the blended thermoplastic compositions further comprise a flame retardant selected from organic compounds that include phosphorous, bromine, and/or chlorine. Non-brominated and non-chlorinated phosphorous-containing compounds can be preferred in certain applications for regulatory reasons, for example, organic phosphates and organic compounds containing phosphorous-nitrogen bonds. Exemplary organic phosphates can include an aromatic phosphate of the formula $(GO)_3P=O$, wherein each G is independently an alkyl, cycloalkyl, aryl, alkaryl, or aralkyl group, provided that at least one G is an aromatic group. Two of the G groups can be joined together to provide a cyclic group, for example, diphenyl pentaerythritol diphosphate, which is described by Axelrod in U.S. Pat. No. 4,154,775. Other suitable aromatic phosphates can be, for example, phenyl bis (dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis(2-ethylhexyl)p-tolyl phosphate, tritolyl phosphate, bis(2-ethylhexyl)phenyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

In a further aspect, di- or polyfunctional aromatic phosphorous-containing compounds can also be present. Examples of suitable di- or polyfunctional aromatic phosphorous-containing compounds include triphenyl phosphate (TPP), resorcinol tetraphenyl diphosphate (RDP), the bis (diphenyl)phosphate of hydroquinone and the bis(diphenyl) phosphate of bisphenol-A, respectively, their oligomeric and polymeric counterparts, and the like.

In a further aspect, organic phosphates and organic compounds containing phosphorous-nitrogen bonds can also be present. For example, phosphonitrilic chloride, phosphorous ester amides, phosphoric acid amides, phosphonic acid amides, phosphinic acid amides, tris(aziridinyl)phosphine oxide, or the like. In one aspect, [phenoxyphosphazene] is used as a flame retardant.

Exemplary flame retardants include aromatic cyclic phosphazenes having a structure represented by the formula:

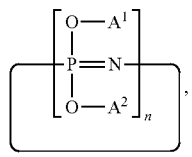

wherein each of $A^1$ and $A^2$ is independently an aryl group having 6 to 10 carbon atoms substituted with 0 to 4 C1-C4 alkyl groups; and n is an integer of 3 to 6. The aryl group of $A^1$ and $A^2$ means an aromatic hydrocarbon group having 6 to 10 atoms. Examples of such groups include phenyl and naphthyl groups. In a further aspect, the aryl group of $A^1$ and $A^2$ is independently selected from phenyl and naphthyl. In a still further aspect, the aryl group of $A^1$ and $A^2$ is phenyl. In a further aspect, aromatic cyclic phosphazene compound is a mixture of compounds represented by the foregoing formula, comprising a mixture of compounds with n=3, n=4, n=5, and n=6.

The "aryl group having 6 to 10 carbon atoms" can be substituted with 0 to 4 C1-C4 alkyl groups, wherein the alkyl group means a straight or branched saturated hydrocarbon group having 1 to 4 carbon atoms. Examples of the group include a methyl group, an ethyl group, a propyl group, an isopropyl group, a butyl group, an isobutyl group, a sec-butyl group, and a tert-butyl group. In various further aspects, the alkyl group has 1 to 3 carbon atoms. In a still further aspect, the alkyl group is methyl.

In a further aspect, each of $A^1$ and $A^2$ is a phenyl group, wherein each of $A^1$ and $A^2$ is independently substituted with 0 to 4 C1-C4 alkyl groups. In a still further aspect, each of $A^1$ and $A^2$ is a phenyl group, wherein each of $A^1$ and $A^2$ is independently substituted with 0 to 4 C1-C3 alkyl groups. In a yet further aspect, each of $A^1$ and $A^2$ is a phenyl group independently substituted with 0 to 4 methyl groups. In an even further aspect, each of $A^1$ and $A^2$ is independently selected from phenyl, o-tolyl, p-tolyl, and m-tolyl.

In various further aspects, three to six $A^1$ groups are present, wherein each $A^1$ group can be the same as or different from each other. In a further aspect, three to six $A^1$ groups are present, wherein each $A^1$ group is the same.

In various further aspects, three to six $A^2$ groups are present, wherein each $A^2$ group can be the same as or different from each other. In a further aspect, three to six $A^2$ groups are present, wherein each $A^2$ group is the same. In a yet further aspect, each $A^1$ and each $A^2$ are the same moiety.

In a further aspect, aromatic cyclic phosphazenes useful in the present disclosure are compounds having a structure represented by the formula:

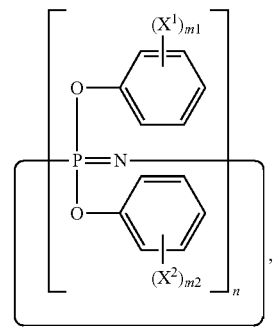

wherein each occurrence of $X^1$ and $X^2$ is independently a C1-C4 alkyl group; wherein each of m1 and m2 is independently an integer of 0 to 4; and wherein n is an integer of 3 to 6. As described above, alkyl group means a straight or branched saturated hydrocarbon group having 1 to 4 carbon atoms. Examples of the group include a methyl group, an ethyl group, a propyl group, an isopropyl group, a butyl group, an isobutyl group, a sec-butyl group, and a tert-butyl group. In various further aspects, the alkyl group has 1 to 3 carbon atoms. In a still further aspect, the alkyl group is methyl. In a further aspect, each of m1 and m2 is independently an integer of 0 to 3. In a still further aspect, each of m1 and m2 is independently an integer of 0 to 2. In a yet further aspect, each of m1 and m2 is independently an integer that is 0 or 1. In an even further aspect, each of m1 and m2 is 0. In a still further aspect, each of m1 and m2 is 1.

In various further aspects, three to six $X^1$ groups are present, wherein each $X^1$ group can be the same as or different from each other. In a further aspect, three to six $X^1$ groups are present, wherein each $X^1$ group is the same.

In various further aspects, three to six $X^2$ groups are present, wherein each $X^2$ group can be the same as or different from each other. In a further aspect, three to six $X^2$ groups are present, wherein each $X^2$ group is the same. In a yet further aspect, each $X^1$ and each $X^2$ are the same moiety.

In various further aspects, the aromatic cyclic phosphazene is a compound selected from Examples of the compound represented by General Formula (I) include 2,2,4,4,6,6-hexaphenoxycyclotriphosphazene, 2,2,4,4,6,6-hexakis(p-tolyloxy)cyclotriphosphazene, 2,2,4,4,6,6-hexakis(m-tolyloxy)cyclotriphosphazene, 2,2,4,4,6,-hexakis(o-tolyloxy) cyclotriphosphazene, 2,4,6-triphenoxy-2,4,6-tris(p-tolyloxy)cyclotriphosphazene, 2,4,6-triphenoxy-2,4,6-tris(m-tolyloxy)cyclotriphosphazene, 2,4,6-triphenoxy-2,4,6-tris(o-tolyloxy)cyclotriphosphazene, 2,4,6-triphenoxy-2,4,6-tris(2-ethylphenoxy)cyclotriphosphazene, 2,4,6-triphenoxy-2,4,6-tris(3-ethylphenoxy)cyclotriphosphazene, 2,4,6-triphenoxy-2,4,6-tris(4-ethylphenoxy)cyclotriphosphazene, 2,4,6-triphenoxy-2,4,6-tris(2,3-xylyloxy)cyclotriphosphazene, 2,4,6-triphenoxy-2,4,6-tris(2,4-xylyloxy)cyclotriphosphazene, 2,4,6-triphenoxy-2,4,6-tris(2,5-xylyloxy) cyclotriphosphazene, 2,4,6-triphenoxy-2,4,6-tris(2,6-xylyloxy)cyclotriphosphazene, 2,4,6-triphenoxy-2,4,6-tris (3,4-xylyloxy)cyclotriphosphazene, 2,4,6-triphenoxy-2,4,6-tris(3,5-xylyloxy)cyclotriphosphazene, 2,2,4,4,6,6,8,8-octaphenoxycyclotetraphosphazene, 2,2,4,4,6,6,8,8-octakis (p-tolyloxy)cyclotetraphosphazene, 2,2,4,4,6,6,8,8-octakis (m-tolyloxy)cyclotetraphosphazene, 2,2,4,4,6,6,8,8-octakis (o-tolyloxy)cyclotetraphosphazene, 2,4,6,8-tetraphenoxy-2,4,6,8-tetrakis(p-tolyloxy)cyclotetraphosphazene, 2,4,6,8-tetraphenoxy-2,4,6,8-tetrakis(m-tolyloxy) cyclotetraphosphazene, and 2,4,6,8-tetraphenoxy-2,4,6,8-tetrakis(o-tolyloxy)cyclotetraphosphazene. In a still further aspect, the aromatic cyclic phosphazene is selected from 2,2, 4,4,6,6-hexaphenoxycyclotriphosphazene, 2,4,6-triphenoxy-2,4,6-tris(p-tolyloxy)cyclotriphosphazene, 2,4,6-triphenoxy-2,4,6-tris(m-tolyloxy)cyclotriphosphazene, and 2,4, 6-triphenoxy-2,4,6-tris(o-tolyloxy)cyclotriphosphazene.

In a further aspect, the aromatic cyclic phosphazene at least one compound represented by one of the phosphazene formulas described herein as a main component. In various aspects, the content of the aromatic cyclic phosphazene composition is about 90 wt %. In a further aspect, the content of the aromatic cyclic phosphazene composition is about 95 wt %. In a still further aspect, the content of the aromatic cyclic phosphazene composition is about 100 wt %.

Other components in the aromatic cyclic phosphazene composition are not specifically limited as long as the object of the present disclosure is not impaired.

Aromatic cyclic phosphazene-containing flame retardant useful in the present disclosure are commerically available. Suitable examples of such commercial products include "Rabitle FP-110" and "Rabitle FP-390" manufactured by FUSHIMI Pharmaceutical Co., Ltd. In a further aspect, the phosphorus-containing flame retardant is selected from a phosphine, a phosphine oxide, a bisphosphine, a phosphonium salt, a phosphinic acid salt, a phosphoric ester, and a phosphorous ester.

In a further aspect, the phosphorus-containing flame retardant is selected from rescorcinol bis(diphenyl phosphate), resorcinol bis(dixylenyl phosphate), hydroquinone bis (diphenyl phosphate), bisphenol-A bis(diphenyl phosphate), 4,4'-biphenol bis(diphenyl phosphate), triphenyl phosphate, methylneopentyl phosphite, pentaerythritol diethyl diphosphite, methyl neopentyl phosphonate, phenyl neopentyl phosphate, pentaerythritol diphenyldiphosphate, dicyclopentyl hypodiphosphate, dineopentyl hypophosphite, phenylpyrocatechol phosphite, ethylpyrocatechol phosphate and dipyrocatechol hypodiphosphate. In a still further aspect, the flame retardant is selected from triphenyl phosphate; cresyldiphenylphosphate; tri(isopropylphenyl)phosphate; resorcinol bis(diphenylphosphate); and bisphenol-A bis(diphenyl phosphate). In a yet further aspect, resorcinol bis(biphenyl phosphate), bisphenol A bis(diphenyl phosphate) hydroquinone bis(diphenyl phosphate), phosphoric acid, 1,3-phenylene tetraphenyl ester), bis-phenol-A bis-diphenyl phosphate) or mixtures thereof. In an even further aspect, the flame retardant is bisphenol-A bis(diphenyl phosphate). In a still further aspect, the phosphorus-containing flame retardant is selected from resorcinol bis(biphenyl phosphate), bisphenol A bis(diphenyl phosphate), and hydroquinone bis(diphenyl phosphate), or mixtures thereof. In yet a further aspect, the phosphorus-containing flame retardant is bisphenol A bis (diphenyl phosphate). In an even further aspect, the phosphorus-containing flame retardant is resorcinol bis(biphenyl phosphate).

In a further aspect, the phosphorus-containing flame retardant is present in an amount from about 3 wt % to about 25 wt %. In a still further aspect, the phosphorus-containing flame retardant is present in an amount from about 3 wt % to about 20 wt %. In yet a further aspect, the phosphorus-containing flame retardant is present in an amount from about 3 wt % to about 15 wt %. In an even further aspect, the phosphorus-containing flame retardant is present in an amount from about 3 wt % to about 14 wt %. In a still further aspect, the phosphorus-containing flame retardant is present in an amount from about 3 wt % to about 13 wt %. In yet a further aspect, the phosphorus-containing flame retardant is present in an amount from about 3 wt % to about 12 wt %. In an even further aspect, the phosphorus-containing flame retardant is present in an amount from about 3 wt % to about 11 wt %. In a still further aspect, the phosphorus-containing flame retardant is present in an amount from about 3 wt % to about 10 wt %.

Thermally Conductive Filler

In various aspects, the blended thermoplastic compositions of the present disclosure comprise a filler, wherein the filler comprises at least one thermally conductive filler and at least one thermally insulating filler.

In a further aspect, the thermally conductive filler is a high thermally conductive filler, wherein the high thermally conductive filler has a thermal conductivity greater than or equal to about 50 W/mK; or a low thermally conductive filler, wherein the low thermally conductive filler has a thermal conductivity from about 10 W/mK to about 30 W/mK; or a combinations thereof. In a still further aspect, the thermally conductive filler is one or more high thermally conductive fillers.

In various aspects, the intrinsic thermal conductivity of the high thermally conductive filler is greater than or equal to 50 W/mK. In a further aspect, the intrinsic thermal conductivity of the high thermally conductive filler is greater than or equal to 100 W/mK. In a still further aspect, the intrinsic thermal conductivity of the high thermally conductive filler is greater than or equal to 150 W/mK.

Examples of high thermally conductive filler include, but are not limited to, AlN (Aluminum nitride), $Al_4C_3$ (Aluminum carbide), $Al_2O_3$ (Aluminum oxide), BN (Boron nitride), AlON (Aluminum oxynitride), $MgSiN_2$ (Magnesium silicon nitride), SiC (Silicon carbide), $Si_3N_4$ (Silicon nitride), graphite, expanded graphite, graphene, and carbon fiber, or combinations thereof. In a further aspect, AlN, $Al_4C_3$, $Al_2O_3$, BN, AlON, $MgSiN_2$, SiC, $Si_3N_4$, graphite, expanded graphite, graphene, and carbon fiber, or a combinations thereof. In a still further aspect, the high thermally conductive filler is selected from AlN, $Al_2O_3$, BN, SiC, graphite, expanded graphite, and carbon fiber, or combinations thereof. In yet a further aspect, the high thermally conductive filler is selected from BN, graphite, and expanded graphite, or combinations thereof.

In various aspects, the thermally conductive filler is one or more low thermally conductive fillers. In a further aspect, the intrinsic thermal conductivity of the low thermally conductive filler is from about 10 W/mK to about 30 W/mK. In a further aspect, the intrinsic thermal conductivity of the low thermally conductive filler is from about 15 W/mK to about 30 W/mK. In a still further aspect, the intrinsic thermal conductivity of the low thermally conductive filler is from about 20 W/mK to about 30 W/mK.

Examples of low thermally conductive fillers include, but are not limited to, ZnS (zinc sulfide), CaO (calcium oxide), MgO (magnesium oxide), ZnO (Zinc oxide), and $TiO_2$ (titanium dioxide). In a further aspect, the low thermally conductive filler is selected from ZnS, CaO, MgO, ZnO, and $TiO_2$, or combinations thereof. In a still further aspect, the low thermally conductive filler is $TiO_2$.

The graphite used in the present disclosure can be synthetically produced or naturally produced, or can be expandable graphite or expanded graphite with a thickness smaller than 1 micron. In one aspect, the graphite is naturally produced. There are three types of naturally produced graphite that are commercially available. They are flake graphite, amorphous graphite and crystal vein graphite. In one aspect, the graphite is flake graphite, wherein the flake graphite is typically found as discrete flakes ranging in size from 10-800 micrometers in diameter and 1-150 micrometers thick and purities ranging from 80-99.9% carbon. In another aspect the graphite is spherical.

The boron nitride used in the disclosure is typically hexagonal boron nitride (h-BN), which can be complete h-BN or turbostratic boron nitride (t-BN). The BN particle can be large sized single BN crystal powder, agglomerate of small sized BN particles, the mixture thereof, the agglomerated spherical powder, or BN fiber. In one aspect, the BN average particle size or D50 in diameter can range from 1 to 500 micrometers. In another aspect, within this range, the boron nitride particles have a size of greater than or equal to about 3, or greater than or equal to about 5 micrometers. The particle size indicated here means the single BN particle or its agglomerate at any of their dimensions. In one aspect, the BN has a BN purity ranging from 95% to 99.8%. In one aspect, a large single crystal sized flake BN with an average size ranging from 3 to 50 micrometer and a BN purity of over 98% is used.

In a further aspect, the thermally conductive filler is an amino-silane treated fillers, polyurethane treated fillers, vinyl-silane treated fillers, epoxy-silane treated fillers, and epoxy treated fillers, or a combination thereof.

In a further aspect, the thermally conductive filler is particulate or fibrous form. In a still further aspect, the thermally conductive fibrous filler is fibrous. In a yet further aspect, the thermally conductive fibrous filler has a circular or non-circular cross-section. In an even further aspect, the thermally conductive fibrous filler has a length from about 1 mm to about 5 mm. In a still further aspect, the thermally conductive fibrous filler has a length from about 2 mm to about 5 mm. In a yet further aspect, the thermally conductive fibrous filler has a length from about 3 mm to about 5 mm. In an even further aspect, the thermally conductive fibrous filler has a length from about 4 mm to about 5 mm. In a still further aspect, the thermally conductive fibrous filler has a length from about 3 mm to about 4 mm. In a yet further aspect, the thermally conductive fibrous filler has a length greater than about 2 mm. In a yet further aspect, the thermally conductive fibrous filler has a length greater than about 3 mm. In an even further aspect, the thermally conductive fibrous filler has a length greater than about 4 mm. In a still further aspect, the thermally conductive fibrous filler has a length greater than about 5 mm.

In a further aspect, the thermally conductive fibrous filler is particulate. In a still further aspect, the thermally conductive particulate filler has a mean particle size from about 2 μm to about 10 μm. In a yet further aspect, the thermally conductive particulate filler has a mean particle size from about 3 μm to about 10 μm. In an even further aspect, the thermally conductive particulate filler has a mean particle size from about 4 μm to about 10 μm. In a still further aspect, the thermally conductive particulate filler has a mean particle size from about 5 μm to about 10 μm. In a yet further aspect, the thermally conductive particulate filler has a mean particle size from about 6 μm to about 10 μm. In an even further aspect, the thermally conductive particulate filler has a mean particle size from about 2 μm to about 9 p.m. In a still further aspect, the thermally conductive particulate filler has a mean particle size from about 2 μm to about 8 μm. In a yet further aspect, the thermally conductive particulate filler has a mean particle size from about 2 μm to about 7 μm. In an even further aspect, the thermally conductive particulate filler has a mean particle size from about 2 μm to about 6 μm. In a still further aspect, the thermally conductive particulate filler has a mean particle size from about 3 μm to about 5 μm.

In a further aspect, the filler comprising at least one thermally conductive filler and at least one thermally insulating filler is present in an amount from about 15% wt % to about 70% wt %. In a still further aspect, the filler comprising at least one thermally conductive filler and at least one thermally insulating filler is present in an amount from about 20% wt % to about 70% wt %. In yet a further aspect, the filler comprising at least one thermally conductive filler and at least one thermally insulating filler is present in an amount from about 10% wt % to about 65% wt %. In an even further aspect, the filler comprising at least one thermally conductive filler and at least one thermally insulating filler is present in an amount from about 15% wt % to about 65% wt %. In a still further aspect, the filler comprising at least one thermally conductive filler and at least one thermally insulating filler is present in an amount from about 20% wt % to about 65% wt %. In yet a further aspect, the filler comprising at least one thermally conductive filler and at least one thermally insulating filler is present in an amount from about 10% wt % to about 60% wt %. In an even further aspect, the filler comprising at least one thermally conductive filler and at least one thermally insulating filler is present in an amount from about 15% wt % to about 60% wt %. In a still further aspect, the filler comprising at least one thermally conductive filler and at least one thermally insulating filler is present in an amount from about 20% wt % to about 60% wt %. In yet a further aspect, the filler comprising at least one thermally conductive filler and at least one thermally insulating filler is present in an amount from about 10% wt % to about 55% wt %. In an even further aspect, the filler comprising at least one thermally conductive filler and at least one thermally insulating filler is present in an amount from about 15% wt % to about 55% wt %. In a still further aspect, the filler comprising at least one thermally conductive filler and at least one thermally insulating filler is present in an amount from about 20% wt % to about 55% wt %. In yet a further aspect, the filler comprising at least one thermally conductive filler and at least one thermally insulating filler is present in an amount from about 10% wt % to about 50% wt %. In an even further aspect, the filler comprising at least one thermally conductive filler and at least one thermally insulating filler is present in an amount from about 15% wt % to about 50% wt %. In a still further aspect, the filler comprising at least one thermally conductive filler and at least one thermally insulating filler is present in an amount from about 20% wt % to about 50% wt %. In yet a further aspect, the filler comprising at least one thermally conductive filler and at least one thermally insulating filler is present in an amount from about 10% wt % to about 45% wt %. In an even further aspect, the filler comprising at least one thermally conductive filler and at least one thermally insulating filler is present in an amount from about 15% wt % to about 45% wt %. In a still further aspect, the filler comprising at least one thermally conductive filler and at least one thermally insulating filler is present in an amount from about 20% wt % to about 45% wt %. In yet a further aspect, the filler comprising at least one thermally conductive filler and at least one thermally insulating filler is present in an amount from about 10% wt % to about 40% wt %. In an even further aspect, the filler comprising at least one thermally conductive filler and at least one thermally insulating filler is present in an amount from about 15% wt % to about 40% wt %. In a still further aspect, the filler comprising at least one thermally conductive filler and at least one thermally insulating filler is present in an amount from about 20% wt % to about 40% wt %.

Thermally Insulating Filler

In various aspects, the blended thermoplastic compositions of the present disclosure comprise a filler comprising at least one thermally conductive filler and at least one thermally insulating filler. In a further aspect, the thermally insulating filler comprises one or more thermally insulating fillers.

In a further aspect, the thermally insulating filler has a thermal conductivity less than or equal to about 10 W/mK. In a still further aspect, the intrinsic thermal conductivity of the thermally insulating filler is less than about 7.5 W/mK. In a yet further aspect, the intrinsic thermal conductivity of the thermally insulating filler is less than about 5 W/mK.

Examples of thermally insulating fillers include, but are not limited to, $H_2Mg_3(SiO_3)_4$ (Talc), $CaCO_3$ (Calcium Carbonate), $Mg(OH)_2$ (Magnesium hydroxide), Mica, BaO (Barium oxide), γ-AlO(OH) (boehmite), α-AlO(OH) (diaspore), $Al(OH)_3$ (gibbsite), $BaSO_4$ (barium sulfate), $CaSiO_3$ (wollastonite), $ZrO_2$ (zirconium oxide), $SiO_2$ (silicon oxide), glass beads, glass fiber, $MgO.xAl_2O_3$ (magnesium aluminate), $CaMg(CO_3)_2$ (dolomite), ceramic-coated graphite, and various types of clay, or a combinations thereof. In a further aspect, the thermally insulating filler is selected from $H_2Mg_3(SiO_3)_4$, $CaCO_3$, $Mg(OH)_2$, Mica, BaO, AlO(OH), α-AlO(OH), $Al(OH)_3$, $BaSO_4$, $CaSiO_3$, $ZrO_2$, $SiO_2$, a glass bead, a glass fiber, $MgO.xAl_2O_3$, $CaMg(CO_3)_2$, a clay, or a combination thereof. In a still further aspect, the thermally insulating filler is selected from $H_2Mg_3(SiO_3)_4$, $Mg(OH)_2$, γ-AlO(OH), α-AlO(OH), and $Al(OH)_3$, or combinations thereof. In yet a further aspect, the thermally insulating filler is selected from $H_2Mg_3(SiO_3)_4$, γ-AlO(OH), α-AlO(OH), and $Al(OH)_3$, or combinations thereof. In an even further aspect, the thermally insulating filler is $H_2Mg_3(SiO_3)_4$.

In a further aspect, the thermally conductive filler is $TiO_2$ and the thermally insulating filler is $H_2Mg_3(SiO_3)_4$.

In a further aspect, the thermally insulating filler is particulate or fibrous form. In a still further aspect, the thermally insulating fibrous filler is fibrous. In a yet further aspect, the thermally insulating fibrous filler has a circular or non-circular cross-section. In an even further aspect, the thermally insulating fibrous filler has a length from about 1 mm to about 5 mm. In a still further aspect, the thermally insulating fibrous filler has a length from about 2 mm to about 5 mm. In a yet further aspect, the thermally insulating fibrous filler has a length from about 3 mm to about 5 mm. In an even further aspect, the thermally insulating fibrous filler has a length from about 4 mm to about 5 mm. In a still further aspect, the thermally insulating fibrous filler has a length from about 3 mm to about 4 mm. In a yet further aspect, the thermally insulating fibrous filler has a length greater than about 2 mm. In a yet further aspect, the thermally insulating fibrous filler has a length greater than about 3 mm. In an even further aspect, the thermally insulating fibrous filler has a length greater than about 4 mm. In a still further aspect, the thermally insulating fibrous filler has a length greater than about 5 mm.

In a further aspect, the thermally insulating fibrous filler is particulate. In a still further aspect, the thermally insulating particulate filler has a mean particle size from about 2 μm to about 10 μm. In a yet further aspect, the thermally insulating particulate filler has a mean particle size from about 3 μm to about 10 μm. In an even further aspect, the thermally insulating particulate filler has a mean particle size from about 4 μm to about 10 μm. In a still further aspect, the thermally insulating particulate filler has a mean particle size from about 5 μm to about 10 μm. In a yet further aspect, the thermally insulating particulate filler has a mean particle size from about 6 μm to about 10 μm. In an even further aspect, the thermally insulating particulate filler has a mean particle size from about 2 μm to about 9 μm. In a still further aspect, the thermally insulating particulate filler has a mean particle size from about 2 μm to about 8 μm. In a yet further aspect, the thermally insulating particulate filler has a mean particle size from about 2 μm to about 7 μm. In an even further aspect, the thermally insulating particulate filler has a mean particle size from about 2 μm to about 6 μm. In a still further aspect, the thermally insulating particulate filler has a mean particle size from about 3 μm to about 5 μm.

In a further aspect, the filler comprising at least one thermally conductive filler and at least one thermally insulating filler is present in an amount from about 15% wt % to about 70% wt %. In a still further aspect, the filler comprising at least one thermally conductive filler and at least one thermally insulating filler is present in an amount from about 20% wt % to about 70% wt %. In yet a further aspect, the filler comprising at least one thermally conductive filler and at least one thermally insulating filler is present in an amount from about 10% wt % to about 65% wt %. In an even further aspect, the filler comprising at least one thermally conductive filler and at least one thermally insulating filler is present in an amount from about 15% wt % to about 65% wt %. In a still further aspect, the filler comprising at least one thermally conductive filler and at least one thermally insulating filler is present in an amount from about 20% wt % to about 65% wt %. In yet a further aspect, the filler comprising at least one thermally conductive filler and at least one thermally insulating filler is present in an amount from about 10% wt % to about 60% wt %. In an even further aspect, the filler comprising at least one thermally conductive filler and at least one thermally insulating filler is present in an amount from about 15% wt % to about 60% wt %. In a still further aspect, the filler comprising at least one thermally conductive filler and at least one thermally insulating filler is present in an amount from about 20% wt % to about 60% wt %. In yet a further aspect, the filler comprising at least one thermally conductive filler and at least one thermally insulating filler is present in an amount from about 10% wt % to about 55% wt %. In an even further aspect, the filler comprising at least one thermally conductive filler and at least one thermally insulating filler is present in an amount from about 15% wt % to about 55% wt %. In a still further aspect, the filler comprising at least one thermally conductive filler and at least one thermally insulating filler is present in an amount from about 20% wt % to about 55% wt %. In yet a further aspect, the filler comprising at least one thermally conductive filler and at least one thermally insulating filler is present in an amount from about 10% wt % to about 50% wt %. In an even further aspect, the filler comprising at least one thermally conductive filler and at least one thermally insulating filler is present in an amount from about 15% wt % to about 50% wt %. In a still further aspect, the filler comprising at least one thermally conductive filler and at least one thermally insulating filler is present in an amount from about 20% wt % to about 50% wt %. In yet a further aspect, the filler comprising at least one thermally conductive filler and at least one thermally insulating filler is present in an amount from about 10% wt % to about 45% wt %. In an even further aspect, the filler comprising at least one thermally conductive filler and at least one thermally insulating filler is present in an amount from about 15% wt % to about 45% wt %. In a still further aspect, the filler comprising at least one thermally conductive filler and at least one thermally insulating filler is present in an amount from about 20% wt % to about 45% wt %. In yet a further aspect, the filler comprising at least one thermally conductive filler and at least one thermally insulating filler is present in an amount from about 10% wt % to about 40% wt %. In an even further aspect, the filler comprising at least one thermally conductive filler and at least one thermally insulating filler is present in an amount from about 15% wt % to about 40% wt %. In a still further aspect, the filler comprising at least one thermally conductive filler and at least one thermally insulating filler is present in an amount from about 20% wt % to about 40% wt %.

Optional Anti-Drip Agent

In one aspect, the blended thermoplastic compositions of the present disclosure comprise one or more anti-drip agents. Anti-drip agents include a fibril forming or non-fibril forming fluoropolymer such as polytetrafluoroethylene (PTFE). The anti-drip agent can be encapsulated by a rigid copolymer as described above, for example SAN. PTFE encapsulated in SAN is known as TSAN. Encapsulated fluoropolymers can be made by polymerizing the encapsulating polymer in the presence of the fluoropolymer, for example, in an aqueous dispersion. TSAN can provide significant advantages over PTFE, in that TSAN can be more readily dispersed in the composition. A suitable TSAN can comprise, for example, about 50 wt. % PTFE and about 50 wt. % SAN, based on the total weight of the encapsulated fluoropolymer. The SAN can comprise, for example, about 75 wt. % styrene and about 25 wt. % acrylonitrile based on the total weight of the copolymer. Alternatively, the fluoropolymer can be pre-blended in some manner with a second polymer, such as for, example, an aromatic polycarbonate resin or SAN to form an agglomerated material for use as an anti-drip agent. Either method can be used to produce an encapsulated fluoropolymer In a further aspect, the anti-drip agent comprises styrene-acrylonitrile copolymer encapsulated polytetrafluoroethylene. In a still further aspect, the anti-drip agent is a mixture of poly(tetrafluoroethylene) and styrene acrylonitrile resin.

In a further aspect, the anti-drip agent is present in an amount from about 0 wt % to about 9 wt %. In a still further aspect, the anti-drip agent is present in an amount from about 0 wt % to about 8 wt %. In yet a further aspect, the anti-drip agent is present in an amount from about 0 wt % to about 7 wt %. In an even further aspect, the anti-drip agent is present in an amount from about 0 wt % to about 6 wt %. In a still further aspect, the anti-drip agent is present in an amount from about 0 wt % to about 5 wt %. In yet a further aspect, the anti-drip agent is present in an amount from about 0 wt % to about 4 wt %. In an even further aspect, the anti-drip agent is present in an amount from about 0 wt % to about 3 wt %. In a still further aspect, the anti-drip agent is present in an amount from about 0 wt % to about 2 wt %. In yet a further aspect, the anti-drip agent is present in an amount from about 0 wt % to about 1 wt %.

In a further aspect, the anti-drip agent is present in an amount from about 0.1 wt % to about 9 wt %. In a still further aspect, the anti-drip agent is present in an amount from about 0.1 wt % to about 8 wt %. In yet a further aspect, the anti-drip agent is present in an amount from about 0.1 wt % to about 7 wt %. In an even further aspect, the anti-drip agent is present in an amount from about 0.1 wt % to about 6 wt %. In a still further aspect, the anti-drip agent is present in an amount from about 0.1 wt % to about 5 wt %. In yet a further aspect, the anti-drip agent is present in an amount from about 0.1 wt % to about 4 wt %. In an even further aspect, the anti-drip agent is present in an amount from about 0.1 wt % to about 3 wt %. In a still further aspect, the anti-drip agent is present in an amount from about 0.1 wt % to about 2 wt %. In yet a further aspect, the anti-drip agent is present in an amount from about 0.1 wt % to about 1 wt %.

In a further aspect, the anti-drip agent is present in an amount from about 1 wt % to about 10 wt %. In a still further aspect, the anti-drip agent is present in an amount from about 1 wt % to about 9 wt %. In yet a further aspect, the anti-drip agent is present in an amount from about 1 wt % to about 8 wt %. In an even further aspect, the anti-drip agent is present in an amount from about 1 wt % to about 7 wt %. In a still further aspect, the anti-drip agent is present in an amount from about 1 wt % to about 6 wt %. In yet a further aspect, the anti-drip agent is present in an amount from about 1 wt % to about 5 wt %. In an even further aspect, the anti-drip agent is present in an amount from about 1 wt % to about 4 wt %. In a still further aspect, the anti-drip agent is present in an amount from about 1 wt % to about 3 wt %. In yet a further aspect, the anti-drip agent is present in an amount from about 1 wt % to about 2 wt %.

In a further aspect, the anti-drip agent is a styrene-acrylonitrile copolymer encapsulated polytetrafluoroethylene.

Optional Silicone-Containing Char-Forming Agent

In various aspects, the disclosure pertains to blended thermoplastic compositions comprising one or more silicone-containing char-forming agent. In a further aspect the silicone-containing char-forming agent comprises at least one organopolysiloxane material. In a still further aspect, the silicone-containing char-forming agent comprises at least one oligomeric organosiloxane material. In a yet further aspect, the organopolysiloxane comprises polydimethylsiloxane. In an even further aspect, the organopolysiloxane is a copolymer.

In a further aspect, the organopolysiloxane copolymer is selected from a block copolymer, an alternating copolymer, a star block copolymer, and a random copolymer. In a still further aspect, the organopolysiloxane copolymer is selected from a polycarbonate-polysiloxane copolymer, polyamide-polysiloxane copolymer, polyester-polysiloxane copolymer, polymethylmethacrylate-polysiloxane copolymer, polyetherimide-polysiloxane copolymer, and polyphenylene-ether copolymer, or combinations thereof.

In a further aspect, the silicone-containing char-forming agent comprises linear, for example, including, but not limited to, α,ω-dihydroxyalkyl, polydimethylsiloxanes of molecular mass from about 1,500 Daltons to about 10,000 Daltons. In a yet further aspect, the polydimethylsiloxane has a molecular mass from about 2,000 Daltons to about 4,000 Daltons. In a yet further aspect, the polydimethylsiloxane has a molecular mass from about 2,000 Daltons to about 3,000 Daltons. In an even further aspect, the polydimethylsiloxane has a molecular mass from about 1,500 Daltons to about 3,000 Daltons. Suitable polydimethylsiloxane materials useful as silicon-containing char-forming agents are commercially available, e.g. include, but are not limited to, Tegomer® H-Si 2111 and Tegomer® H-Si 2311 (Goldschmidt AG).

As used herein, the term "linear" is intended to denote that the compounds contain on average per molecule not more than about 0.5, preferably less than about 0.3, and with particular preference less than about 0.1 branching site, i.e., that the (average) hydroxyl functionality is not more than about 2.5, preferably not more than about 2.3, and with particular preference not more than about 2.1. The term "substantially difunctional" is intended to denote that the compounds contain on average per molecule not more than about 0.1 and preferably no branching sites, i.e., that the average. hydroxyl functionality is not more than about 2.1, and is preferably about 2.0.

In a further aspect, the polydimethylsiloxane is a hydroxy (poly-caprolactone)-modified polydimethylsiloxane. In a still further aspect, the polydimethylsiloxane is a triblock copolymer of poly-caprolactone-polydimethylsiloxane-polycaprolactone. Triblock copolymers having a polydimethylsiloxane (PDMS) block flanked by polylactone (PL) blocks have been described by Lovinger, J. et al (1993), J. Polymer Sci. Part B. (Polymer Physics) 31:115-123. PL-PDMS-PL triblock copolymers are commercially available, for example from Thoratec Laboratories, Berkley, Calif., which provides a series of such polymers designated SMA in which the siloxane is dimethyl siloxane and the lactone is caprolactone, and from Th. Goldsmith A G, Essen, Germany, under the name TEGOMER (trademark, Goldsmith A G). The nominal molecular weights (number average) of the polysiloxane blocks suitable for use herein range from about 1000-5000, while the nominal molecular weights of the caprolactone blocks range from about 1000 to about 10,000. Suitable hydroxy(poly-caprolactone)-modified polydimethylsiloxane are commercially available, e.g. include, but are not limited to Tegomer® H-Si 6440 (Goldschmidt AG).

In various aspects, the silicone-containing char-forming agent is a polyalkylaryl siloxane comprising compounds having a structure represented by the formula:

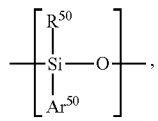

wherein $R^{50}$ is substituted or unsubstituted C1 to C18 alkyl, and $Ar^{50}$ is substituted or unsubstituted C6 to C12 aryl. In a further aspect, $R^{50}$ is substituted or unsubstituted C1 to C6 alkyl and $Ar^{50}$ is phenyl. In a still further aspect, $R^{50}$ is methyl C1 to C6 alkyl and $A^{50}$ is phenyl. In an even further aspect, the polyalkylaryl siloxane is a compound having a structure represented by a formula:

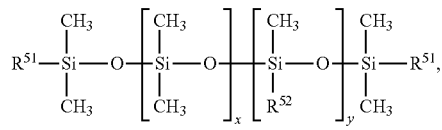

where each $R^{51}$ is methyl and each $R^{52}$ is phenyl and x and y can vary in ratio but sum to 1.

In a further aspect, the polyalkylaryl siloxane can have a weight average molecular weight of about 400 Daltons to about 1,000 Daltons, for example about 600 Daltons to about 800 Daltons.

In a further aspect, the polyalkylaryl siloxane is selected from polymethylphenyl siloxane, polyethylphenyl siloxane, polypropylphenyl siloxane, polybutylphenyl siloxane, polypentylphenyl siloxane, polyhexylphenyl siloxane, and combinations thereof. In a still further aspect, the polyalkylarylsiloxane is polymethylphenylsiloxane. Suitable polyalkylaryl siloxanes are commercially available, e.g. include, but are not limited to, TSF437 (Toshiba Silicone Co. LTD.), SF-1023 (GE Silicones) and EC 4952 (Emerson Cummings Co).

In a further aspect, the silicone-containing char-forming agent is present in an amount from about 1 wt % to about 10 wt %. In a still further aspect, the silicone-containing char-forming agent is present in an amount from about 1 wt % to about 9 wt %. In yet a further aspect, the silicone-containing char-forming agent is present in an amount from about 1 wt % to about 8 wt %. In an even further aspect, the silicone-containing char-forming agent is present in an amount from about 1 wt % to about 7 wt %. In a still further aspect, the silicone-containing char-forming agent is present in an amount from about 1 wt % to about 6 wt %. In yet a further aspect, the silicone-containing char-forming agent is present in an amount from about 1 wt % to about 5 wt %.

In a further aspect, the silicone-containing char-forming agent is present in an amount from about 0.1 wt % to about 9 wt %. In a still further aspect, the silicone-containing char-forming agent is present in an amount from about 0.1 wt % to about 8 wt %. In yet a further aspect, the silicone-containing char-forming agent is present in an amount from about 0.1 wt % to about 7 wt %. In an even further aspect, the silicone-containing char-forming agent is present in an amount from about 0.1 wt % to about 6 wt %. In a still further aspect, the silicone-containing char-forming agent is present in an amount from about 0.1 wt % to about 5 wt %. In yet a further aspect, the silicone-containing char-forming agent is present in an amount from about 0.1 wt % to about 4 wt %. In an even further aspect, the silicone-containing char-forming agent is present in an amount from about 0.1 wt % to about 3 wt %. In a still further aspect, the silicone-containing char-forming agent is present in an amount from about 0.1 wt % to about 2 wt %. In a still further aspect, the silicone-containing char-forming agent is present in an amount from about 0.1 wt % to about 1 wt %.

In a further aspect, the silicone-containing char-forming agent is present in an amount from about 0 wt % to about 9 wt %. In a still further aspect, the silicone-containing char-forming agent is present in an amount from about 0 wt % to about 8 wt %. In yet a further aspect, the silicone-containing char-forming agent is present in an amount from about 0 wt % to about 7 wt %. In an even further aspect, the silicone-containing char-forming agent is present in an amount from about 0 wt % to about 6 wt %. In a still further aspect, the silicone-containing char-forming agent is present in an amount from about 0 wt % to about 5 wt %. In yet a further aspect, the silicone-containing char-forming agent is present in an amount from about 0 wt % to about 4 wt %. In an even further aspect, the silicone-containing char-forming agent is present in an amount from about 0 wt % to about 3 wt %. In a still further aspect, the silicone-containing char-forming agent is present in an amount from about 0 wt % to about 2 wt %. In yet a further aspect, the silicone-containing char-forming agent is present in an amount from about 0 wt % to about 1 wt %.

Optional Chain Extender

The disclosed polymer compositions can optionally comprise a chain extender component. In a further aspect, the chain extender is selected from a polymeric chain extender, a multifunctional modified styrene-acrylic oligomer, a multifunctional amino extender, and a multifunctional carboxyl extender, or combinations thereof.

In various aspects, the chain extender component can be a monofunctional or a polyfunctional chain extender material that can be either polymeric or non-polymeric. Examples of carboxy reactive groups include epoxides, carbodiimides, orthoesters, oxazolines, oxiranes, aziridines, and anhydrides. The chain extender component can also include other functionalities that are either reactive or non-reactive under the described processing conditions. Non-limiting examples of reactive moieties include reactive silicon-containing materials, for example epoxy-modified silicone and silane monomers and polymers.

The term "polyfunctional" or "multifunctional" in connection with the chain extender material means that at least two carboxy reactive groups are present in each molecule of the material. Particularly useful polyfunctional chain extender materials include materials with at least two reactive epoxy groups. The polyfunctional epoxy material can contain aromatic and/or aliphatic residues. Examples include epoxy novolac resins, cycloaliphatic epoxy resins, the reaction product of epoxidized vegetable (e.g., soybean, linseed) oils, epoxy resins based on bisphenol A, tetraphenylethylene epoxide, styrene-acrylic copolymers containing pendant glycidyl groups, glycidyl methacrylate-containing polymers and copolymers, and difunctional epoxy compounds such as 3,4-epoxycyclohexylmethyl-3,4-epoxycyclohexanecarboxylate.

In one aspect, the polyfunctional chain extender material is an epoxy-functional polymer, which as used herein includes oligomers. Exemplary polymers having multiple epoxy groups include the reaction products of one or more ethylenically unsaturated compounds (e.g., styrene, ethylene and the like) with an epoxy-containing ethylenically unsaturated monomer (e.g., a glycidyl C1-4 (alkyl)acrylate, allyl glycidyl ethacrylate, and glycidyl itoconate).

For example, in one aspect the polyfunctional chain extender material is a styrene-acrylic copolymer (including an oligomer) containing glycidyl groups incorporated as side chains. Several useful examples are described in the International Patent Application WO 03/066704 A1, assigned to Johnson Polymer, LLC, which is incorporated herein by reference in its entirety. These materials are based on copolymers with styrene and acrylate building blocks that have glycidyl groups incorporated as side chains. A high number of epoxy groups per polymer chain is desired, at least 10, for example, or greater than 15, or greater than 20. These polymeric materials generally have a molecular weight greater than 3000, specifically greater than 4000, and more specifically greater than 6000. These are commercially available for example from Johnson Polymer, LLC (now BASF) under the trade name of JONCRYL, more specifically, JONCRYL ADR 4368.

Another example of a carboxy reactive copolymer is the reaction product of an epoxy-functional C1-4(alkyl)acrylic monomer with a non-functional styrenic and/or C1-4(alkyl) acrylate and/or olefin monomer. In one aspect the epoxy polymer is the reaction product of an epoxy-functional (meth) acrylic monomer and a non-functional styrenic and/or (meth) acrylate monomer. These chain extender materials are characterized by relatively low molecular weights. In another aspect, the chain extender material is an epoxy-functional styrene (meth)acrylic copolymer produced from an epoxy functional (meth)acrylic monomer and styrene. As used herein, the term "(meth)acrylic" includes both acrylic and methacrylic monomers, and the term "(meth)acrylate" includes both acrylate and methacrylate monomers. Examples of specific epoxy-functional (meth)acrylic monomers include, but are not limited to, those containing 1,2-epoxy groups such as glycidyl acrylate and glycidyl methacrylate.

Suitable C1-4(alkyl)acrylate comonomers include, but are not limited to, acrylate and methacrylate monomers such as methyl acrylate, ethyl acrylate, n-propyl acrylate, propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, and isobornyl methacrylate. Combinations comprising at least one of the foregoing comonomers can be used.

Suitable styrenic monomers include, but are not limited to, styrene, alpha-methyl styrene, vinyl toluene, p-methyl styrene, t-butyl styrene, o-chlorostyrene, and mixtures comprising at least one of the foregoing. In certain aspects the styrenic monomer is styrene and/or alpha-methyl styrene.

Other suitable materials with multiple epoxy groups are acrylic and/or polyolefin copolymers and oligomers containing glycidyl groups incorporated as side chains. Suitable epoxy-functional materials are available from Dow Chemical Company under the trade name DER332, DER661, and DER667; from Resolution Performance Products (now Hexion Performance Chemicals, Inc.) under the trade name EPON Resin 1001F, 1004F, 1005F, 1007F, and 1009F; from Shell Oil Corporation (now Hexion Performance Chemicals, Inc.) under the trade names EPON 826, 828, and 871; from Ciba-Geigy Corporation under the trade names CY-182 and CY-183; and from Dow Chemical Co. under the trade names ERL-4221 and ERL-4299. Johnson Polymer Co. (now owned by BASF) is a supplier of an epoxy functionalized material known as ADR 4368 and ADR 4300. A further example of a polyfunctional chain extender material is a copolymer or terpolymer including units of ethylene and glycidyl methacrylate (GMA), sold by Arkema under the trade name of LOTADER. In one aspect, the chain extender material is a combination comprising a poly(ethylene-glycidyl methacrylate-co-methacrylate).

In another aspect, the chain extender material is an epoxy compound having two terminal epoxy functionalities, and optionally additional epoxy (or other) functionalities. The compound can further contain only carbon, hydrogen, and oxygen. Difunctional epoxy compounds, in particular those containing only carbon, hydrogen, and oxygen can have a molecular weight of below 1000 g/mol, to facilitate blending with the polyester resin. In one aspect the difunctional epoxy compounds have at least one of the epoxide groups on a cyclohexane ring. Exemplary difunctional epoxy compounds include, but are not limited to, 3,4-epoxycyclohexyl-3,4-epoxycyclohexyl carboxylate, bis(3,4-epoxycyclohexylmethyl)adipate, vinylcyclohexene di-epoxide, bisphenol diglycidyl ethers such as bisphenol-A diglycidyl ether, tetrabromobisphenol-A diglycidyl ether, glycidol, diglycidyl adducts of amines and amides, diglycidyl adducts of carboxylic acids such as the diglycidyl ester of phthalic acid, the diglycidyl ester of hexahydrophthalic acid, and bis(3,4-epoxy-6-methylcyclohexylmethyl)adipate, butadiene diepoxide, vinylcyclohexene diepoxide, dicyclopentadiene diepoxide, and the like.

The difunctional epoxide compounds can be made by techniques well known to those skilled in the art. For example, the corresponding α- or β-dihydroxy compounds can be dehydrated to produce the epoxide groups, or the corresponding unsaturated compounds can be epoxidized by treatment with a peracid, such as peracetic acid, in well-known techniques. The compounds are also commercially available.

In a further aspect, the chain extender is a multifunctional modified styrene-acrylic oligomer. In a still further aspect, the multifunctional modified styrene-acrylic oligomer is an epoxy functional styrene acrylic copolymer.

In a further aspect, the number of epoxy groups per polymer chain greater than or equal to about 10. In a still further aspect, the number of epoxy groups per polymer chain greater than or equal to about 15. In yet a further aspect, the number of epoxy groups per polymer chain greater than or equal to about 20.

In a further aspect, the weight average molecular weight of the styrene-acrylic copolymer is less than or equal to about 3,000 Daltons. In a still further aspect, the weight average molecular weight of the styrene-acrylic copolymer is less than or equal to about 4,000 Daltons. In yet a further aspect, the weight average molecular weight of the styrene-acrylic copolymer is less than or equal to about 5,000 Daltons. In an even further aspect, the weight average molecular weight of the styrene-acrylic copolymer is less than or equal to about 6,000 Daltons. In a still further aspect, the weight average molecular weight of the styrene-acrylic copolymer is less than or equal to about 7,000 Daltons. In yet a further aspect, the weight average molecular weight of the styrene-acrylic copolymer is less than or equal to about 8,000 Daltons. In an even further aspect, the weight average molecular weight of the styrene-acrylic copolymer is less than or equal to about 9,000 Daltons. In a still further aspect, the weight average molecular weight of the styrene-acrylic copolymer is less than or equal to about 10,000 Daltons.

In a further aspect, the chain extender agent is present in an amount from about 0.05 wt % to about 1.5 wt %. In a still further aspect, the chain extender agent is present in an amount from about 0.05 wt % to about 1.4 wt %. In yet a further aspect, the chain extender agent is present in an amount from about 0.05 wt % to about 1.3 wt %. In an even further aspect, the chain extender agent is present in an amount from about 0.05 wt % to about 1.2 wt %. In a still further aspect, the chain extender agent is present in an amount from about 0.05 wt % to about 1.1 wt %. In yet a further aspect, the chain extender agent is present in an amount from about 0.05 wt % to about 1.0 wt %. In an even further aspect, the chain extender agent is present in an amount from about 0.05 wt % to about 0.75 wt %. In a still further aspect, the chain extender agent is present in an amount from about 0.05 wt % to about 0.50 wt %. In yet a further aspect, the chain extender agent is present in an amount from about 0.05 wt % to about 0.25 wt %.

Optional Polymer Composition Additives

The disclosed polymer compositions can optionally comprise one or more additives conventionally used in the manufacture of molded thermoplastic parts with the proviso that the optional additives do not adversely affect the desired properties of the resulting composition. Mixtures of optional additives can also be used. Such additives can be mixed at a suitable time during the mixing of the components for forming the composite mixture. In one aspect, the disclosed compositions can comprise one or more an antioxidant, antistatic agent, chain extender, colorant, de-molding agent, dye, flow promoter, flow modifier, light stabilizer, lubricant, mold release agent, pigment, quenching agent, thermal stabilizer, UV absorbent substance, UV reflectant substance, and UV stabilizer, or combinations thereof. In one aspect, the composition further comprises one or more optional additives selected from an antioxidant, flame retardant, and stabilizer.

Exemplary heat stabilizers include, for example, organophosphites such as triphenylphosphite, tris-(2,6-dimethylphenyl)phosphite, tris-(mixed mono- and di-nonylphenyl) phosphite or the like; phosphonates such as dimethylbenzenephosphonate or the like, phosphates such as trimethyl phosphate, or the like, or combinations including at least one of the foregoing heat stabilizers. Heat stabilizers are generally used in amounts of from 0.01 to 0.5 parts by weight based on 100 parts by weight of the total composition, excluding any filler.

In various aspects, the disclosure further comprises an antioxidant. Exemplary antioxidants include, for example, organophosphites such as tris(nonyl phenyl)phosphite, tris(2, 4-di-t-butylphenyl)phosphite, bis(2,4-di-t-butylphenyl)pentaerythritoldiphosphite, distearylpentaerythritoldiphosphite or the like; alkylated monophenols or polyphenols; alkylated reaction products of polyphenols with dienes, such as tetrakis [methylene(3,5-di-tert-butyl-4-hydroxyhydrocinnamate)] methane, or the like; butylated reaction products of paracresol or dicyclopentadiene; alkylated hydroquinones; hydroxylatedthiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations including at least one of the foregoing antioxidants. Antioxidants are generally used in amounts of from 0.01 to 0.5 parts by weight, based on 100 parts by weight of the total composition, excluding any filler.

In a further aspect, the antioxidant is a primary antioxidant, a secondary antioxidant, or combinations thereof.

In a further aspect, the primary antioxidant is selected from a hindered phenol and secondary aryl amine, or a combination thereof. In a still further aspect, the hindered phenol comprises one or more compounds selected from triethylene glycol bis[3-(3-t-butyl-5-methyl-4-hydroxyphenyl)propionate], 1,6-hexanediol bis[3-(3,5-di-t-butyl-4-hydroxyphenyl)propionate], 2,4-bis(n-octylthio)-6-(4-hydroxy-3,5-di-t-butylanilino)-1,3,5-triazine, pentaerythrityl tetrakis[3-(3,5-di-t-butyl-4-hydroxyphenyl)propionate], 2,2-thiodiethylene bis[3-(3,5-di-t-butyl-4-hydroxyphenyl)propionate], octadecyl 3-(3,5-di-t-butyl-4-hydroxyphenyl)propionate, N,N'-hexamethylene bis(3,5-di-t-butyl-4-hydroxy-hydrocinnamamide), tetrakis(methylene 3,5-di-tert-butyl-hydroxycinnamate)methane, and octadecyl 3,5-di-tert-butylhydroxyhydrocinnamate. In yet a further aspect, the hindered phenol comprises octadecyl-3-(3,5-di-t-butyl-4-hydroxyphenyl)-propionate.

In a further aspect, the primary anti-oxidant is present in an amount from about 0.01 wt % to about 0.50 wt %. In a still further aspect, the primary anti-oxidant is present in an amount from about 0.01 wt % to about 0.40 wt %. In yet a further aspect, the primary anti-oxidant is present in an amount from about 0.01 wt % to about 0.30 wt %. In an even further aspect, the primary anti-oxidant is present in an amount from about 0.01 wt % to about 0.20 wt %. In a still further aspect, the primary anti-oxidant is present in an amount from about 0.01 wt % to about 0.10 wt %.

In a further aspect, the secondary anti-oxidant is selected from an organophosphate and thioester, or a combination thereof. In a still further aspect, the secondary anti-oxidant comprises one or more compounds selected from tetrakis(2,4-di-tert-butylphenyl) [1,1-biphenyl]-4,4'-diylbisphosphonite, tris(2,4-di-tert-butylphenyl)phosphite, bis(2,4-di-tert-butylphenyl)pentaerythritol diphosphite, bis(2,4-dicumylphenyl)pentaerytritoldiphosphite, tris(nonyl phenyl) phosphite, and distearyl pentaerythritol diphosphite. In a still further aspect, the secondary anti-oxidant comprises tris(2,4-di-tert-butylphenyl)phosphite.

In a further aspect, the secondary anti-oxidant is present in an amount from about 0.01 wt % to about 0.50 wt %. In a still further aspect, the secondary anti-oxidant is present in an amount from about 0.01 wt % to about 0.40 wt %. In yet a further aspect, the secondary anti-oxidant is present in an amount from about 0.01 wt % to about 0.30 wt %. In an even further aspect, the secondary anti-oxidant is present in an amount from about 0.01 wt % to about 0.20 wt %. In a still further aspect, the secondary anti-oxidant is present in an amount from about 0.01 wt % to about 0.10 wt %.

Exemplary light stabilizers include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone or the like or combinations including at least one of the foregoing light stabilizers. Light stabilizers are generally used in amounts of from 0.1 to 1.0 parts by weight, based on 100 parts by weight of the total composition, excluding any filler.

In various aspects, the disclosure further comprises a mold release agent. Exemplary mold releasing agents include for example, metal stearate, stearyl stearate, pentaerythritoltetrastearate, beeswax, montan wax, paraffin wax, or the like, or combinations including at least one of the foregoing mold release agents. In a further aspect, the mold release agent is an alkyl carboxylic acid ester. In a still further aspect, the alkyl carboxylic acid ester is selected from pentaerythritol tetrastearate, glycerin tristearate and ethylene glycol distearate. In yet a further aspect, the alkyl carboxylic acid ester is pentaerythritol tetrastearate.

Mold releasing agents are generally used in amounts of from 0.1 to 1.0 parts by weight, based on 100 parts by weight of the total composition, excluding any filler. In a further aspect, the mold release agent is present in an amount from about 0.05 wt % to about 1.0 wt %. In a still further aspect, the mold release agent is present in an amount from about 0.05 wt % to about 0.75 wt %. In yet a further aspect, the mold release agent is present in an amount from about 0.05 wt % to about 0.50 wt %. In an even further aspect, the mold release agent is present in an amount from about 0.05 wt % to about 0.30 wt %.

Exemplary plasticizers include, for example, phthalic acid esters such as dioctyl-4,5-epoxy-hexahydrophthalate, tris-(octoxycarbonylethyl) isocyanurate, tristearin, epoxidized soybean oil or the like, or combinations including at least one of the foregoing plasticizers. Plasticizers are generally used in amounts of from 0.5 to 3.0 parts by weight, based on 100 parts by weight of the total composition, excluding any filler.

Exemplary antistatic agents include, for example, glycerol monostearate, sodium stearylsulfonate, sodium dodecylbenzenesulfonate or the like, or combinations of the foregoing antistatic agents. In one aspect, carbon fibers, carbon nanofibers, carbon nanotubes, carbon black, or any combination of the foregoing can be used in a polymeric resin containing chemical antistatic agents to render the composition electrostatically dissipative.

Exemplary UV absorbers include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy]methyl] propane (UVINUL™ 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than 100 nanometers; or the like, or combinations including at least one of the foregoing UV absorbers. UV absorbers are generally used in amounts of from 0.01 to 3.0 parts by weight, based on 100 parts by weight of the total composition, excluding any filler.

Exemplary lubricants include for example, fatty acid esters such as alkyl stearyl esters, e.g., methyl stearate or the like; mixtures of methyl stearate and hydrophilic and hydrophobic surfactants including polyethylene glycol polymers, polypropylene glycol polymers, and copolymers thereof e.g., methyl stearate and polyethylene-polypropylene glycol copolymers in a suitable solvent; or combinations including at least one of the foregoing lubricants. Lubricants are generally used in amounts of from 0.1 to 5 parts by weight, based on 100 parts by weight of the total composition, excluding any filler.

Exemplary blowing agents include for example, low boiling halohydrocarbons and those that generate carbon dioxide; blowing agents that are solid at room temperature and when heated to temperatures higher than their decomposition temperature, generate gases such as nitrogen, carbon dioxide, ammonia gas, such as azodicarbonamide, metal salts of azodicarbonamide, 4,4' oxybis(benzenesulfonylhydrazide), sodium bicarbonate, ammonium carbonate, or the like, or combinations including at least one of the foregoing blowing agents. Blowing agents are generally used in amounts of from 1 to 20 parts by weight, based on 100 parts by weight of the total composition, excluding any filler.

Additionally, materials to improve flow and other properties can be added to the composition, such as low molecular weight hydrocarbon resins. Particularly useful classes of low molecular weight hydrocarbon resins are those derived from petroleum $C_5$ to $C_9$ feedstock that are derived from unsaturated $C_5$ to $C_9$ monomers obtained from petroleum cracking. Non-limiting examples include olefins, e.g., pentenes, hexenes, heptenes and the like; diolefins, e.g., pentadienes, hexadienes and the like; cyclic olefins and diolefins, e.g., cyclopentene, cyclopentadiene, cyclohexene, cyclohexadiene, methyl cyclopentadiene and the like; cyclic diolefindienes, e.g., dicyclopentadiene, methylcyclopentadiene dimer and the like; and aromatic hydrocarbons, e.g., vinyltoluenes, indenes, methylindenes and the like. The resins can additionally be partially or fully hydrogenated.

Methods of Manufacture

The compositions of the present disclosure can be blended with the aforementioned ingredients by a variety of methods involving intimate admixing of the materials with any additional additives desired in the formulation. Because of the availability of melt blending equipment in commercial polymer processing facilities, melt processing methods are generally preferred. Illustrative examples of equipment used in such melt processing methods include: co-rotating and counter-rotating extruders, single screw extruders, co-kneaders, disc-pack processors and various other types of extrusion equipment. The temperature of the melt in the present process is preferably minimized in order to avoid excessive degradation of the resins. It is often desirable to maintain the melt temperature between about 230° C. and about 350° C. in the molten resin composition, although higher temperatures can be used provided that the residence time of the resin in the processing equipment is kept short. In some embodiments the melt processed composition exits processing equipment such as an extruder through small exit holes in a die. The resulting strands of molten resin are cooled by passing the strands through a water bath. The cooled strands can be chopped into small pellets for packaging and further handling.

Compositions can be manufactured by various methods. For example, polymer, and/or other optional components are first blended, optionally with fillers in a HENSCHEL-Mixer® high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a sidestuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

In a further aspect, during the injection molding step, the phosphorus-containing flame retardant and thermally conductive filler can be mixed with the thermoplastic polymer. In another aspect, the blend composition further comprises one or more optional additives selected from an primary antioxidant, secondary anti-oxidant, additional fillers, and stabilizer. In a still further aspect, single shot injection molding can be used to produce the parts or articles to be laser structured. In another aspect, additional ingredients can be added to the polymer composition after this step.

In one aspect, the disclosure relates to a method of improving thermal conductivity properties of a blended thermoplastic composition, the method comprising the step of combining (a) from about 20% wt % to about 80% wt % of a polycarbonate polymer; (b) from about 3% wt % to about 30% wt % of a phosphorus-containing flame retardant; (c) from about 10% wt % to about 70% wt % of a filler comprising at least one thermally conductive filler and at least one thermally insulating filler; (d) from about 0% wt % to about 10% wt % of an anti-drip agent; and (e) from about 0% wt % to about 10% wt % of a silicone-containing char-forming agent; wherein the combined weight percent value of all components does not exceed about 100 wt %; wherein all weight percent values are based on the total weight of the composition; wherein a molded sample of the blended thermoplastic composition is capable of achieving UL94 V0 rating at a thickness of 1.2 mm (±10%); and wherein the through-plane thermal conductivity when determined in accordance with ASTM E1461 of greater than or equal to about 0.4 W/mK.

In a further aspect, the disclosure relates to a method of improving thermal conductivity properties of a blended thermoplastic composition as described above, wherein combining comprises the steps of (a) pre-blending from about 20 wt % to about 80 wt % of the polycarbonate polymer powder with from about 3 wt % to about 30 wt % of the phosphorus-containing flame retardant to provide a pre-blended polycarbonate polymer and phosphorus-containing flame retardant; (b) feeding the pre-blended polycarbonate polymer and phosphorus-containing flame retardant into an extruder apparatus; (c) compounding in the extruder apparatus the pre-blended polycarbonate polymer and phosphorus-containing flame retardant with from about 0% wt % to about 10% wt % of the anti-drip agent and from about 0% wt % to about 10% wt % of a silicone-containing char-forming agent; and (d) feeding into a downstream extruder zone of the extruder apparatus from about 10% wt % to about 70% wt % of the filler comprising at least one thermally conductive filler and at least one thermally insulating filler.

In a further aspect, the method comprises forming a molded part from the composition.

Articles of Manufacture

In one aspect, the present disclosure pertains to shaped, formed, or molded articles comprising the blended thermoplastic compositions. The blended thermoplastic compositions can be molded into useful shaped articles by a variety of means such as injection molding, extrusion, rotational molding, blow molding and thermoforming to form articles such as, for example, personal computers, notebook and portable computers, cell phone antennas and other such communications equipment, medical applications, RFID applications, automotive applications, and the like. In a further aspect, the article is extrusion molded. In a still further aspect, the article is injection molded.

In various aspects, the polymer composition can be used in the field of electronics. In a further aspect, non-limiting examples of fields which can use the disclosed blended thermoplastic polymer compositions include electrical, electromechanical, radio frequency (RF) technology, telecommunication, automotive, aviation, medical, sensor, military, and security. In a still further aspect, the use of the disclosed blended thermoplastic polymer compositions can also be present in overlapping fields, for example in mechatronic systems that integrate mechanical and electrical properties which may, for example, be used in automotive or medical engineering.

In a further aspect, the article is an electronic device, automotive device, telecommunication device, medical device, security device, or mechatronic device. In a still further aspect, the article is selected from a computer device, electromagnetic interference device, printed circuit, Wi-Fi device, Bluetooth device, GPS device, cellular antenna device, smart phone device, automotive device, medical device, sensor device, security device, shielding device, RF antenna device, LED device, and RFID device. In yet a further aspect, the article is selected from a computer device, sensor device, security device, RF antenna device, LED device and RFID device. In an even further aspect, the article is selected from a computer device, RF antenna device, LED device and RFID device. In a still further aspect, the article is selected from a RF antenna device, LED device and RFID device. In yet a further aspect, the article is selected from a RF antenna device and RFID device. In an even further aspect, the article is a LED device. In a still further aspect, the LED device is selected from a LED tube, a LED socket, and a LED heat sink.

In various aspects, molded articles according to the present disclosure can be used to produce a device in one or more of the foregoing fields. In a still further aspect, non-limiting examples of such devices in these fields which can use the disclosed blended thermoplastic polymer compositions according to the present disclosure include computer devices, household appliances, decoration devices, electromagnetic interference devices, printed circuits, Wi-Fi devices, Bluetooth devices, GPS devices, cellular antenna devices, smart phone devices, automotive devices, military devices, aerospace devices, medical devices, such as hearing aids, sensor devices, security devices, shielding devices, RF antenna devices, or RFID devices.

In a further aspect, the molded articles can be used to manufacture devices in the automotive field. In a still further aspect, non-limiting examples of such devices in the automotive field which can use the disclosed blended thermoplastic compositions in the vehicle's interior include adaptive cruise control, headlight sensors, windshield wiper sensors, and door/window switches. In a further aspect, non-limiting examples of devices in the automotive field which can the disclosed blended thermoplastic compositions in the vehicle's exterior include pressure and flow sensors for engine management, air conditioning, crash detection, and exterior lighting fixtures.

In a further aspect, the resulting disclosed compositions can be used to provide any desired shaped, formed, or molded articles. For example, the disclosed compositions can be molded into useful shaped articles by a variety of means such as injection molding, extrusion, rotational molding, blow molding and thermoforming. As noted above, the disclosed compositions are particularly well suited for use in the manufacture of electronic components and devices. As such, according to some aspects, the disclosed compositions can be used to form articles such as printed circuit board carriers, burn in test sockets, flex brackets for hard disk drives, and the like.

In various aspects, the present disclosure pertains to and includes at least the following aspects.

Without further elaboration, it is believed that one skilled in the art can, using the description herein, utilize the present disclosure. The following examples are included to provide addition guidance to those skilled in the art of practicing the claimed disclosure. The examples provided are merely representative of the work and contribute to the teaching of the present disclosure. Accordingly, these examples are not intended to limit the disclosure in any manner.

While aspects of the present disclosure can be described and claimed in a particular statutory class, such as the system statutory class, this is for convenience only and one of skill in the art will understand that each aspect of the present disclosure can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present disclosure is not entitled to antedate such publication by virtue of prior disclosure. Further, the dates of publication provided herein can be different from the actual publication dates, which can require independent confirmation.

ASPECTS

The present disclosure comprises at least the following aspects.

Aspect 1: A blended thermoplastic composition comprising: from about 20% wt % to about 80% wt % of a polycarbonate polymer; from about 3% wt % to about 30% wt % of a phosphorus-containing flame retardant; from about 10% wt % to about 70% wt % of a filler comprising at least one thermally conductive filler and at least one thermally insulating filler; wherein the combined weight percent value of all components does not exceed about 100 wt %; wherein all weight percent values are based on the total weight of the composition; wherein a molded sample of the blended thermoplastic composition is capable of achieving UL94 V0 rating at a thickness of 1.2 mm (±10%); and wherein a molded sample of the blended thermoplastic composition has a through-plane thermal conductivity when determined in accordance with ASTM E1461 of greater than or equal to about 0.4 W/mK.

Aspect 2: The composition of aspect 1, wherein the polycarbonate is a homopolymer.

Aspect 3: The composition of aspect 2, wherein the homopolymer comprises repeating units derived from bisphenol A.

Aspect 4: The composition of aspect 1, wherein the polycarbonate is a copolymer.

Aspect 5: The composition of aspect 4, wherein the copolymer comprises repeating units derived from BPA.

Aspect 6: The composition of aspect 4, wherein the copolymer comprises repeating units derived from sebacic acid.

Aspect 7: The composition of aspect 4, wherein the copolymer comprises repeating units derived from sebacic acid and BPA.

Aspect 8: The composition of any of aspects 1-7, wherein the polycarbonate has a weight average molecular weight from about 15,000 to about 75,000 grams/mole, as measured by gel permeation chromatography using BPA polycarbonate standards.

Aspect 9: The composition of aspect 4, wherein the copolymer comprises dimethylsiloxane repeating units.

Aspect 10: The composition of aspect 4 or 9, wherein the copolymer is a polycarbonate-polysiloxane copolymer.

Aspect 11: The composition of aspect 10, wherein the copolymer is a polycarbonate-polysiloxane block copolymer.

Aspect 12: The composition of aspects 10 or 11, wherein the polycarbonate-polysiloxane copolymer comprises repeating units derived from bisphenol A.

Aspect 13: The composition of aspects 11, wherein the polycarbonate block comprises residues derived from BPA.

Aspect 14: The composition of aspect 13, wherein the polycarbonate block comprising residues derived from BPA is a homopolymer.

Aspect 15: The composition of any of aspects 10-14, wherein the copolymer comprises dimethylsiloxane repeating units.

Aspect 16: The composition of any of aspects 10-15, wherein the polycarbonate-polysiloxane copolymer comprises a polysiloxane block from about 5 wt % to about 30 wt % of the polycarbonate-polysiloxane copolymer.

Aspect 17: The composition of any of aspects 1-16, wherein the polycarbonate polymer comprises a blend of at least two polycarbonate polymers.

Aspect 18: The composition of aspect 17, wherein the polycarbonate blend comprises a first polycarbonate polymer component and a second polycarbonate polymer component.

Aspect 19: The composition of aspect 18, wherein the first polycarbonate polymer component is a high flow polycarbonate.

Aspect 20: The composition of aspects 18 or 19, wherein the first polycarbonate polymer component has a melt volume flow rate (MVR) from about 17 grams/10 minutes to about 32 grams/10 minutes when measured at 300° C. and under a load of 1.2 kg according to ASTM D1238.

Aspect 21: The composition of any of aspects 18-20, wherein the second polycarbonate polymer component is a low flow polycarbonate.

Aspect 22: The composition of aspect 21, wherein the second polycarbonate polymer component has a melt volume flow rate (MVR) from about 4.0 grams/10 minutes to about 8.0 grams/10 minutes when measured at 300° C. and under a load of 1.2 kg according to ASTM D1238.

Aspect 23: The composition of aspect 17, wherein the polycarbonate blend comprises a first polycarbonate-polysiloxane copolymer and a second polycarbonate-polysiloxane copolymer.

Aspect 24: The composition of aspect 23, wherein the first polycarbonate-polysiloxane copolymer comprises a polysiloxane block from about 5 wt % to about 30 wt % of the first polycarbonate-polysiloxane copolymer; and wherein the second polycarbonate-polysiloxane copolymer comprises a polysiloxane block less than or equal to about 10 wt % of the second polycarbonate-polysiloxane copolymer.

Aspect 25: The composition of any of aspects 1-24, wherein the polycarbonate polymer is present in an amount from about 30 wt % to about 70 wt %.

Aspect 26: The composition of any of aspects 1-24, wherein the polycarbonate polymer is present in an amount from about 35 wt % to about 60 wt %.

Aspect 27: The composition of any of aspects 1-26, wherein the phosphorus-containing flame retardant is selected from a phosphine, a phosphine oxide, a bisphosphine, a phosphonium salt, a phosphinic acid salt, a phosphoric ester, and a phosphorous ester.

Aspect 28: The composition of aspect 27, wherein the phosphorus-containing flame retardant is selected from resorcinol bis(diphenyl phosphate), resorcinol bis(dixylenyl phosphate), hydroquinone bis(diphenyl phosphate), bisphenol-A bis(diphenyl phosphate), 4,4'-biphenol bis(diphenyl phosphate), triphenyl phosphate, methylneopentyl phosphite, pentaerythritol diethyl diphosphite, methyl neopentyl phosphonate, phenyl neopentyl phosphate, pentaerythritol diphenyldiphosphate, dicyclopentyl hypodiphosphate, dineopentyl hypophosphite, phenylpyrocatechol phosphite, ethylpyrocatechol phosphate and dipyrocatechol hypodiphosphate.

Aspect 29: The composition of any of aspects 1-28, wherein the phosphorus-containing flame retardant is present in an amount from about 3 wt % to about 15 wt %.

Aspect 30: The composition of any of aspects 1-28, wherein the phosphorus-containing flame retardant is present in an amount from about 3 wt % to about 12 wt %.

Aspect 31: The composition of any of aspects 1-30, further comprising at least one anti-drip agent.

Aspect 32: The composition of aspect 31, wherein anti-drip agent is a styrene-acrylonitrile copolymer encapsulated polytetrafluoroethylene.

Aspect 33: The composition of aspect 31 or 32, wherein the anti-drip agent is present in an amount from about 0 wt % to about 10 wt %.

Aspect 34: The composition of aspect 31 or 32, wherein the anti-drip agent is present in an amount from about 0 wt % to about 2 wt %.

Aspect 35: The composition of aspect 31 or 32, wherein the anti-drip agent is present in an amount from about 0 wt % to about 1 wt %.

Aspect 36: The composition of any of aspects 1-35, further comprising a silicone-containing char-forming agent.

Aspect 37: The composition of aspect 36, wherein the silicone-containing char-forming agent is an organopolysiloxane.

Aspect 38: The composition of aspect 37, wherein the organopolysiloxane is a copolymer.

Aspect 39: The composition of aspect 37, wherein the organopolysiloxane copolymer is selected from a block copolymer, an alternating copolymer, a star block copolymer, and a random copolymer.

Aspect 40: The composition of aspect 37, wherein the organopolysiloxane copolymer is selected from a polycarbonate-polysiloxane copolymer, polyamide-polysiloxane copolymer, polyester-polysiloxane copolymer, polymethylmethacrylate-polysiloxane copolymer, polyetherimide-polysiloxane copolymer, and polyphenylene-ether copolymer, or combinations thereof.

Aspect 41: The composition of any of aspects 1-40, wherein the silicone-containing char-forming agent is present in an amount from about 0 wt % to about 10 wt %.

Aspect 42: The composition of any of aspects 1-40, wherein the silicone-containing char-forming agent is present in an amount from about 0 wt % to about 5 wt %.

Aspect 43: The composition of any of aspects 1-40, wherein the silicone-containing char-forming agent is present in an amount from about 0 wt % to about 1 wt %.

Aspect 44: The composition of any of aspects 1-43, wherein the thermally conductive filler is TiO2 and the thermally insulating filler is H2Mg3(SiO3)4.

Aspect 45: The composition of any of aspects 1-43, wherein the thermally conductive filler is a high thermally conductive filler, wherein the high thermally conductive filler has a thermal conductivity greater than or equal to about 50 W/mK; or a low thermally conductive filler, wherein the low thermally conductive filler has a thermal conductivity from about 10 W/mK to about 30 W/mK; or a combinations thereof.

Aspect 46: The composition of any of aspects 1-43, wherein the thermally conductive filler is at least one high thermally conductive filler.

Aspect 47: The composition of aspects 45 or 46, wherein the high thermally conductive filler is selected from AlN, Al4C3, Al2O3, BN, AlON, MgSiN2, SiC, Si3N4, graphite, expanded graphite, graphene, and carbon fiber, or a combinations thereof.

Aspect 48: The composition of aspects 45 or 46, wherein the high thermally conductive filler is selected from AlN, Al2O3, BN, SiC, graphite, expanded graphite, and carbon fiber, or combinations thereof.

Aspect 49: The composition of aspects 45 or 46, wherein the high thermally conductive filler is selected from BN, graphite, and expanded graphite, or combinations thereof.

Aspect 50: The composition of any of aspects 1-43, wherein the thermally conductive filler is at least one low thermally conductive filler.

Aspect 51: The composition of aspect 45 or 50, wherein the low thermally conductive filler is selected from ZnS, CaO, MgO, ZnO, and TiO2, or combinations thereof.

Aspect 52: The composition of aspect 45 or 50, wherein the low thermally conductive filler is TiO2.

Aspect 53: The composition of any of aspects 1-51, wherein the thermally insulating filler has a thermal conductivity less than or equal to about 10 W/mK.

Aspect 54: The composition of aspect 53, wherein the thermally insulating filler is selected from H2Mg3(SiO3)4, CaCO3, Mg(OH)2, mica, BaO, γ-AlO(OH), α-AlO(OH), Al(OH)3, BaSO4, CaSiO3, ZrO2, SiO2, a glass bead, a glass fiber, MgO.xAl2O3, CaMg(CO3)2, a clay, or a combination thereof.

Aspect 55: The composition of aspect 53, wherein the thermally insulating filler is selected from H2Mg3(SiO3)4, Mg(OH)2, γ-AlO(OH), α-AlO(OH), and Al(OH)3, or combinations thereof.

Aspect 56: The composition of aspect 53, wherein the thermally insulating filler is selected from H2Mg3(SiO3)4, γ-AlO(OH), α-AlO(OH), and Al(OH)3, or combinations thereof.

Aspect 57: The composition of aspect 53, wherein the thermally insulating filler is H2Mg3(SiO3)4.

Aspect 58: The compositions of any of aspects 1-57, wherein the filler comprising at least one thermally conductive filler and at least one thermally insulating filler is present in an amount from about 20% wt % to about 50% wt %.

Aspect 59: The compositions of any of aspects 1-57, wherein the filler comprising at least one thermally conductive filler and at least one thermally insulating filler is present in an amount from about 20% wt % to about 40% wt %.

Aspect 60: The composition of any of aspects 1-59, further comprising an additive.

Aspect 61: The composition of aspect 60, wherein the additive is selected from an antioxidant, antistatic agent, chain extender, colorant, de-molding agent, dye, flow promoter, flow modifier, light stabilizer, lubricant, mold release agent, pigment, quenching agent, thermal stabilizer, UV absorbent substance, UV reflectant substance, and UV stabilizer, or combinations thereof.

Aspect 62: The composition of any of aspects 1-61, wherein a molded sample of the blended thermoplastic composition has a through-plane thermal conductivity when determined in accordance with ASTM E1461 of about 0.4 W/mK to about 1.5 W/mK.

Aspect 63: The composition of any of aspects 1-62, wherein a molded sample of the blended thermoplastic composition has an in-plane thermal conductivity when determined in accordance with ASTM E1461 of greater than or equal to about 1.0 W/mK.

Aspect 64: The composition of any of aspects 1-63, wherein a molded sample of the blended thermoplastic composition has a flame out time (5 bars) when measured in accordance with UL 94 testing standards of greater than or equal to about 15 seconds.

Aspect 65: A blended thermoplastic composition comprising: from about 30% wt % to about 70% wt % of a polycarbonate polymer; from about 3% wt % to about 15% wt % of a phosphorus-containing flame retardant; from about 20% wt % to about 50% wt % of a filler comprising at least one thermally conductive filler and at least one thermally insulating filler; from about 0% wt % to about 2% wt % of an anti-drip agent; and from about 0% wt % to about 5% wt % of a silicone-containing char-forming agent; wherein the combined weight percent value of all components does not exceed about 100 wt %; wherein all weight percent values are based on the total weight of the composition; wherein a molded sample of the blended thermoplastic composition is capable of achieving UL94 V0 rating at a thickness of 1.2 mm (±10%); and wherein a molded sample of the blended thermoplastic composition has a through-plane thermal conductivity when determined in accordance with ASTM E1461 of greater than or equal to about 0.4 W/mK.

Aspect 66: A blended thermoplastic composition comprising: from about 35% wt % to about 60% wt % of a polycarbonate polymer; from about 3% wt % to about 12% wt % of a phosphorus-containing flame retardant; from about 20% wt % to about 40% wt % of a filler comprising at least one thermally conductive filler and at least one thermally insulating filler; from about 0% wt % to about 1% wt % of an anti-drip agent; and from about 0% wt % to about 1% wt % of a silicone-containing char-forming agent; wherein the combined weight percent value of all components does not exceed about 100 wt %; wherein all weight percent values are based on the total weight of the composition; wherein a molded sample of the blended thermoplastic composition is capable of achieving UL94 V0 rating at a thickness of 1.2 mm (±10%); wherein a molded sample of the blended thermoplastic composition has a through-plane thermal conductivity when determined in accordance with ASTM E1461 of greater than or equal to about 0.4 W/mK.

Aspect 67: An article comprising any of the compositions of aspects 1-66.

Aspect 68: The article of aspect 67, wherein the article is molded.

Aspect 69: The article of aspect 68, wherein the article is extrusion molded.

Aspect 70: The article of aspect 68, wherein the article is injection molded.

Aspect 71: The article of any of aspects 67-70, wherein the article is an electronic device, automotive device, telecommunication device, medical device, security device, or mechatronic device.

Aspect 72: The article of any of aspects 67-70, wherein the article is selected from a computer device, electromagnetic interference device, printed circuit, Wi-Fi device, Bluetooth device, GPS device, cellular antenna device, smart phone device, automotive device, medical device, sensor device, security device, shielding device, RF antenna device, LED device, and RFID device.

Aspect 73: The article of aspect 72, wherein the article is selected from a computer device, sensor device, security device, RF antenna device, LED device and RFID device.

Aspect 74: The article of aspect 72, wherein the article is selected from a computer device, RF antenna device, LED device and RFID device.

Aspect 75: The article of aspect 72, wherein the article is selected from a RF antenna device, LED device and RFID device.

Aspect 76: The article of aspect 72, wherein the article is selected from a RF antenna device and RFID device.

Aspect 77: The article of aspect 72, wherein the article is a LED device.

Aspect 78: The article of any of claim 72-74 or 77, wherein the LED device is selected from a LED tube, a LED socket, and a LED heat sink.

Aspect 79: A method of improving thermal conductivity properties of a blended thermoplastic composition, the method comprising the step of combining: from about 20% wt % to about 80% wt % of a polycarbonate polymer; from about 3% wt % to about 30% wt % of a phosphorus-containing flame retardant; from about 10% wt % to about 70% wt % of a filler comprising at least one thermally conductive filler and at least one thermally insulating filler; from about 0% wt % to about 10% wt % of an anti-drip agent; and from about 0% wt % to about 10% wt % of a silicone-containing char-forming agent; wherein the combined weight percent value of all components does not exceed about 100 wt %; wherein all weight percent values are based on the total weight of the composition; wherein a molded sample of the blended thermoplastic composition is capable of achieving UL94 V0 rating at a thickness of 1.2 mm (±10%); and wherein the through-plane thermal conductivity when determined in accordance with ASTM E1461 of greater than or equal to about 0.4 W/mK.

Aspect 80: The method of aspect 79, wherein combining comprises the steps of: pre-blending from about 20 wt % to about 80 wt % of the polycarbonate polymer powder with from about 3 wt % to about 30 wt % of the phosphorus-containing flame retardant to provide a pre-blended polycarbonate polymer and phosphorus-containing flame retardant; feeding the pre-blended polycarbonate polymer and phosphorus-containing flame retardant into an extruder apparatus; compounding in the extruder apparatus the pre-blended polycarbonate polymer and phosphorus-containing flame retardant with from about 0% wt % to about 10% wt % of the anti-drip agent and from about 0% wt % to about 10% wt % of a silicone-containing char-forming agent; and feeding into a downstream extruder zone of the extruder apparatus from about 10% wt % to about 70% wt % of the filler comprising at least one thermally conductive filler and at least one thermally insulating filler.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

The materials shown in Table 1 were used to prepare the compositions described and evaluated herein. All samples were prepared by melt extrusion on a Toshiba Twin screw extruder, using different melt temperature and RPM according to different base resin. Tests were all conducted in accordance with ASTM standards, referenced in each test below.

The special gravity ("SG") was determined in accordance with ASTM D792.

Melt Volume-flow Rate ("MVR") was determined in accordance with ASTM D 1238.

Izod Impact strength was determined at 23° C. in accordance with ASTM D256 (Notched Izod impact strength, "NII"), and in accordance with ASTM D4812 (Unnotched Izod impact strength, "UII").

Tensile testing was carried out at 5 mm/min in accordance with ASTM D638.

Flexural testing was carried out at 1.27 mm/min in accordance with ASTM D790.

Heat deflection temperature ("HDT" was determined at 1.82 MPa on a samples with 3.2 mm thickness in accordance with ASTM D 648.

Thermal conductivity ("TC") was conducted in accordance with ASTM E1461 measured using a Nanoflash LFA 447 xenon flash apparatus (Netzsch Group). The reference standard was pyroceram of similar thickness. Measurements are provided in units of κ (W/mK). The measurement determines the thermal diffusivity ($\alpha$, cm$^2$/s) and the specific heat ($Cp$, J/gK) of the sample, together with the density ($\rho$, g/cm$^3$). Density was determined using a water immersion method (ASTM D792). The product of three values ($\alpha$, $\rho$, and $Cp$) gives the thermal conductivity in the through plane according to:

$$\kappa = \alpha(T) \times Cp(T) \times \rho(T).$$

TABLE 1

| Component | Chemical description | Source |
|---|---|---|
| PC1 | Copolymer of sebacic acid-BPA comprising about 8.5 mol %, sebacic acid with a Mw of about 70,000 Daltons. | SABIC Innovative Plastics ("SABIC I.P.") |
| PC2 | BPA polycarbonate resin made by an interfacial process with MVR at 300° C./1.2 kg, of about 5.1 to about 6.9 g/10 min. | SABIC I.P. |
| PC3 | BPA polycarbonate resin made by a melt process with an MVR at 300° C./1.2 kg, of about 23.5 to about 28.5 g/10 min. | SABIC I.P. |
| PC4 | Copolymer of sebacic acid-BPA comprising about 6 mol %, sebacic acid with a Mw of about 42,000 Daltons. | SABIC I.P. |
| PCPS1 | BPA polycarbonate-polysiloxane copolymer comprising about 20% by weight of a dimethylsiloxane, 80% by weight BPA and end-capped with paracumyl phenol with an absolute weight average molecular weight of about 30,000 Da. | SABIC I.P. |
| T1 | Talc with a D50 of about 10 μm (CAS: 14807-96-6); commercially available under the trade name TP-325A. | Fuji Talc Industrial Co., Ltd. |

TABLE 1-continued

| Component | Chemical description | Source |
|---|---|---|
| T2 | Talc with $D_{50}$ of about 5.8 μm and a bulk density of about 0.4 to about 0.6 g/l; (CAS: 14807-96-6); commercially available under the trade name GH7(05). | Hayashi Kasei Co., Ltd. |
| TO2 | $TiO_2$ with alumina and polysiloxane surface treatment (CAS: 13463-67-7); commercially available under the trade name Kronos ® K2233. | Kronos, Inc. |
| FM1 | Epoxy functional styrene-acrylic polymer with low molecular weight (Mn < 3,000), high number average functionality (fn > 4). | BASF |
| MR1 | Pentaerythritol tetrastearate commercially available from Faci as PETS G. | Faci Asia Pacific PTE LTD |
| AO1 | Octadecyl-3-(3,5-di-tert.butyl-4-hydroxyphenyl)-propionate; hindered phenol commercially available under the trade name Irganox 1076. | Ciba Specialty Chemicals (China) Ltd. |
| CF1 | Organomodified siloxane comprising a polycaprolactone-polydimethylsiloxane-polycaprolactone triblock copolymer having a Mw of about 22,000 AMU and a polydimethylsiloxane content of about 44 wt %. | Evonik Goldschmidt Gmbh |
| TSAN | T-SAN (Teflon (PTFE)-styrene-acrylonitrile) resin with a specific gravity of about 1.45-1.55 $g/cm^3$ as determined in accordance with ASTM D792 and a particle size of about 350-450 μm. | SABIC I.P. |
| FR1 | Bisphenol-A bis(diphenyl phosphate); CAS No. 5945-33-5. | Nagase Co. Ltd. |

The materials used to preparing the formulations described herein are listed in Table 1 above. The formulations were prepared using a Twin screw extruder (Toshiba TEM-37BS, L/D=40.5) with the temperature of the extruder barrel set at 260° C. Pellets extruded from extruder were then injection molded into 80×10×3 mm bar, cut into 10×10×3 mm square sample for through plane TC measurement, Φ100×0.4 mm sheet and cut into Φ25×0 4 mm round sample for in plane TC measurement.

Exemplary formulations #1-4 are shown in Table 2, using the materials shown in Table 1. Molded samples were prepared using these formulations and characterized by various tests described herein above with the results shown in Table 3. Formulations 1 and 4 include a high MW polycarbonate polymer, whereas Formulations 2 and 3 include a low MW polycarbonate polymer. Both notched and unnotched impact strength were improved in Formulations 1 and 4, compared to 2 and 3. Formulation 1 also offered a modest increase in thermal conductivity.

TABLE 2

| Item Description | Unit | 1 | 2 | 3 | 4 |
|---|---|---|---|---|---|
| T1 | % | 20 | 20 | 20 | 20 |
| TO2 | % | 20 | 20 | 20 | 20 |
| FM1 | % | 0.25 | 0.25 | 0.25 | 0.25 |
| PC1 | % | 41.65 | — | — | — |
| PC2 | % | — | — | — | 41.65 |
| PC3 | % | — | — | 41.65 | — |
| PC4 | % | — | 41.65 | — | — |
| AO1 | % | 0.1 | 0.1 | 0.1 | 0.1 |
| CF1 | % | 1 | 1 | 1 | 1 |
| TSAN | % | 1 | 1 | 1 | 1 |
| FR1 | % | 16 | 16 | 16 | 16 |
| Formulation Total | | 100 | 100 | 100 | 100 |

TABLE 3

| Test Description | Unit | 1 | 2 | 3 | 4 |
|---|---|---|---|---|---|
| MVR-Avg (300 C./1.2 kg) | $cm^3$/10 min | 12.6 | 19.2 | 14.3 | 5.63 |
| % Ash | % | 39.96 | 40.09 | 40.35 | 40.13 |
| Notched Izod Impact Strength-Avg | J/m | 36.1 | 19.9 | 26 | 37.6 |
| Unnotched Izod Impact Strength-Avg | J/m | 321 | 208 | 236 | 300 |
| Density-Avg | — | 1.617 | 1.626 | 1.633 | 1.635 |
| Through plane Thermal conductivity | W/(m · K) | 0.6 | 0.53 | 0.52 | 0.53 |
| In plane Thermal conductivity | W/(m · K) | 1.8 | 1.7 | 1.6 | 1.6 |
| Modulus of Elasticity-Avg | MPa | 5009.6 | 5131.2 | 5398.6 | 5555.4 |
| Stress at Break-Avg | MPa | 44.8 | 47 | 50.2 | 51.6 |
| Elongation at Break-Avg | % | 2.34 | 1.59 | 1.76 | 2.02 |
| No. of Burning Drops | V0@1.0 mm | 0 | 0 | 0 | 0 |
| p(FTP)V0 | normal | 1.00 | 0.96 | 0.99 | 1.00 |
| p(FTP)V1 | | 1.00 | 1.00 | 1.00 | 1.00 |
| FOT 5 (s) | | 30.35 | 30.1 | 32.35 | 27.55 |
| No. of Burning Drops | | 0 | 0 | 0 | 0 |
| p(FTP)V0 | aging | 1.00 | 0.99 | 1.00 | 0.99 |

TABLE 3-continued

| Test Description | Unit | 1 | 2 | 3 | 4 |
|---|---|---|---|---|---|
| p(FTP)V1 | — | 1.00 | 1.00 | 1.00 | 1.00 |
| FOT 5 (s) | — | 32.35 | 27.6 | 30.7 | 28.25 |
| Mw | Daltons | 67718 | 40989 | 41128 | 58755 |
| Mn | Daltons | 27001 | 18631 | 18957 | 24393 |

Exemplary formulations #4-5 are shown in Table 4, using the materials shown in Table 1. Molded samples were prepared using these formulations and characterized by various tests described herein above with the results shown in Table 5. The effect of using EXL-High PC-polysiloxane is shown in Table 5. In Formulation 4, 10% EXL-High PC-polysiloxane was included. The results indicate that notched and unnotched impact strength, as well as elongation at the break, were improved compared to Formulation 5. Thermal conductivity, however, was reduced from 0.66 to 0.48 W/(m·K) (through plane) and from 2 to 1.5 W/(m·K) (in plane).

TABLE 4

| Item Description | Unit | 4 | 5 |
|---|---|---|---|
| T2 | % | 20 | 20 |
| TO2 | % | 20 | 20 |
| PC2 | % | 42.15 | 52.15 |
| PCPS1 | % | 10 | — |
| MR1 | % | 0.1 | 0.1 |
| AO1 | % | 0.1 | 0.1 |
| AO2 | % | 0.05 | 0.05 |
| TSAN | % | 0.6 | 0.6 |
| FR1 | % | 7 | 7 |
| Formulation Total | | 100 | 100 |

TABLE 5

| Test Description | Unit | 4 | 5 |
|---|---|---|---|
| MVR-Avg (300 C./1.2 kg) | cm³/10 min | 5.49 | 9.97 |
| % Ash | % | 40.56 | 40.185 |
| Notched Izod Impact Strength—Avg | J/m | 50 | 31.7 |
| Unnotched Izod Impact Strength—Avg | J/m | 269 | 247 |
| Density—Avg | — | 1.608 | 1.618 |
| Through plane Thermal conductivity | W/(m·K) | 0.48 | 0.66 |
| In plane Thermal conductivity | W/(m·K) | 1.5 | 2 |
| Modulus of Elasticity—Avg | MPa | 5363.6 | 7036.2 |
| Stress at Break—Avg | MPa | 49.3 | 58 |
| Elongation at Break—Avg | % | 1.97 | 1.64 |
| Mw | Daltons | 51783 | 48515 |

TABLE 5-continued

| Test Description | Unit | 4 | 5 |
|---|---|---|---|
| Mn | Daltons | 16369 | 15805 |
| D | — | 3.16 | 3.07 |
| CTE—Avg | Um/(m-° C.) | 45.76 | 41.7 |

Exemplary formulations #6-8 are shown in Table 6, using the materials shown in Table 1. Molded samples were prepared using these formulations and characterized by various tests described herein above with the results shown in Table 7. The comparative flame results of V0 @ 1.0 mm are shown in Table 7. Formulation 6 failed due to long flame time, flame dripping and cotton ignition when only 7 wt % of FR1 and 0.6 wt % of TSAN was included, suggesting that these are not sufficient for a robust flame retardancy in Formulation 7. In Formulation 7, FR1 and TSAN were increased and a second anti-dripping agent was included, FM1. The results show that flame dripping was significantly improved with a robust V1 @1.0 mm realized. Surprisingly, the flame time was further reduced with the inclusion of a silicone containing char-forming agent, CF1 (see Formulation 8), and a robust flame performance of V0 @1.0 mm was realized. Moreover, acceptable thermal conductive performance (≥0.4 W/mK through plane thermal conductivity) was realized simultaneously with robust flame performance in Formulations 7 and 8.

TABLE 6

| Item Description | Unit | 1 | 2 | 3 |
|---|---|---|---|---|
| T1 | % | 20 | 20 | 20 |
| TO2 | % | 20 | 20 | 20 |
| FM1 | % | — | 0.5 | 0.5 |
| PC2 | % | 52.15 | 42.25 | 40.25 |
| MR1 | % | 0.1 | 0.1 | 0.1 |
| AO1 | % | 0.1 | 0.1 | 0.1 |
| AO2 | % | 0.05 | 0.05 | 0.05 |
| CF1 | % | — | — | 2 |
| TSAN | % | 0.6 | 1 | 1 |
| FR1 | % | 7 | 16 | 16 |
| Formulation Total | | 100 | 100 | 100 |

TABLE 7

| Test Description | Unit | 1 | 2 | 3 |
|---|---|---|---|---|
| MVR—Avg (300 C./1.2 kg) | cm³/10 min | 9.97 | 6.54 | 5.19 |
| % Ash | % | 40.185 | 41.64 | 40.5 |
| Notched Izod Impact Strength—Avg | J/m | 31.7 | 16.4 | 36.1 |
| Unnotched Izod Impact Strength—Avg | J/m | 247 | 200 | 290 |
| Density—Avg | — | 1.618 | 1.644 | 1.625 |
| Through plane Thermal conductivity | W/(m·K) | 0.66 | 0.56 | 0.48 |
| In plane Thermal conductivity | W/(m·K) | 2 | 1.8 | 1.6 |
| Modulus of Elasticity—Avg | MPa | 7036.2 | 6941.2 | 4628.2 |
| Stress at Break—Avg | MPa | 58 | 60.3 | 43.1 |
| Elongation at Break—Avg | % | 1.64 | 1.59 | 2.69 |
| Elongation at Break—Mw | Daltons | 48515 | 55364 | 55350 |

TABLE 7-continued

| | Daltons | | | |
|---|---|---|---|---|
| Elongation at Break—Mn | | 15805 | 13423 | 13274 |
| Elongation at Break—D | | 3.07 | 4.12 | 4.17 |
| No. of Burning Drops | | 1 | 0 | 0 |
| p(FTP)V0 | normal | 0.00 | 0.65 | 1.00 |
| p(FTP)V1 | | 0.00 | 0.99 | 1.00 |
| FOT 5 (s) | | | 28.9 | 20.85 |
| No. of Burning Drops | | 0 | 0 | 0 |
| p(FTP)V0 | aging | 0.00 | 0.67 | 1.00 |
| p(FTP)V1 | | 0.00 | 0.98 | 1.00 |
| FOT 5 (s) | | | 28.7 | 18.8 |

Formulations #9-12 further show robustness of the flame performance in a formulation comprising FM1, TSAN, and CF1. The polycarbonate used in Formulations #9-12 is a polyestercarbonate terpolymer. This example also illustrates the importance of the TSAN anti-dripping agent for robust flame retardant performance. As can be seen, Formulation 9 does not have TSAN, and although the flame time is acceptable, severe flame dripping and cotton ignition issues cause failure at V1 @1.0 mm and V0 @1.0 mm. In Formulations 10 and 11, varied levels of different anti-dripping agents (TSAN and FM1) were added. Both Formulations 10 and 11 provided robust V0 @1.0 mm performance. However, when both anti-dripping agents (TSAN and FM1) were present (see Formulation 12), robust flame performance was also realized.

TABLE 8

| Item Description | Unit | 4 | 5 | 6 | 7 |
|---|---|---|---|---|---|
| T1 | % | 20 | 20 | 20 | 20 |
| TO2 | % | 20 | 20 | 20 | 20 |
| FM1 | % | | | 0.25 | 0.25 |
| PC1 | % | 42.9 | 41.9 | 42.65 | 41.65 |
| AO1 | % | 0.1 | 0.1 | 0.1 | 0.1 |
| CF1 | % | 1 | 1 | 1 | 1 |
| TSAN | % | | 1 | | 1 |
| FR1 | % | 16 | 16 | 16 | 16 |
| Formulation Total | | 100 | 100 | 100 | 100 |

TABLE 9

| Test Description | Unit | 4 | 5 | 6 | 7 |
|---|---|---|---|---|---|
| MVR-Avg (300 C./1.2 kg) | cm³/10 min | 130 | 15.3 | 87.5 | 12.6 |
| % Ash | % | 40.47 | 40.76 | 39.10 | 39.96 |
| Notched Izod Impact Strength-Avg | J/m | 32.9 | 37 | 35.3 | 36.1 |
| Unnotched Izod Impact Strength-Avg | J/m | 252 | 322 | 245 | 321 |
| Density-Avg | — | 1.619 | 1.627 | 1.597 | 1.617 |
| Through plane Thermal conductivity | W/(m·K) | 0.55 | 0.57 | 0.5 | 0.6 |
| In plane Thermal conductivity | W/(m·K) | 1.7 | 1.8 | 1.6 | 1.8 |
| Modulus of Elasticity-Avg | MPa | 4703.6 | 5053.2 | 4738.6 | 5009.6 |
| Stress at Break-Avg | MPa | 40.5 | 42.1 | 44.5 | 44.8 |
| Elongation at Break-Avg | % | 2.27 | 2.5 | 2.09 | 2.34 |
| No. of Burning Drops | V0 @ 1.0 mm | 9 | 0 | 0 | 0 |
| p(FTP)V0 | normal | Fail | 1.00 | 0.97 | 1.00 |
| p(FTP)V1 | | Fail | 1.00 | 1.00 | 1.00 |
| FOT 5 (s) | | 34.45 | 30.45 | 31.4 | 30.35 |
| No. of Burning Drops | | 0 | 0 | 0 | 0 |
| p(FTP)V0 | aging | 0.98 | 1.00 | 1.00 | 1.00 |
| p(FTP)V1 | | 1.00 | 1.00 | 1.00 | 1.00 |
| FOT 5 (s) | | 29.6 | 28.65 | 26.2 | 32.25 |

The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A composition comprising:
   a. from about 20% wt % to about 80% wt % of a polycarbonate polymer;
   b. from about 3% wt % to about 30% wt % of a phosphorus-containing flame retardant;
   c. from about 10% wt % to about 70% wt % of a filler comprising at least one thermally conductive filler and at least one thermally insulating filler;
   wherein the combined weight percent value of all components does not exceed 100 wt %;
   wherein all weight percent values are based on the total weight of the composition;
   wherein a molded sample of the blended thermoplastic has a UL94 V0 rating at a thickness of about 1.2 mm; and
   wherein a molded sample of the blended thermoplastic composition has a through-plane thermal conductivity when determined in accordance with ASTM E1461 of greater than or equal to about 0.4 W/mK.

2. The composition of claim 1, wherein the polycarbonate is a homopolymer.

3. The composition of claim 2, wherein the homopolymer comprises repeating units derived from bisphenol A.

4. The composition of claim 1, wherein the polycarbonate is a copolymer.

5. The composition of claim 4, wherein the copolymer comprises repeating units derived from sebacic acid or bisphenol A, or both.

6. The composition of claim 1, wherein the polycarbonate has a weight average molecular weight from about 15,000 to about 75,000 grams/mole, as measured by gel permeation chromatography.

7. The composition of claim 4, wherein the copolymer comprises dimethylsiloxane repeating units.

8. The composition of claim 4, wherein the copolymer is a polycarbonate-polysiloxane copolymer.

9. The composition of claim 8, wherein the polycarbonate-polysiloxane copolymer comprises repeating units derived from bisphenol A.

10. The composition of claim 8, wherein the polycarbonate-polysiloxane copolymer comprises a polysiloxane block from about 5 wt % to about 30 wt % of the polycarbonate-polysiloxane copolymer.

11. The composition of claim 1, wherein the polycarbonate polymer comprises a blend of at least two polycarbonate polymers.

12. The composition of claim 1, wherein the polycarbonate polymer comprises a first polycarbonate polymer component having a melt volume flow rate (MVR) from about 17 grams/10 minutes to about 32 grams/10 minutes when measured at 300° C. and under a load of 1.2 kg according to ASTM D1238.

13. The composition of claim 12, wherein the polycarbonate polymer comprises a second polycarbonate polymer component having a melt volume flow rate (MVR) from about 4.0 grams/10 minutes to about 8.0 grams/10 minutes when measured at 300° C. and under a load of 1.2 kg according to ASTM D1238.

14. The composition of claim 1, wherein the polycarbonate polymer comprises a first polycarbonate-polysiloxane copolymer having a polysiloxane block from about 5 wt % to about 30 wt % of the first polycarbonate-polysiloxane copolymer and a second polycarbonate-polysiloxane copolymer having a polysiloxane block less than or equal to about 10 wt % of the second polycarbonate-polysiloxane copolymer.

15. The composition of claim 1, wherein the polycarbonate polymer is present in an amount from about 30 wt % to about 70 wt %.

16. The composition of claim 1, wherein the phosphorus-containing flame comprises one or more of a phosphine, a phosphine oxide, a bisphosphine, a phosphonium salt, a phosphinic acid salt, a phosphoric ester, and a phosphorous ester.

17. The composition of claim 1, wherein the phosphorus-containing flame retardant is present in an amount from about 3 wt % to about 15 wt %.

18. The composition of claim 1, further comprising at least one anti-drip agent present in an amount from about 0 wt % to about 10 wt %.

19. The composition of claim 18, wherein anti-drip agent is a styrene-acrylonitrile copolymer encapsulated polytetrafluoroethylene.

20. The composition of claim 1, further comprising a silicone-containing char-forming agent present in an amount from about 0 wt % to about 10 wt %.

21. The composition of claim 20, wherein the silicone-containing char-forming agent is an organopolysiloxane.

22. The composition of claim 21, wherein the organopolysiloxane is a copolymer comprising polycarbonate-polysiloxane copolymer, polyamide-polysiloxane copolymer, polyester-polysiloxane copolymer, polymethylmethacrylate-polysiloxane copolymer, polyetherimide-polysiloxane copolymer, and polyphenylene-ether copolymer, or combinations thereof.

23. The composition of claim 1, wherein the thermally conductive filler is $TiO_2$ and the thermally insulating filler is $H_2Mg_3(SiO_3)_4$.

24. The composition of claim 1, wherein the thermally conductive filler is a high thermally conductive filler, wherein the high thermally conductive filler has a thermal conductivity greater than or equal to about 50 W/mK; or a low thermally conductive filler, wherein the low thermally conductive filler has a thermal conductivity from about 10 W/mK to about 30 W/mK; or a combinations thereof.

25. The composition of claim 1, wherein the thermally insulating filler has a thermal conductivity less than or equal to about 10 W/mK.

26. The composition of claim 1, wherein the thermally insulating filler comprises $H_2Mg_3(SiO_3)_4$, $CaCO_3$, $Mg(OH)_2$, mica, BaO, γ-AlO(OH), α-AlO(OH), $Al(OH)_3$, $BaSO_4$, $CaSiO_3$, $ZrO_2$, $SiO_2$, a glass bead, a glass fiber, $MgO.xAl_2O_3$, $CaMg(CO_3)_2$, a clay, or a combination thereof.

27. The compositions of claim 1, wherein the filler is present in an amount from about 20% wt % to about 50% wt %.

28. The composition of claim 1, further comprising an additive comprising an antioxidant, antistatic agent, chain extender, colorant, de-molding agent, dye, flow promoter, flow modifier, light stabilizer, lubricant, mold release agent, pigment, quenching agent, thermal stabilizer, UV absorbent substance, UV reflectant substance, and UV stabilizer, or combinations thereof.

29. The composition of claim 1, wherein a molded sample of the blended thermoplastic composition has a through-plane thermal conductivity when determined in accordance with ASTM E1461 of about 0.4 W/mK to about 1.5 W/mK.

30. The composition of claim 1, wherein a molded sample of the blended thermoplastic composition has an in-plane thermal conductivity when determined in accordance with ASTM E1461 of greater than or equal to about 1.0 W/mK.

31. The composition of claim 1, wherein a molded sample of the blended thermoplastic composition has a flame out time (5 bars) when measured in accordance with UL 94 testing standards of greater than or equal to about 15 seconds.

32. A blended thermoplastic composition comprising:
a. from about 30% wt % to about 70% wt % of a polycarbonate polymer;
b. from about 3% wt % to about 15% wt % of a phosphorus-containing flame retardant;
c. from about 20% wt % to about 50% wt % of a filler comprising at least one thermally conductive filler and at least one thermally insulating filler;
d. from about 0% wt % to about 2% wt % of an anti-drip agent; and
e. from about 0% wt % to about 5% wt % of a silicone-containing char-forming agent;
wherein the combined weight percent value of all components does not exceed about 100 wt %;
wherein all weight percent values are based on the total weight of the composition;
wherein a molded sample of the blended thermoplastic composition has a UL94 V0 rating at a thickness of about 1.2 mm; and
wherein a molded sample of the blended thermoplastic composition has a through-plane thermal conductivity when determined in accordance with ASTM E1461 of greater than or equal to about 0.4 W/mK.

33. A blended thermoplastic composition comprising:
a. from about 35% wt % to about 60% wt % of a polycarbonate polymer;

b. from about 3% wt % to about 12% wt % of a phosphorus-containing flame retardant;
c. from about 20% wt % to about 40% wt % of a filler comprising at least one thermally conductive filler and at least one thermally insulating filler;
d. from about 0% wt % to about 1% wt % of an anti-drip agent; and
e. from about 0% wt % to about 1% wt % of a silicone-containing char-forming agent;

wherein the combined weight percent value of all components does not exceed about 100 wt %;

wherein all weight percent values are based on the total weight of the composition;

wherein a molded sample of the blended thermoplastic composition has a UL94 V0 rating at a thickness of 1.2 mm;

wherein a molded sample of the blended thermoplastic composition has a through-plane thermal conductivity when determined in accordance with ASTM E1461 of greater than or equal to about 0.4 W/mK.

34. An article formed from the composition of claim 33.

35. The article of claim 34, wherein the article comprises one of a computer device, electromagnetic interference device, printed circuit, Wi-Fi device, Bluetooth device, GPS device, cellular antenna device, smart phone device, automotive device, medical device, sensor device, security device, shielding device, RF antenna device, LED device, and RFID device.

36. A method of improving thermal conductivity properties of a blended thermoplastic composition, the method comprising the step of combining:
a. from about 20% wt % to about 80% wt % of a polycarbonate polymer;
b. from about 3% wt % to about 30% wt % of a phosphorus-containing flame retardant;
c. from about 10% wt % to about 70% wt % of a filler comprising at least one thermally conductive filler and at least one thermally insulating filler;
d. from about 0% wt % to about 10% wt % of an anti-drip agent; and
e. from about 0% wt % to about 10% wt % of a silicone-containing char-forming agent;

wherein the combined weight percent value of all components does not exceed about 100 wt %;

wherein all weight percent values are based on the total weight of the composition;

wherein a molded sample of the blended thermoplastic composition has a UL94 V0 rating at a thickness of 1.2 mm; and wherein the through-plane thermal conductivity when determined in accordance with ASTM E1461 of greater than or equal to about 0.4 W/mK.

37. The method of claim 36, wherein combining comprises the steps of:
a. pre-blending from about 20 wt % to about 80 wt % of the polycarbonate polymer powder with from about 3 wt % to about 30 wt % of the phosphorus-containing flame retardant to provide a pre-blended polycarbonate polymer and phosphorus-containing flame retardant;
b. feeding the pre-blended polycarbonate polymer and phosphorus-containing flame retardant into an extruder apparatus;
c. compounding in the extruder apparatus the pre-blended polycarbonate polymer and phosphorus-containing flame retardant with from about 0% wt % to about 10% wt % of the anti-drip agent and from about 0% wt % to about 10% wt % of a silicone-containing char-forming agent; and
d. feeding into a downstream extruder zone of the extruder apparatus from about 10% wt % to about 70% wt % of the filler comprising at least one thermally conductive filler and at least one thermally insulating filler.

* * * * *